(12) United States Patent
Kim et al.

(10) Patent No.: US 11,937,105 B2
(45) Date of Patent: Mar. 19, 2024

(54) METHOD AND APPARATUS FOR CONTROLLING ACTIVATION OF CELL GROUP IN WIRELESS COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 81 days.

(21) Appl. No.: 17/305,795

(22) Filed: Jul. 14, 2021

(65) Prior Publication Data

US 2022/0022067 A1    Jan. 20, 2022

(30) Foreign Application Priority Data

Jul. 14, 2020 (KR) .................. 10-2020-0086977
Sep. 7, 2020 (KR) .................. 10-2020-0114061

(51) Int. Cl.
H04W 24/08    (2009.01)
H04L 5/00    (2006.01)
H04W 24/10    (2009.01)

(52) U.S. Cl.
CPC .......... *H04W 24/08* (2013.01); *H04L 5/0048* (2013.01); *H04W 24/10* (2013.01)

(58) Field of Classification Search
CPC .............................. H04W 16/14; H04W 72/04
See application file for complete search history.

(56) References Cited

U.S. PATENT DOCUMENTS

| 2014/0050188 | A1 | 2/2014 | Park |
| 2016/0302177 | A1 | 10/2016 | Kwon et al. |
| 2017/0245165 | A1 | 8/2017 | Onggosanusi et al. |
| 2017/0347270 | A1 | 11/2017 | Iouchi et al. |
| 2019/0045491 | A1* | 2/2019 | Zhang ............... H04W 72/232 |
| 2019/0254110 | A1 | 8/2019 | He et al. |
| 2021/0045003 | A1* | 2/2021 | Li ....................... H04W 24/02 |
| 2021/0099902 | A1* | 4/2021 | Takeda ................ H04W 24/10 |
| 2021/0392531 | A1* | 12/2021 | Lu ...................... H04W 52/146 |

(Continued)

FOREIGN PATENT DOCUMENTS

EP      3648497 A1    5/2020

OTHER PUBLICATIONS

ZTE Corporation, Sanechips, "Remaining issues on fast SCell activation", 3GPP TSG-RAN WG2 Meeting#109bis-e, Apr. 20-30, 2020, R2-2002702, 3 pages.

(Continued)

*Primary Examiner* — Zhiren Qin

(57) ABSTRACT

A method, performed by a user equipment (UE), for controlling activation of a cell group includes: receiving, from a base station, a radio resource control (RRC) message including configuration information indicating a number of temporary reference signals; receiving, from the base station, a medium access control (MAC) control element (CE) indicating to activate a secondary cell (SCell); receiving, from the base station, a temporary reference signal; based on the MAC CE and the RRC message, measuring the temporary reference signal; and transmitting, to the base station, a measurement result regarding the temporary reference signal.

21 Claims, 20 Drawing Sheets

(56) References Cited

U.S. PATENT DOCUMENTS

2021/0409975 A1* 12/2021 Hsieh .................... H04W 76/15
2022/0085948 A1*  3/2022 Li ......................... H04L 5/0048
2022/0110181 A1*  4/2022 Miao ..................... H04L 1/1822

OTHER PUBLICATIONS

Notification of Transmittal of the International Search Report and the Written Opinion of the International Searching Authority, or the Declaration dated Oct. 18, 2021 in connection with International Patent Application No. PCT/KR2021/009052, 9 pages.
Supplementary European Search Report dated Sep. 20, 2023, in connection with European Patent Application No. 21843029.6, 13 pages.
Qualcomm Incorporated, "Fast SCG and SCell Activation," R1-1907306, 3GPP TSG-RAN WG1 #97, Reno, USA, May 2019, 11 pages.

* cited by examiner

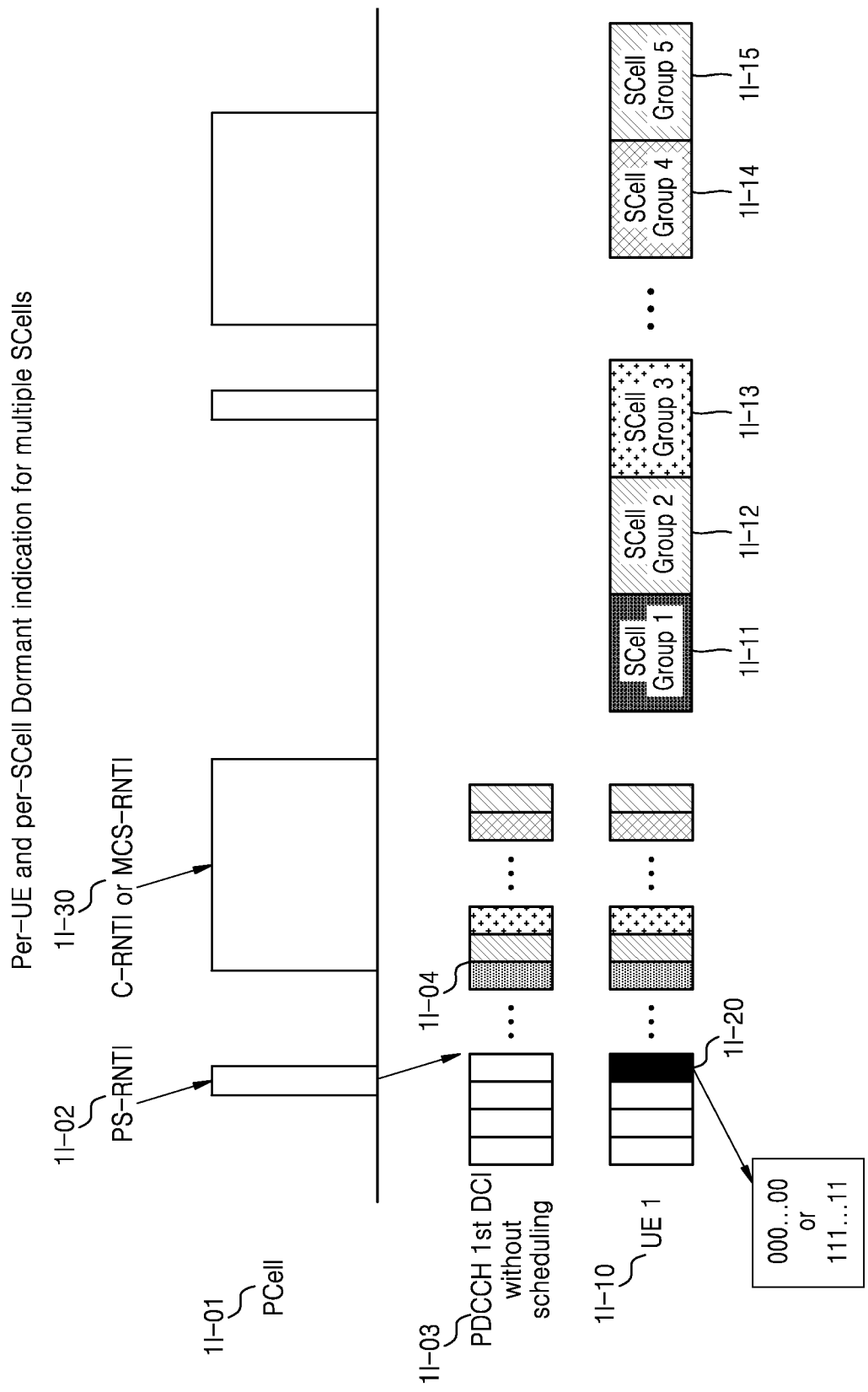

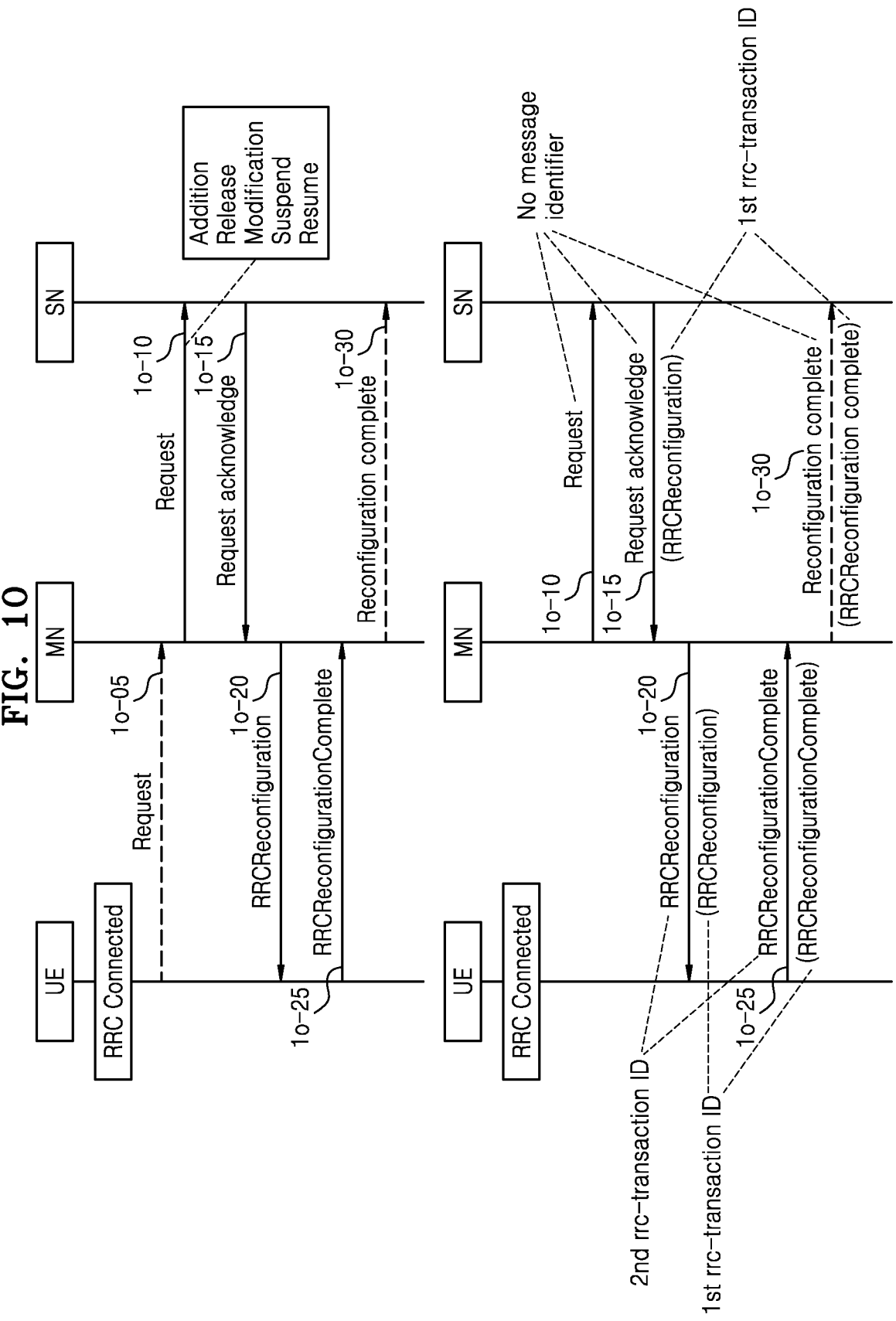

METHOD AND APPARATUS FOR CONTROLLING ACTIVATION OF CELL GROUP IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2020-0086977 and 10-2020-0114061, respectively filed on Jul. 14, 2020 and Sep. 7, 2020, in the Korean Intellectual Property Office, the disclosures of which are incorporated by reference herein in their entirety.

BACKGROUND

1. Field

The disclosure relates to a method and apparatus for activating or deactivating a cell group in a wireless communication system.

2. Description of the Related Art

In order to meet the increasing demand with respect to wireless data traffic after the commercialization of $4^{th}$ generation (4G) communication systems, efforts have been made to develop improved $5^{th}$ generation (5G) communication systems or pre-5G communication systems. For this reason, 5G communication systems or pre-5G communication systems are called 'beyond 4G network communication systems' or 'post long term evolution (LTE) systems'. 5G communication systems defined by the $3^{rd}$ generation partnership project (3GPP) are called new radio (NR) systems. In order to achieve a high data rate, consideration is given to implementing 5G communication systems in ultra-high frequency bands (millimeter wave (mmW)) (e.g., 60 GHz). In order to reduce the pathloss of radio waves and increase a transmission distance of radio waves in ultra-high frequency bands, for 5G communication systems, technologies such as beamforming, massive multiple-input multiple-output (MIMO), full dimensional MIMO (FD-MIMO), array antenna, analog beamforming, and large scale antenna have been discussed, and have been applied to NR systems. Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation is underway. Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter bank multi-carrier (FBMC), non-orthogonal multiple access (NOMA), or sparse code multiple access (SCMA), is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, 5G communication such as sensor network, M2M communication, or MTC is implemented by technology such as beamforming, MIMO, or array antenna. The application of a cloud RAN as big data processing technology may also be considered as an example of convergence of 5G technology and IoT technology.

With the development of wireless communication systems, methods for efficiently controlling activation of a cell group in a mobile communication system supporting carrier aggregation or dual connectivity are required.

SUMMARY

Provided is a method and apparatus for controlling activation and deactivation of a cell group in a mobile communication system.

Additional aspects will be set forth in part in the description which follows and, in part, will be apparent from the description, or may be learned by practice of the presented embodiments of the disclosure.

According to an embodiment of the disclosure, a method, performed by a user equipment (UE), for controlling activation of a cell group includes: receiving, from a base station, a radio resource control (RRC) message including configuration information indicating a number of temporary reference signals; receiving, from the base station, a medium access control (MAC) control element (CE) indicating to activate a secondary cell (SCell); receiving, from the base station, a temporary reference signal; based on the MAC CE and the RRC message, measuring the temporary reference signal; and transmitting, to the base station, a measurement result regarding the temporary reference signal.

The MAC CE may be contained in a physical downlink shared channel (PDSCH).

The MAC CE may include resource information used for the temporary reference signal.

The MAC CE may include time offset information for the temporary reference signal.

The temporary reference signal may be measured within a first active downlink bandwidth part (BWP).

According to an embodiment of the disclosure, a method, performed by a base station, for controlling activation of a cell group includes: transmitting, to a user equipment (UE), a radio resource control (RRC) message including configuration information indicating a number of temporary reference signals; transmitting, to the UE, a medium access control (MAC) control element (CE) indicating to activate a secondary cell (SCell); transmitting, to the UE, a temporary reference signal; and receiving, from the UE, a measurement result regarding the temporary reference signal, wherein the measurement result is based on the MAC CE and the RRC message.

The MAC CE may be contained in a physical downlink shared channel (PDSCH).

The MAC CE may include resource information used for the temporary reference signal.

The MAC CE may include time offset information for the temporary reference signal.

The temporary reference signal may be measured within a first active downlink bandwidth part (BWP) by the UE.

According to an embodiment of the disclosure, a user equipment (UE) for controlling activation of a cell group includes: a memory; a transceiver; and a processor coupled with the memory and transceiver and configured to: receive, from a base station, radio resource control (RRC) message including configuration information indicating a number of temporary reference signal, receive, from the base station, a medium access control (MAC) control element (CE) indicating to activate a secondary cell (SCell), receive, from the base station, a temporary reference signal, based on the MAC CE and the RRC message, measure the temporary reference signal, and transmit, to the base station, a measurement result regarding the temporary reference signal.

The MAC CE may be contained in a physical downlink shared channel (PDSCH).

The MAC CE may include resource information used for the temporary reference signal.

The MAC CE may include time offset information for the temporary reference signal.

The temporary reference signal may be measured within a first active downlink bandwidth part (BWP).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1L illustrates Embodiment 3 of a method of operating a dormant BWP in an activated SCell, according to an embodiment of the disclosure;

FIG. 1O illustrates a flowchart of a first signaling procedure of configuring or releasing dual connectivity, or configuring, releasing, activating, resuming, suspending, or deactivating a secondary cell group (SCG) configured with dual connectivity, according to an embodiment of the disclosure;

DETAILED DESCRIPTION

Figure 1A:
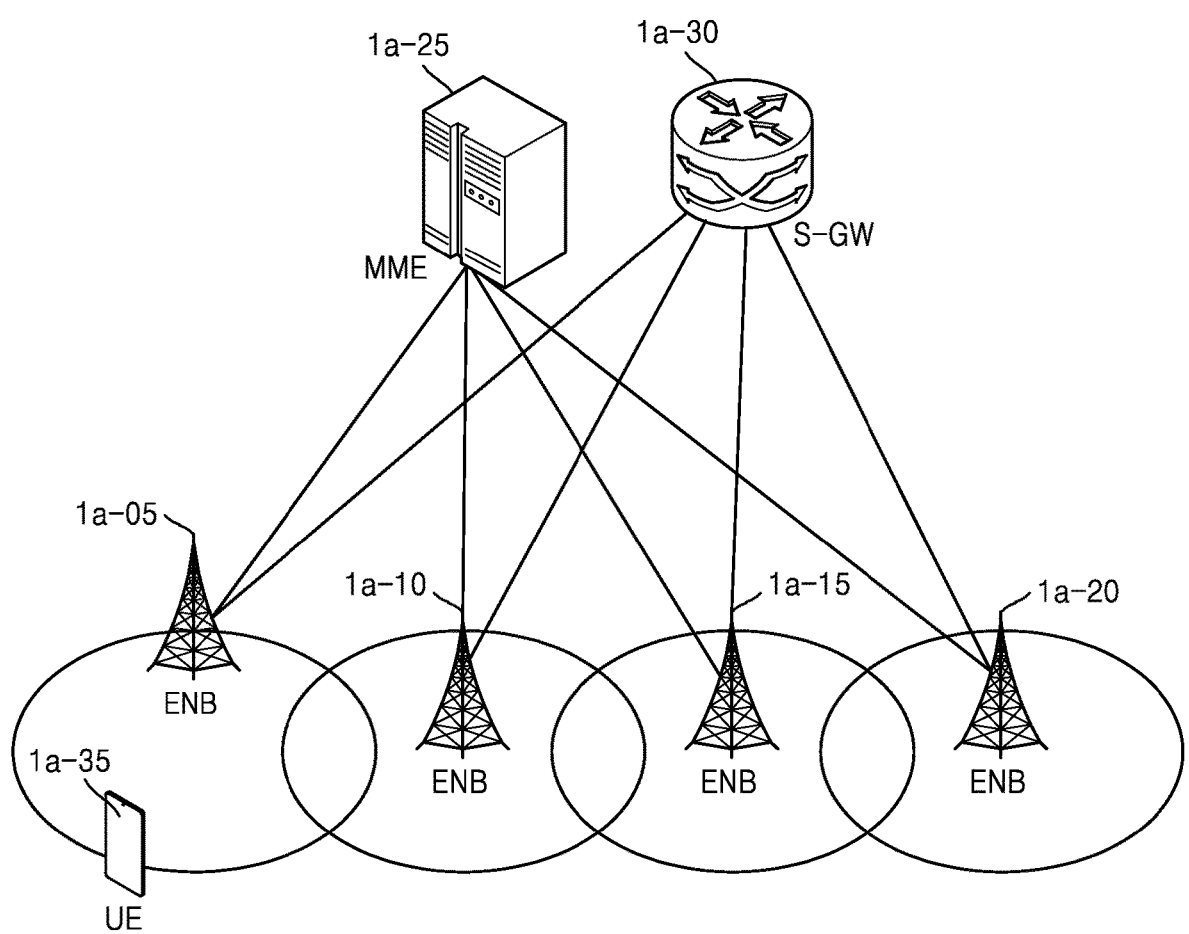
FIG. 1A illustrates a diagram of a structure of a long term evolution (LTE) system, according to an embodiment of the disclosure.
Figure 1B:
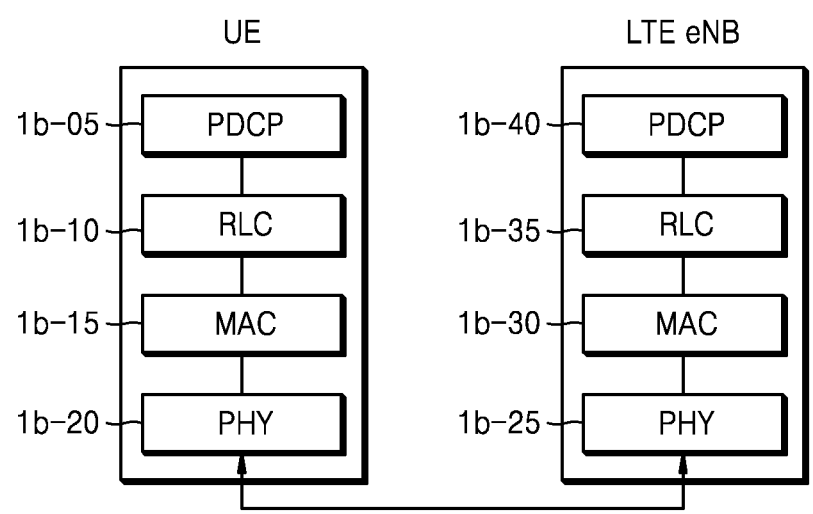
FIG. 1B illustrates a diagram of a radio protocol architecture in an LTE system, according to an embodiment of the disclosure.
Figure 1C:
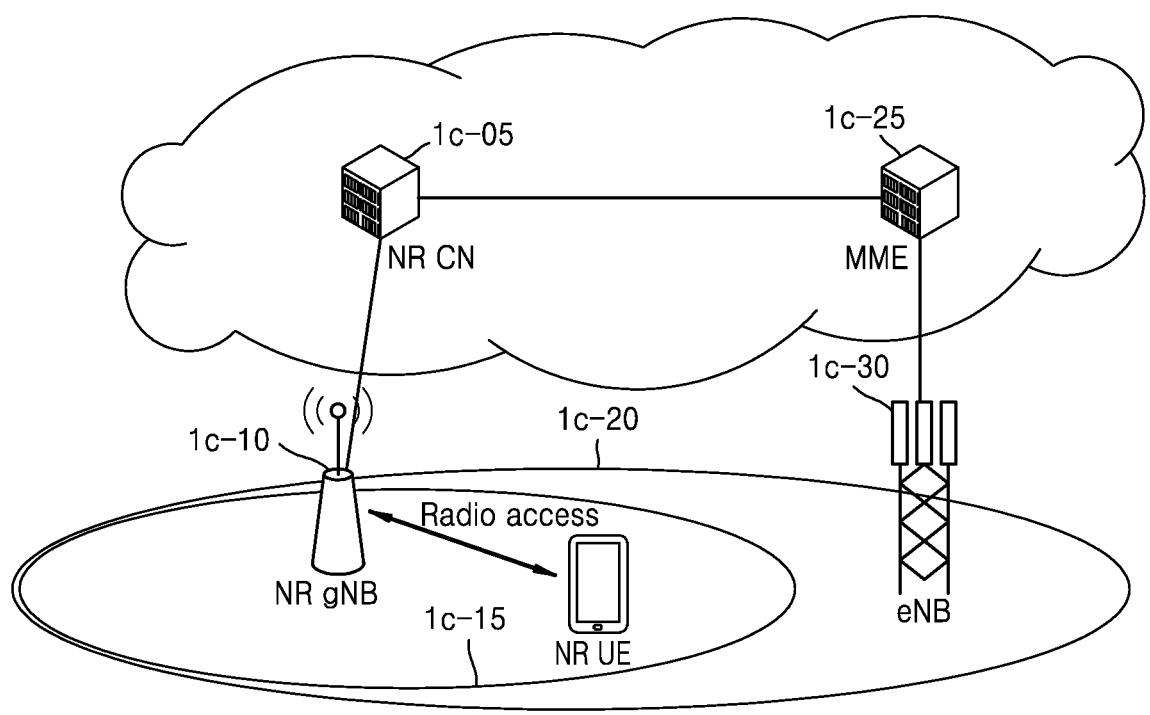
FIG. 1C illustrates a diagram of a structure of a next-generation mobile communication system, according to an embodiment of the disclosure.
Figure 1D:
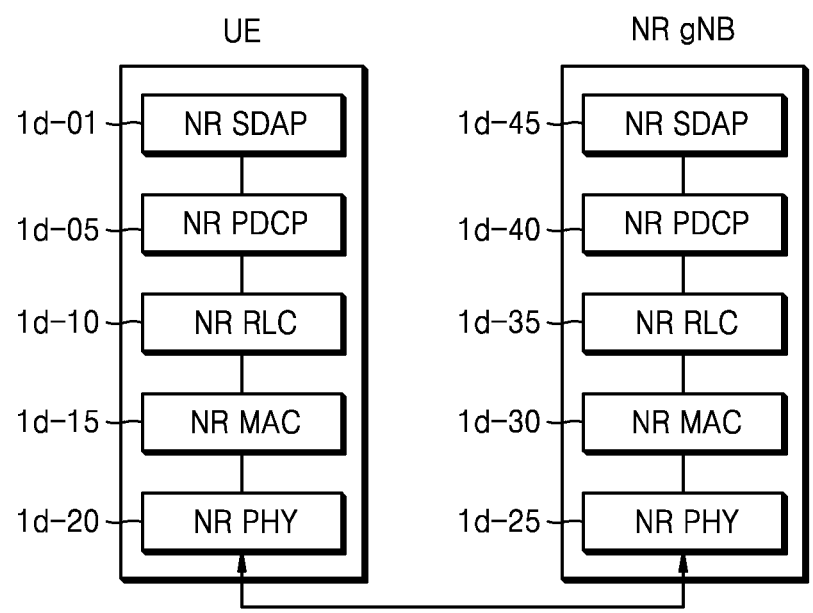
FIG. 1D illustrates a diagram of a radio protocol architecture of a next-generation mobile communication system, according to an embodiment of the disclosure.
Figure 1E:
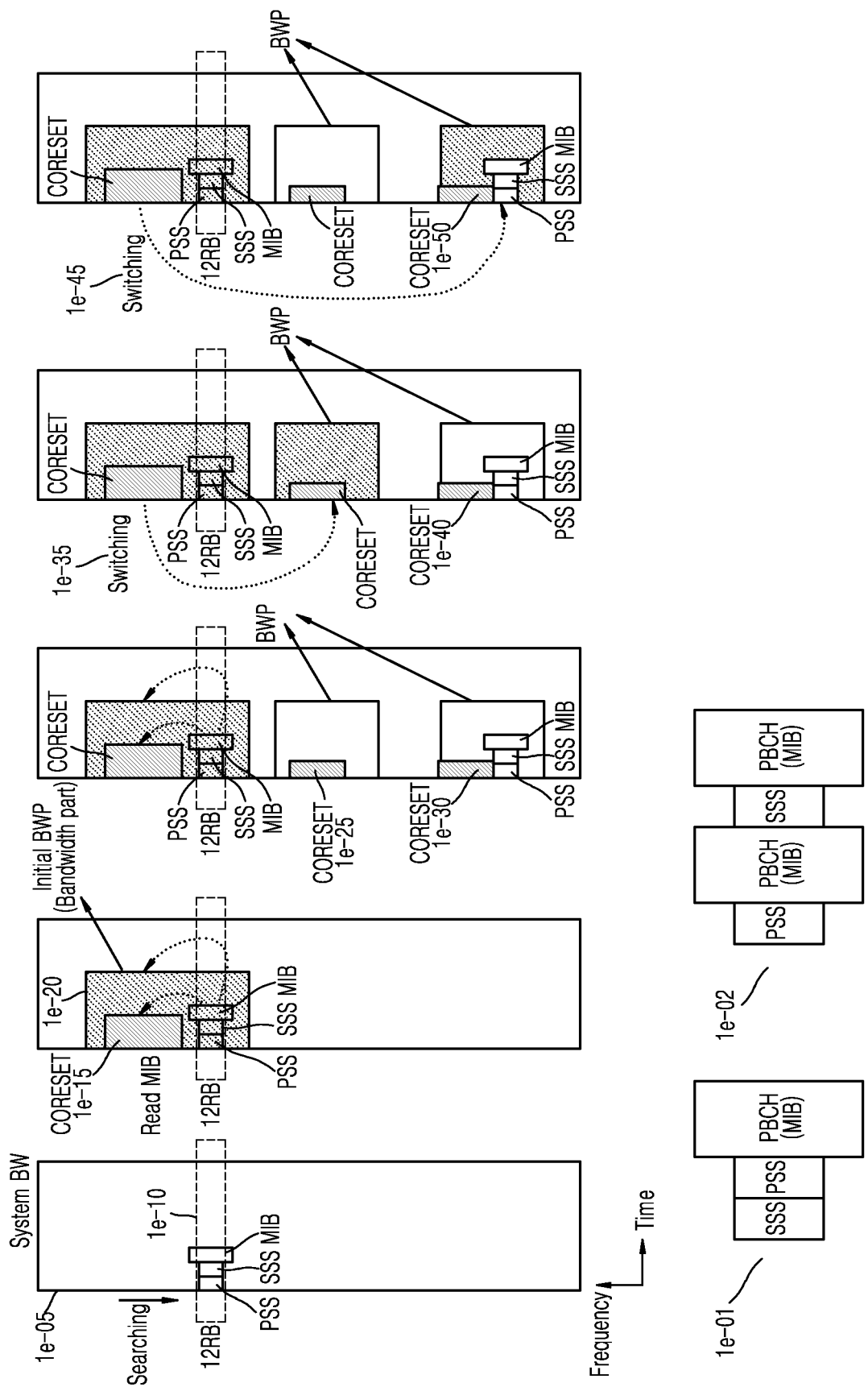
FIG. 1E illustrates a diagram of a procedure of providing a service to a terminal by efficiently using a wide frequency bandwidth in a next-generation mobile communication system, according to an embodiment of the disclosure.
Figure 1F:
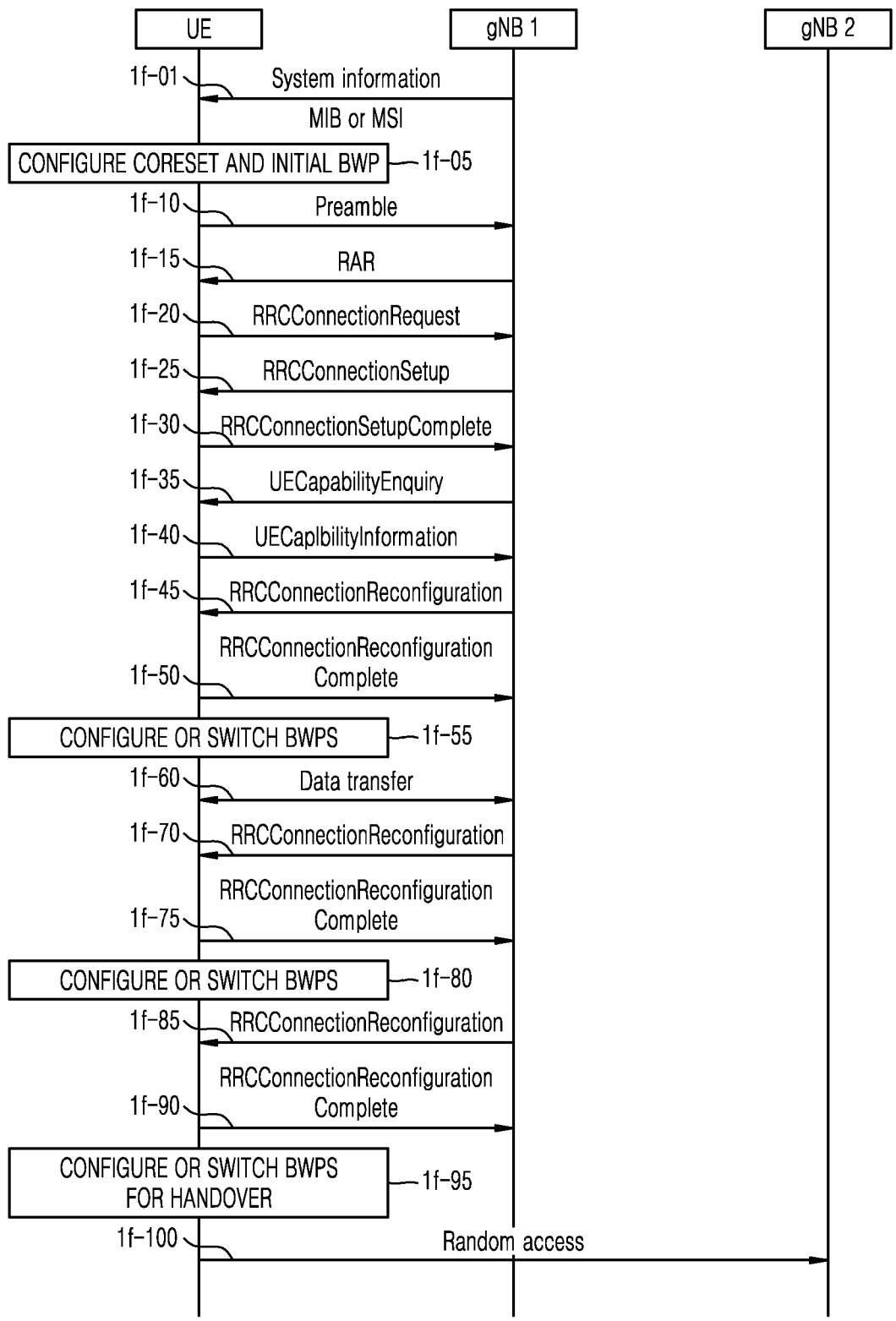
FIG. 1F illustrates a diagram of a procedure by which a terminal switches a mode from a radio resource control (RRC) idle mode to an RRC connected mode in a next-generation mobile communication system, according to an embodiment of the disclosure.
Figure 1G:
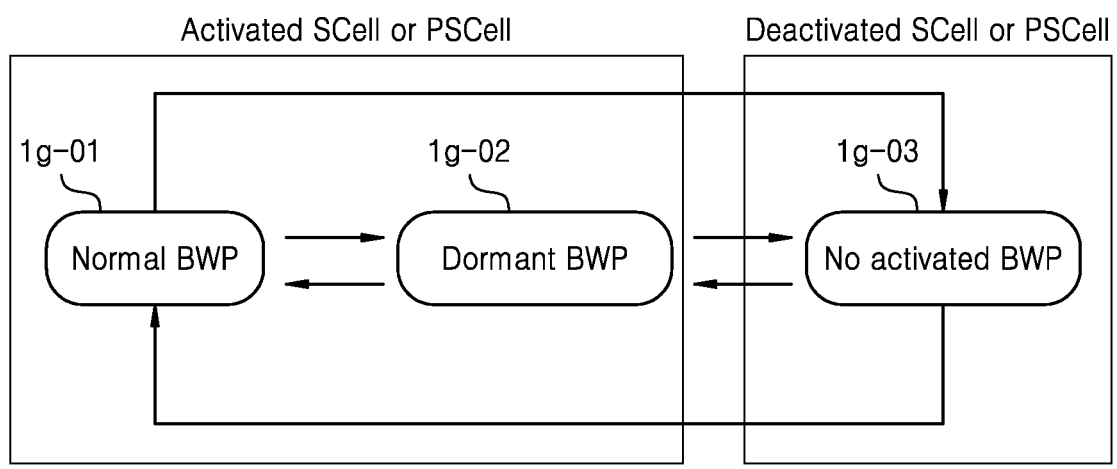
FIG. 1G illustrates a diagram of a state transition or bandwidth part (BWP) switching procedure for each bandwidth, according to an embodiment of the disclosure.
Figure 1H:
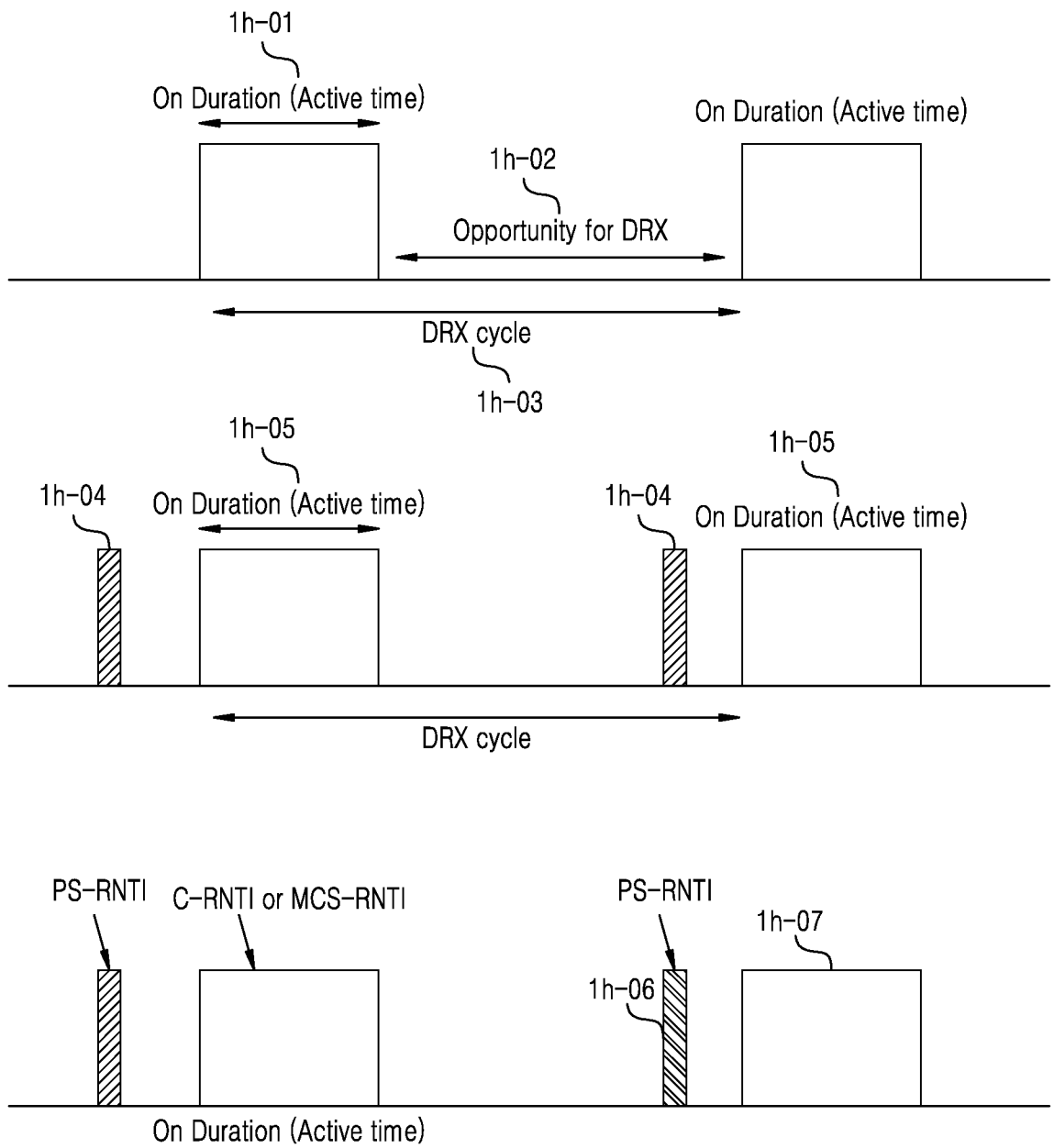
FIG. 1H is a diagram illustrating a discontinuous reception (DRX) configuration or a DRX operation method for reducing battery consumption of a terminal, according to an embodiment of the disclosure.
Figure 1I:
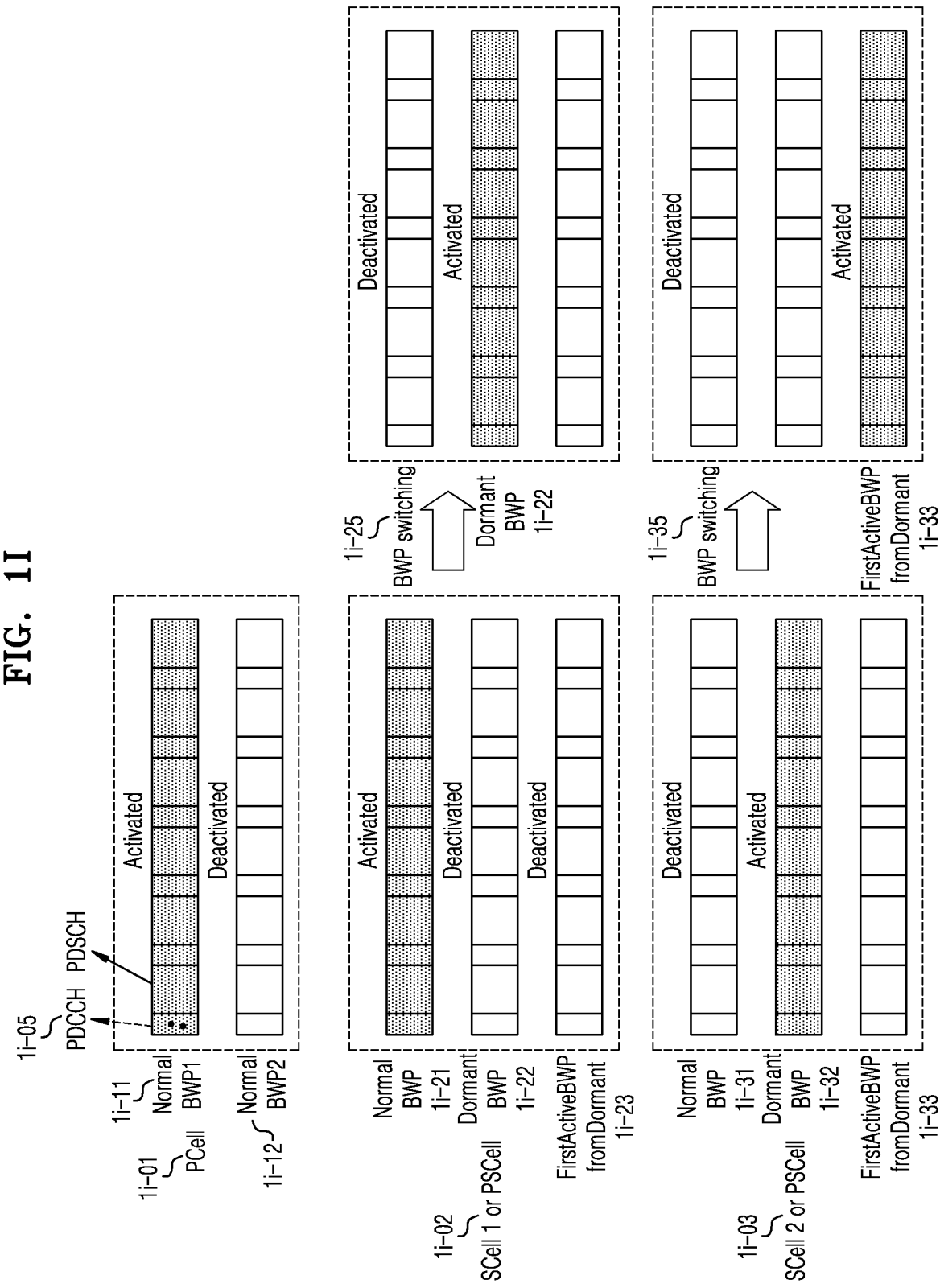
FIG. 1I illustrates a diagram for describing a method of operating a dormant BWP in an activated secondary cell (SCell), according to an embodiment of the disclosure.
Figure 1J:
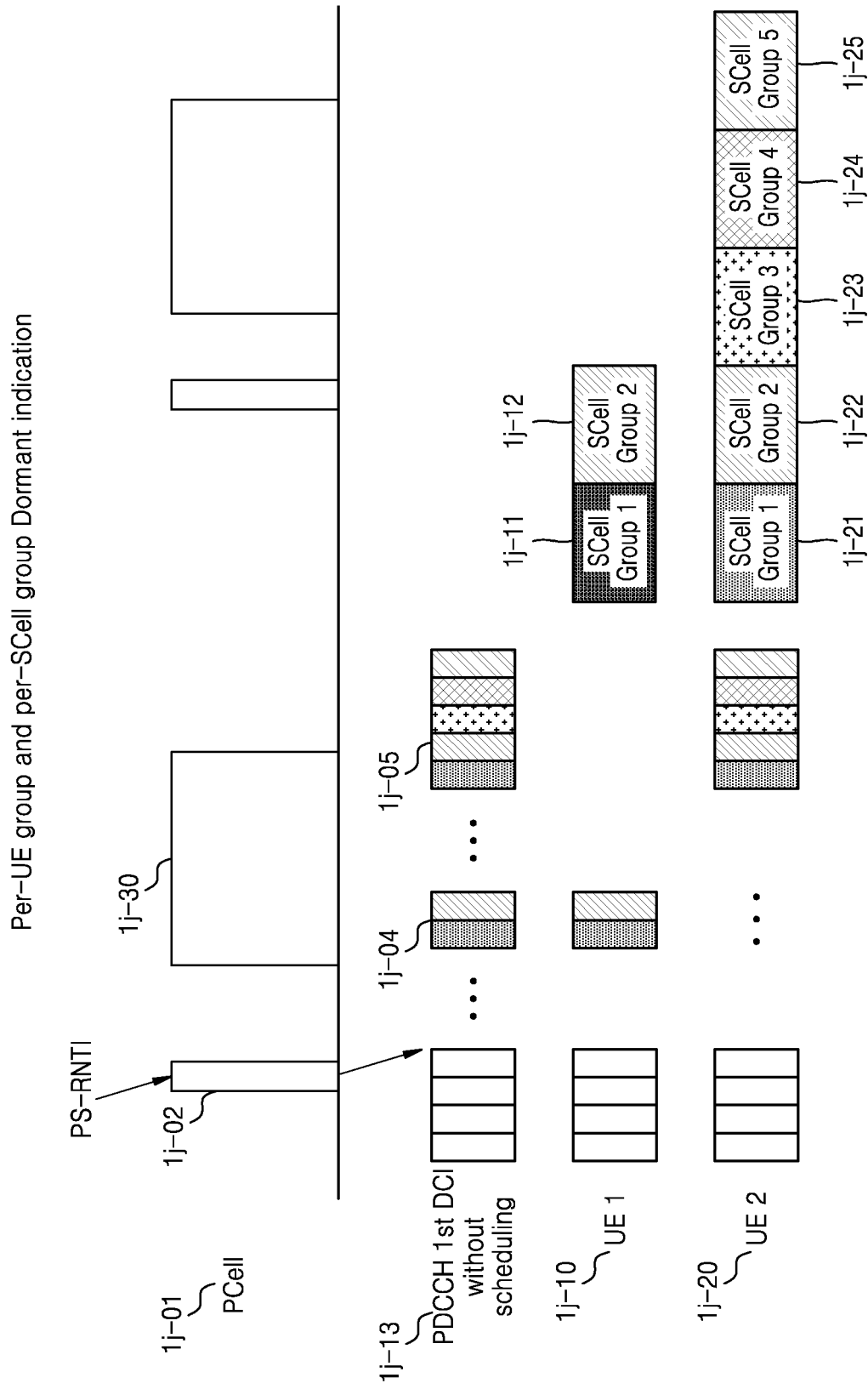
FIG. 1J illustrates Embodiment 1 of a method of operating a dormant BWP in an activated SCell, according to an embodiment of the disclosure.
Figure 1K:
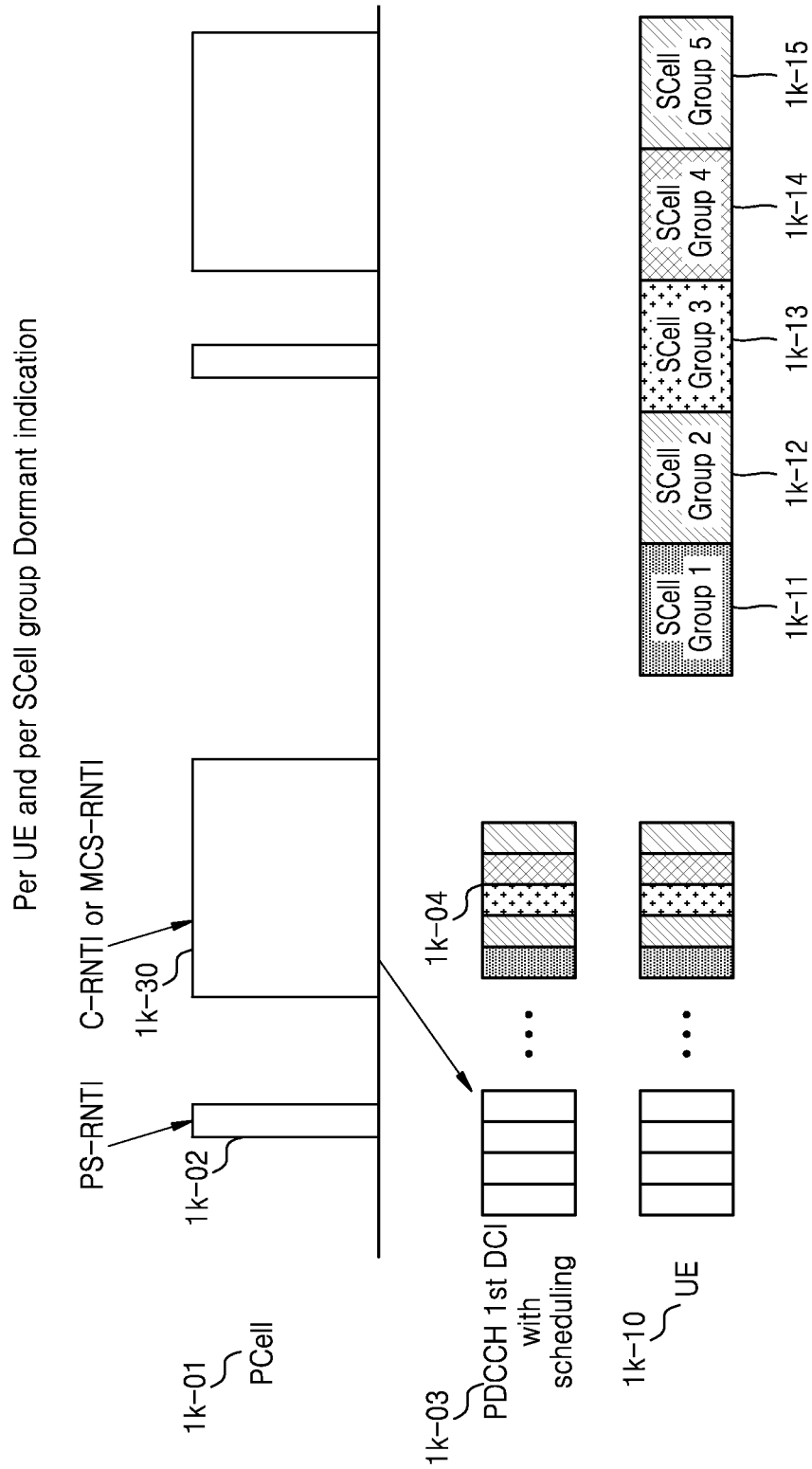
FIG. 1K illustrates Embodiment 2 of a method of operating a dormant BWP in an activated SCell, according to an embodiment of the disclosure.
Figure 1M:
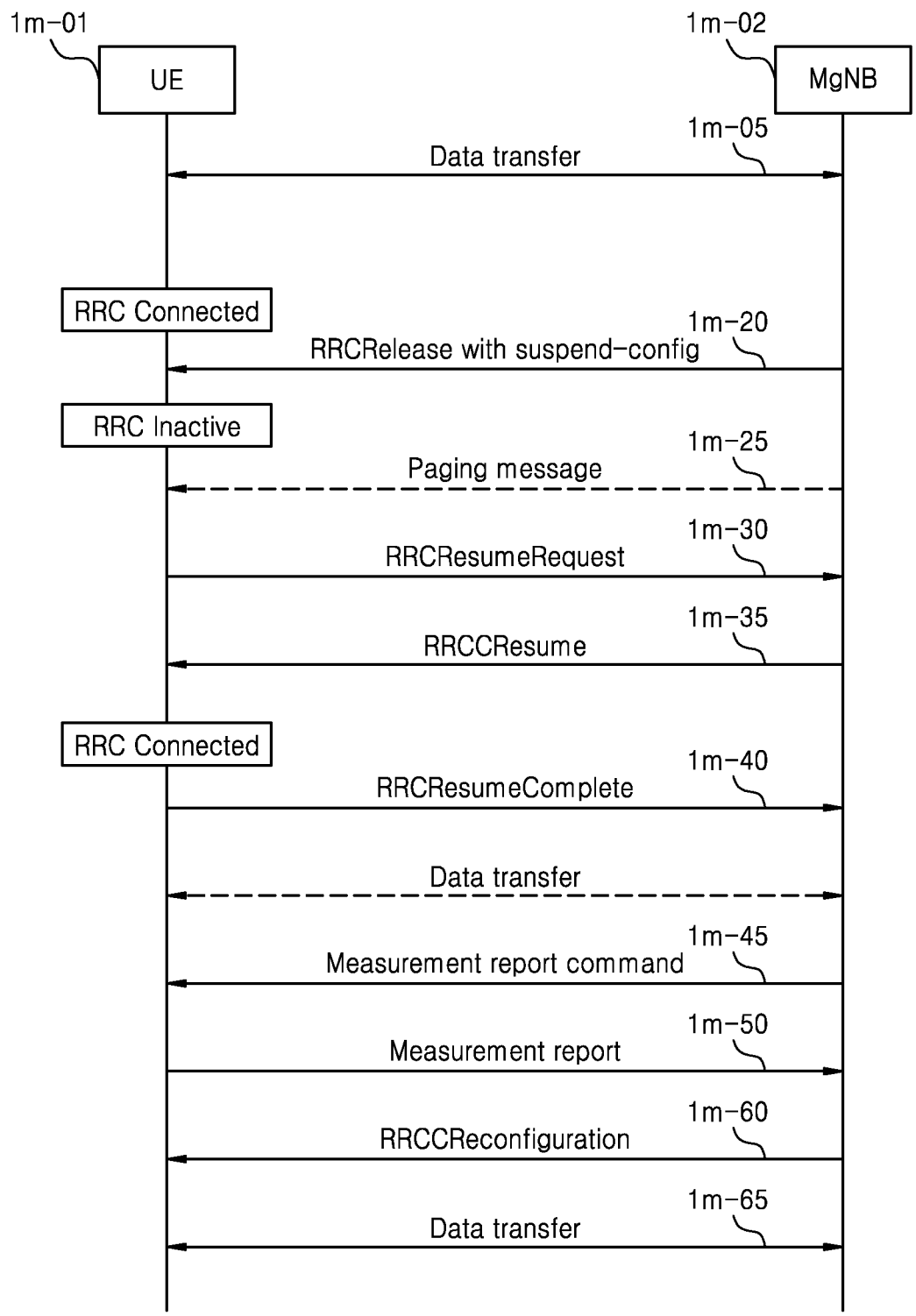
FIG. 1M illustrates a diagram showing Embodiment 4 of extending and further applying Embodiment 1, Embodiment 2, or Embodiment 3 of the disclosure to an RRC inactive mode terminal.
Figure 1N:
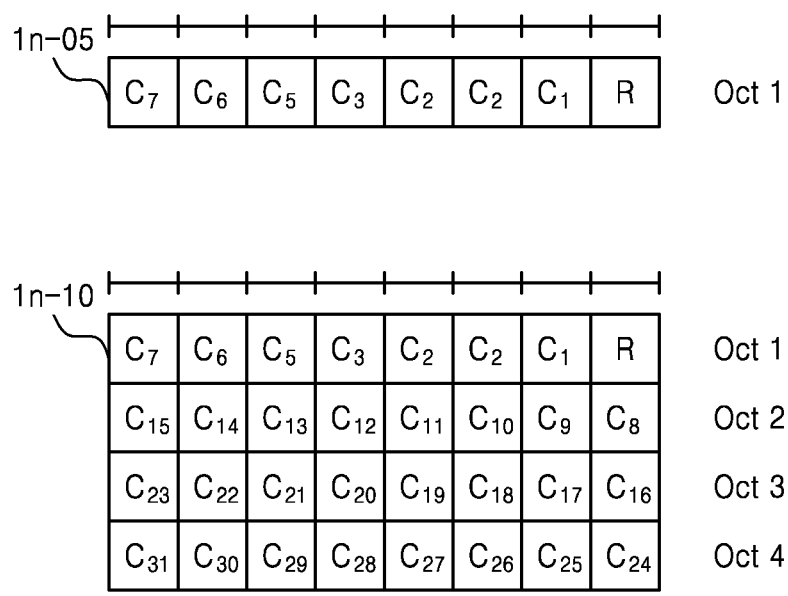
FIG. 1N illustrates a diagram of media access control (MAC) control information indicating state transition to an active state, a dormant state, or an inactive state, according to an embodiment of the disclosure.
Figure 1P:
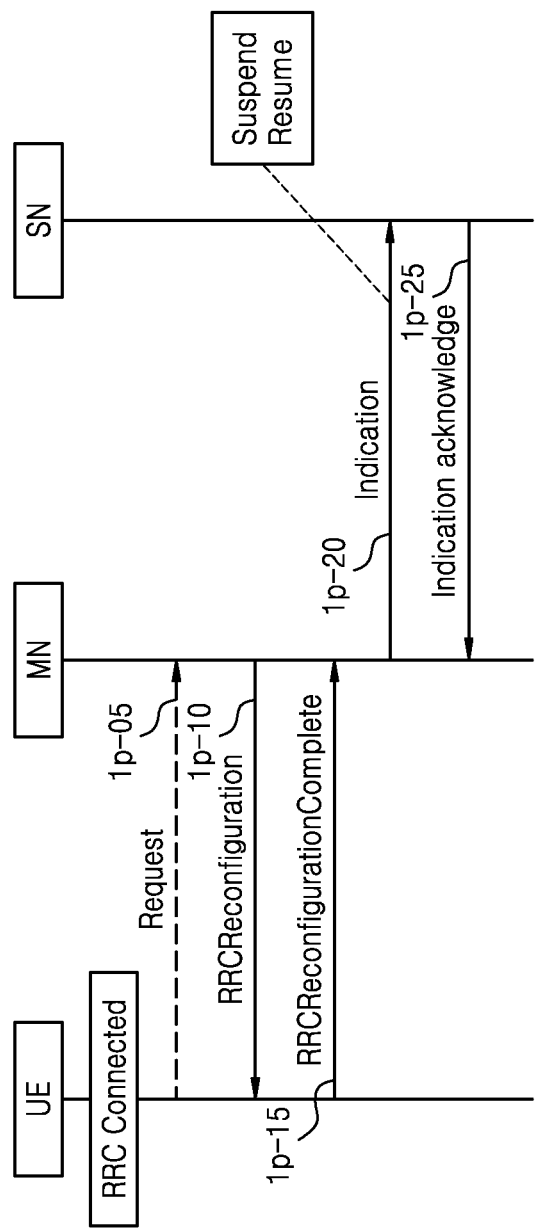
FIG. 1P illustrates a flowchart of a second signaling procedure of configuring or releasing dual connectivity, or configuring, releasing, activating, resuming, suspending, or deactivating an SCG configured with dual connectivity, according to an embodiment of the disclosure.
Figure 1Q:
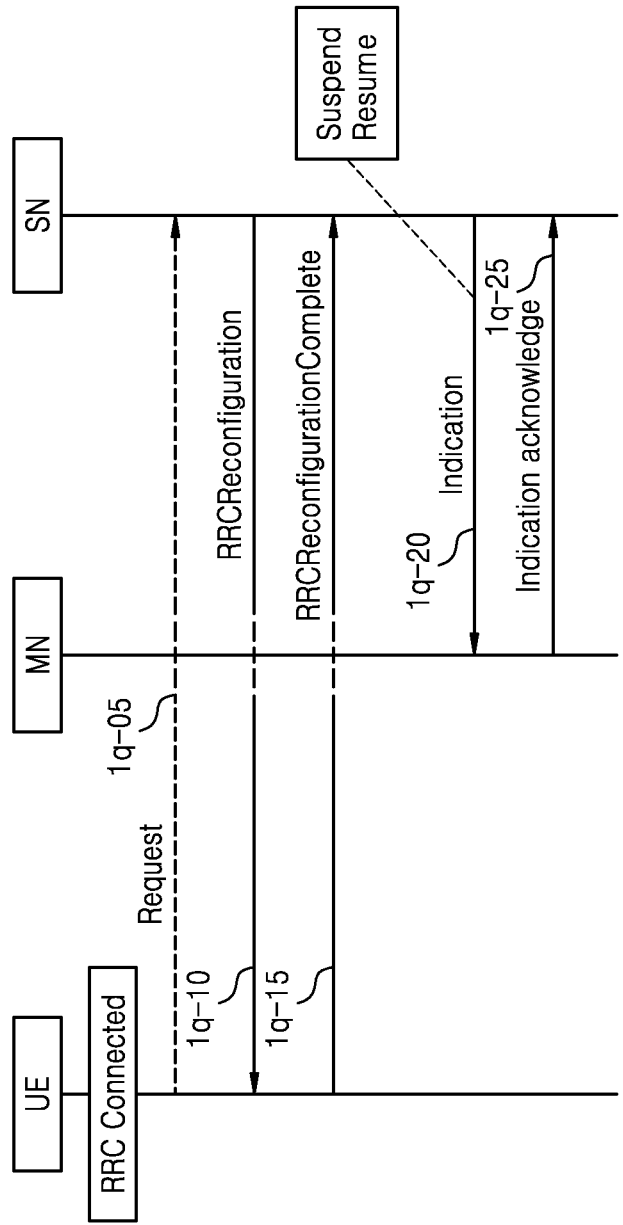
FIG. 1Q illustrates a flowchart of a third signaling procedure of configuring or releasing dual connectivity, or configuring, releasing, activating, resuming, suspending, or deactivating an SCG configured with dual connectivity, according to an embodiment of the disclosure.
Figure 1R:
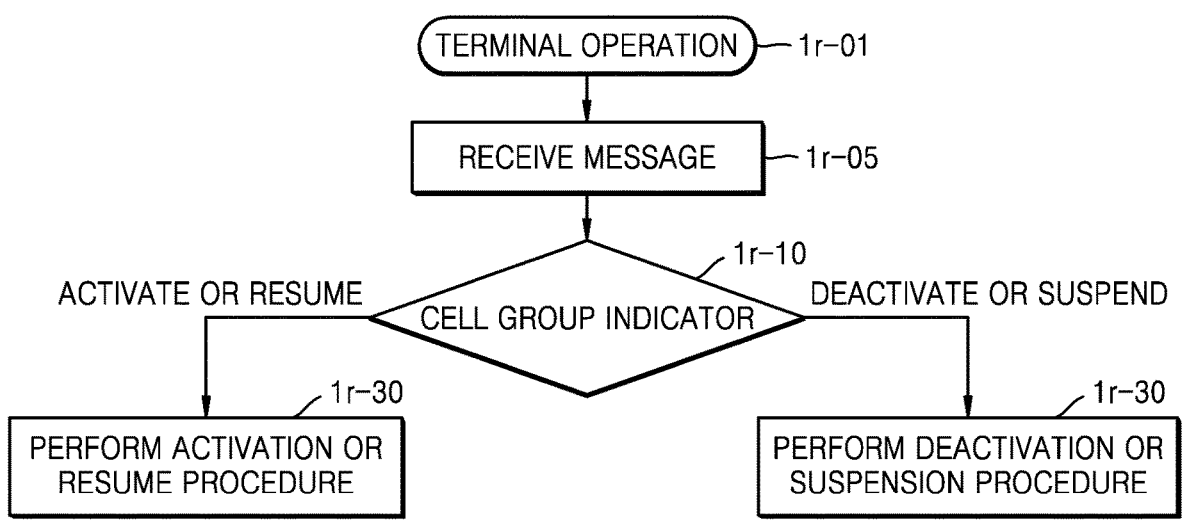
FIG. 1R illustrates a diagram of an operation of a terminal, according to an embodiment of the disclosure.
Figure 1S:
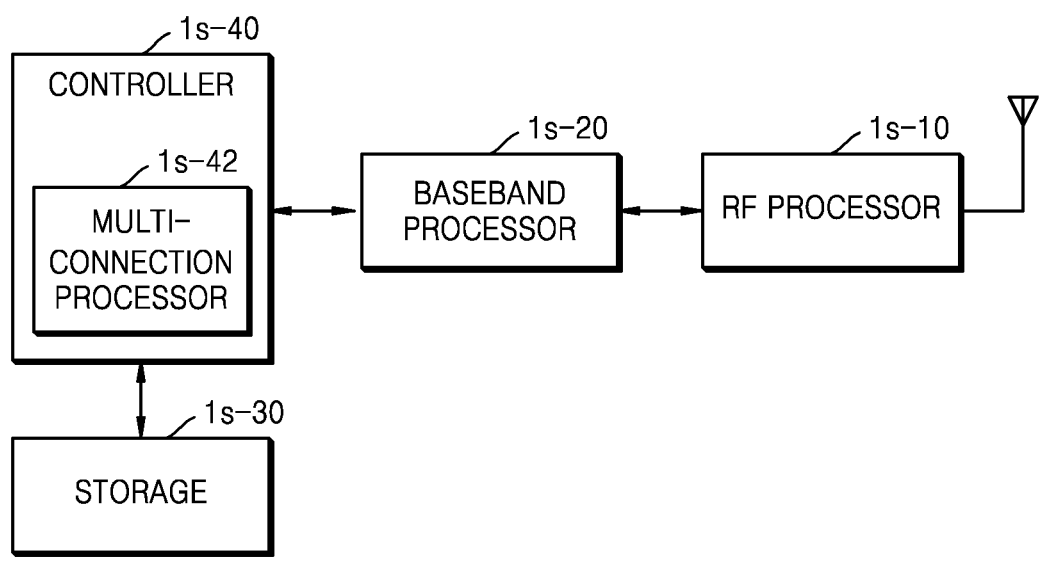
FIG. 1S illustrates a block diagram of a structure of a terminal, according to an embodiment of the disclosure.
Figure 1T:
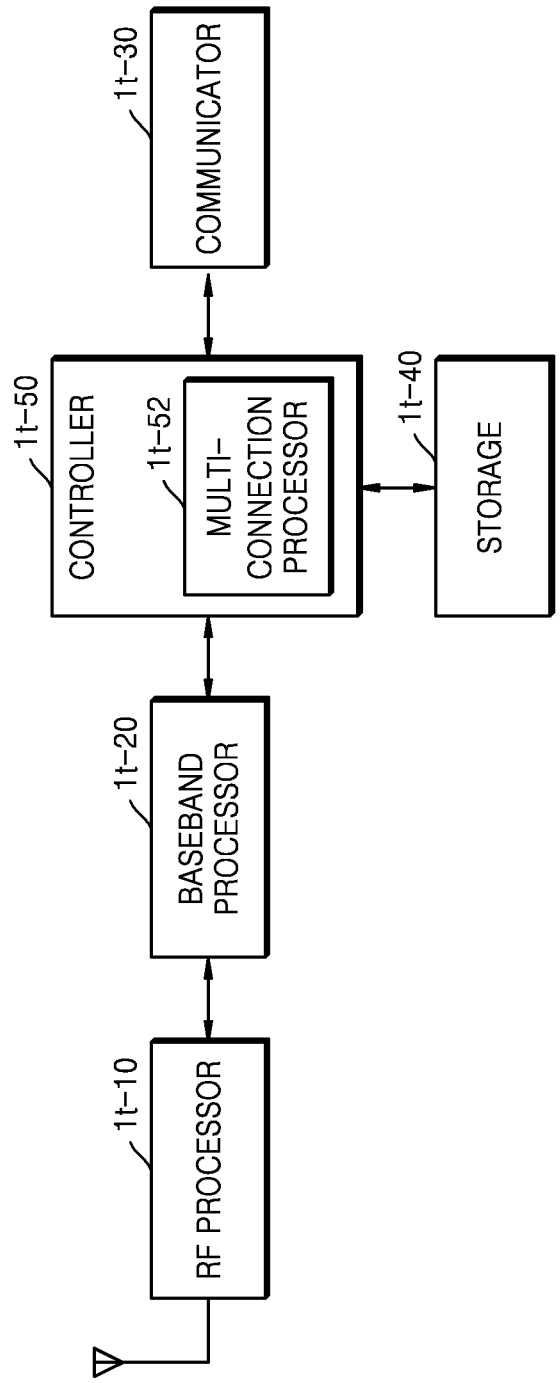
FIG. 1T illustrates a block diagram of a configuration of a transmission and reception point (TRP) device in a wireless communication system, according to an embodiment of the disclosure.

FIGS. 1A through 1T, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Hereinafter, embodiments of the disclosure will be described in detail with reference to the accompanying drawings. In the following description of embodiments of the disclosure, descriptions of techniques that are well known in the art and not directly related to the disclosure are omitted. This is to clearly convey the gist of the disclosure by omitting an unnecessary description.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or layer apparatus) may also be referred to as an entity.

For the same reason, some elements in the drawings are exaggerated, omitted, or schematically illustrated. In addition, the size of each element may not substantially reflect its actual size. In each drawing, the same or corresponding element is denoted by the same reference numeral.

The advantages and features of the disclosure, and methods of achieving the same, will become apparent with reference to the embodiments of the disclosure described below in detail in conjunction with the accompanying drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-usable or computer-readable memory that may direct a computer or other programmable data processing equipment to function in a particular manner, the instructions stored in the computer-usable or computer-readable memory may produce a manufactured article including instruction means that implement the functions specified in the flowchart block(s). Because the computer program instructions may also be loaded onto a computer or other programmable data processing equipment, a series of operational steps may be performed on the computer or other programmable data processing equipment to produce a computer-executable process, and thus the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order shown. For example, two blocks shown in succession may actually be executed substantially concurrently or the blocks may sometimes be executed in a reverse order, depending upon the functionality involved.

The term "~ unit" used in the present embodiment of the disclosure refers to a software or hardware component, such as a field-programmable gate array (FPGA) or an application-specific integrated circuit (ASIC), which performs certain tasks. However, "~ unit" does not mean to be limited to software or hardware. The term "~ unit" may be configured to be in an addressable storage medium or may be configured to operate one or more processors. Thus, "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or further separated into additional components and "~ units". Furthermore, components and "~ units" may be implemented to operate one or more central processing units (CPUs) in a device or a secure multimedia card. Also, a unit in an embodiment of the disclosure may include one or more processors.

Hereinafter, terms for identifying access nodes, terms indicating network entities, terms indicating messages, terms indicating interfaces between network entities, and terms indicating various identification information used herein are exemplified for convenience of explanation.

Accordingly, the terms used in the disclosure are not limited and other terms denoting targets having the same technical meanings may be used.

Hereinafter, some terms and names defined in the 3$^{rd}$ generation partnership project long term evolution (3GPP LTE) standard may be used for convenience of explanation. However, the disclosure may not be limited to the terms and names, and may also be applied to systems following other standards. In the disclosure, an evolved node B (eNB) may be interchangeably used with a next-generation node B (gNB) for convenience of explanation. That is, a base station described as an eNB may refer to a gNB. Also, the term "terminal" may refer to other wireless communication devices as well as mobile phones, NB-IoT devices, and sensors.

In a next-generation mobile communication system, in order to provide a service having a high data rate and low transmission latency to a terminal, carrier aggregation (CA) or dual connectivity (DC) may be used. However, a method of preventing processing latency which may occur when carrier aggregation or dual connectivity is configured and activated in a terminal connected to a network or when carrier aggregation or dual connectivity is used and then deactivated is required. In particular, when a terminal maintains a plurality of cells in an active state in order to use carrier aggregation or dual connectivity, the terminal should perform physical downlink control channel (PDCCH) monitoring for each of the plurality of cells, thereby increasing battery consumption of the terminal. In contrast, when a terminal maintains a plurality of cells in an inactive state in order to reduce battery consumption of the terminal, data transmission/reception latency may occur due to latency occurring when the plurality of cells are activated when carrier aggregation or dual connectivity is used. In the disclosure, a cell may refer to a primary cell (PCell), a secondary cell (SCell) (e.g., SCell configured in a master cell group (MCG)), a primary secondary cell (PSCell) (e.g., PCell of a secondary cell group (SCG)), or a SCell (e.g., SCell configured in the SCG).

The disclosure provides a new dormant mode, suspension mode, or inactive mode so that an RRC connected mode terminal connected to a network in a next-generation mobile communication system rapidly activates and deactivates carrier aggregation or dual connectivity. The disclosure provides a method of operating a new dormant (hibernation, dormancy, or suspension) mode in units of bandwidth parts (BWPs) (BWP-level), in units of cells, or in units of cell groups (e.g., SCGs), to rapidly activate carrier aggregation or dual connectivity and reduce battery consumption of a terminal.

FIG. 1A illustrates a diagram of a structure of an LTE system, according to an embodiment of the disclosure.

Referring to FIG. 1A, a radio access network of an LTE system may include next-generation base stations (hereinafter, evolved node Bs (ENBs), node Bs, or base stations) 1a-05, 1a-10, 1a-15, and 1a-20, a mobility management entity (MME) 1a-25, and a serving-gateway (S-GW) 1a-30. A user terminal (hereinafter, a user equipment (UE) or a terminal) 1a-35 may access an external network via the ENBs 1a-05 through 1a-20 and the S-GW 1a-30.

In FIG. 1A, ENBs 1a-05 through 1a-20 may correspond to existing node Bs of a universal mobile telecommunication system (UMTS). The ENBs are connected to the UE 1a-35 via a wireless channel, and perform a more complex function than the existing node Bs. In the LTE system, all user traffic based on a real-time service, such as a voice over Internet protocol (VoIP) service, is provided through a shared channel, and thus a device that collects state information, such as UEs' buffer states, an available transmission power state, and a channel state, and performs scheduling is required. The ENBs 1a-05 to 1a-20 may be responsible for these functions. One ENB may generally control a plurality of cells. For example, in order to realize a data rate of 100 Mbps, the LTE system may use orthogonal frequency-division multiplexing (OFDM) as a radio access technology, for example, at a bandwidth of 20 MHz. In addition, the LTE system may apply adaptive modulation and coding (AMC), which determines a modulation scheme and a channel coding rate according to a channel state of a UE. The S-GW 1a-30 is a device that provides a data bearer, and may add or release a data bearer under the control of the MME 1a-25. The MME 1a-25 is a device that performs not only a mobility management function for the UE but also various control functions, and may be connected to a plurality of base stations.

FIG. 1B illustrates a diagram of a radio protocol architecture in an LTE system, according to an embodiment of the disclosure.

Referring to FIG. 1B, a radio protocol of an LTE system may include packet data convergence protocols (PDCPs) 1b-05 and 1b-40, radio link controls (RLCs) 1b-10 and 1b-35, and media access controls (MACs) 1b-15 and 1b-30 respectively at a UE and an ENB.

The PDCPs 1b-05 and 1b-40 may be responsible for IP header compression/decompression or the like. The main functions of the PDCPs are summarized as follows. However, the disclosure is not limited to the following examples.

- Header compression and decompression: robust header compression (ROHC) only
- Transfer of user data
- In-sequence delivery of upper layer packet data units (PDUs) at PDCP re-establishment procedure for RLC acknowledged mode (AM)
- For split bearers in DC (only support for RLC AM): PDCP PDU routing for transmission and PDCP PDU reordering for reception
- Duplicate detection of lower layer SDUs at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink The RLCs 1b-10 and 1b-35 may reconstruct a PDCP PDU to have an appropriate size, and may perform an automatic repeat request (ARQ) operation. The main functions of the RLCs are summarized as follows. However, the disclosure is not limited thereto.

- Transfer of upper layer PDUs
- ARQ (error correction through ARQ (only for AM data transfer))
- Concatenation, segmentation, and reassembly of RLC SDUs (only for unacknowledged (UM) and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MACs 1b-15 and 1b-30 may be connected to a plurality of RLC layers configured in one UE, may multiplex RLC PDUs into a MAC PDU, and may demultiplex a MAC PDU from RLC PDUs. The main functions of the MACs are summarized as follows. However, the disclosure is not limited to the following examples.

Mapping between logical channels and transport channels
    Multiplexing/demultiplexing of MAC SDUs belonging to one or different logical channels into/from transport blocks (TB) delivered to/from the physical layer on transport channel s
    Scheduling information reporting
    Hybrid automatic repeat request (HARQ) (error correction through HARQ)
    Priority handling between logical channels of one UE
    Priority handling between UEs by means of dynamic scheduling
    Multimedia broadcast multicast service (MBMS) identification
    Transport format selection
    Padding Physical (PHY) layers 1b-20 and 1b-25 may channel-code and modulate upper layer data, may convert the data into OFDM symbols, and may transmit the OFDM symbols via a wireless channel, or may demodulate OFDM symbols received via a wireless channel, may channel-decode the OFDM symbols, and may deliver the OFDM symbols to a higher layer. However, the disclosure is not limited to the following examples.

FIG. 1C illustrates a diagram of a structure of a next-generation mobile communication system, according to an embodiment of the disclosure.

Referring to FIG. 1C, a radio access network of a next-generation mobile communication system (hereinafter, referred to as NR or 5G) may include a next generation base station (e.g., new radio node B (NR gNB) or NR base station) 1c-10 and a new radio core network (NR CN) 1c-05. A user terminal (e.g., new radio user equipment (NR UE) or a terminal) 1c-15 may access an external network 1c-20 through the NR gNB 1c-10 and the NR CN 1c-05.

In FIG. 1C, the NR gNB 1c-10 corresponds to an evolved node B (eNB) of an existing LTE system. The NR gNB 1c-10 is connected to the NR UE 1c-15 via a wireless channel, and may provide a better service than the existing eNB. In the next-generation mobile communication system, all user traffic is provided through a shared channel, and thus a device that collects state information, such as UEs' buffer states, an available transmission power state, and a channel state, and performs scheduling is required. The NR gNB 1c-10 is responsible for these functions. One NR gNB 1c-10 generally controls a plurality of cells. In order to implement ultra-high speed data transmission in comparison with current LTE, an existing maximum bandwidth or more may be provided and beamforming may be additionally applied by using OFDM as a radio access technology. Also, AMC may be applied to determine a modulation scheme and a channel coding rate according to a channel state of a UE. The NR CN 1c-05 may perform functions such as mobility support, bearer configuration, and quality of service (QoS) configuration. The NR CN 1c-05 is a device that performs various control functions as well as a mobility management function for the UE, and may be connected to a plurality of base stations. Also, the next-generation mobile communication system may interoperate with the existing LTE system, and the NR CN 1c-05 may be connected to an MME 1c-25 via a network interface. The MME 1c-25 may be connected to an eNB 1c-30, which is an existing base station.

FIG. 1D illustrates a diagram of a radio protocol architecture of a next-generation mobile communication system, according to an embodiment of the disclosure.

Referring to FIG. 1D, a radio protocol of a next-generation mobile communication system includes NR service data adaptation protocols (SDAPs) 1d-01 and 1d-45, NR packet data convergence protocols (PDCPs) 1d-05 and 1d-40, NR RLCs 1d-10 and 1d-35, and NR MACs 1d-15 and 1d-30, respectively at a UE and an NR base station.

The main functions of the NR SDAPs 1d-01 and 1d-45 may include some of the following functions. However, the disclosure is not limited to the following examples.

Transfer of user plane data
    Mapping between a QoS flow and a data radio bearer (DRBP for both DL and UL)
    Marking QoS flow ID in both DL and UL packets
    Reflective QoS flow to DRB mapping for the UL SDAP PDUs Regarding an SDAP layer, the UE may receive a configuration about whether to use a header of the SDAP layer or whether to use a function of the SDAP layer for each PDCP layer, each bearer, or each logical channel via a radio resource control (RRC) message. When an SDAP header is configured, a one-bit non-access stratum (NAS) QoS reflective indicator (NAS reflective QoS) and a one-bit AS QoS reflective indicator (AS reflective QoS) of the SDAP header may indicate the UE to update or reconfigure mapping information between a QoS flow and a data bearer for uplink and downlink. The SDAP header may include QoS flow ID information indicating the QoS. The QoS information may be used as a data-processing priority, scheduling information, or the like in order to support a smooth service.

The main functions of the NR PDCPs 1d-05 and 1d-40 may include some of the following functions. However, the disclosure is not limited to the following examples.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink A reordering function of an NR PDCP device may include a function of reordering PDCP PDUs received from a lower layer in order based on a PDCP sequence number (SN) and a function of transmitting data to a higher layer in a reordered sequence. Alternatively, a reordering function of an NR PDCP device may include a function of directly transmitting without consideration of a sequence, a function of reordering a sequence and recording missing PDCP PDUs, a function of reporting states of the missing PDCP PDUs to a transmitting side, and a function of requesting retransmission of the missing PDCP PDUs.

The main functions of the NR RLCs 1d-10 and 1d-35 may include some of the following functions. However, the disclosure is not limited to the following examples.

Transfer of upper layer PDUs
    In-sequence delivery of upper layer PDUs
    Out-of-sequence delivery of upper layer PDUs
    ARQ (error correction through ARQ)
    Concatenation, segmentation and reassembly of RLC SDUs
    Re-segmentation of RLC data PDUs
    Reordering of RLC data PDUs
    Duplicate detection Protocol error detection RLC SDU discard RLC re-establishment An in-sequence delivery function of an NR RLC device refers to a function of delivering RLC SDUs received from a lower layer to a higher layer in order. An in-sequence delivery function of an NR RLC device may include at least one of a function of, when one original RLC SDU is segmented into multiple RLC SDUs and received, reassembling and transmitting the received RLC SDUs, a function of reordering the received RLC PDUs based on an RLC sequence number (SN) or a PDCP sequence number (SN), a function of reordering a sequence and recording missing RLC PDUs, a function of reporting states of the missing RLC PDUs to a transmitting side, a function of requesting retransmission of the missing RLC PDUs, a function of, when there is a missing RLC SDU, sequentially transmitting only RLC SDUs before the missing RLC SDU to a higher layer, a function of, when a certain timer has expired even when there is a missing RLC SDU, sequentially transmitting all RLC SDUs received before the start of the timer to a higher layer, or a function of, when a certain timer has expired even when there is a missing RLC SDU, sequentially transmitting all RLC SDUs received until that time to a higher layer.

Also, through an out-of-sequence delivery function of an NR RLC layer, RLC PDUs may be processed in order of reception (in order of arrival regardless of the order of sequence numbers) and then transmitted to a PDCP device regardless of a sequence, and segments stored in a buffer or to be received may be received, reconfigured into one complete RLC PDU, and then processed and transmitted to the PDCP device. The NR RLC layer may not include a concatenation function, and the concatenation function may be performed in an NR MAC layer, or may be replaced with a multiplexing function of the NR MAC layer.

An out-of-sequence delivery function of an NR RLC device may include a function of directly delivering RLC SDUs received from a lower layer to a higher layer regardless of order. An out-of-sequence delivery function of an NR RLC device may include at least one of a function of, when one RLC SDU is segmented into multiple RLC SDUs and received, reassembling and transmitting the received RLC SDUs or a function of storing an RLC SN or PDCP SN of the received RLC PDUs, ordering a sequence, and recording missing RLC PDUs.

The NR MACs 1d-15 and 1d-30 may be connected to a plurality of NR RLC layers configured in one UE, and the main functions of the NR MACs may include some of the following functions. However, the disclosure is not limited to the following examples.

Mapping between logical channels and transport channels

Multiplexing/demultiplexing of MAC SDUs

Scheduling information reporting

HARQ (error correction through HARQ)

Priority handling between logical channels of one UE

Priority handling between UEs by means of dynamic scheduling

MBMS identification

Transport format selection

Padding

NR PHY layers 1d-20 and 1d-25 may channel-code and modulate higher layer data, may convert the data into OFDM symbols, and may transmit the OFDM symbols via a wireless channel, or may demodulate OFDM symbols received via a wireless channel, may channel-decode the OFDM symbols, and may deliver the OFDM symbols to a higher layer.

Because next-generation mobile communication systems may use very high band frequencies, frequency bandwidths may also be very wide. However, supporting all of the very wide bandwidths requires high complexity and incurs high cost. Accordingly, next-generation mobile communication systems may introduce the concept of a bandwidth part (BWP), and may configure a plurality of BWPs in one cell (e.g., SPCell or SCell) and may transmit/receive data in one or more BWPs according to an indication of a base station.

The disclosure provides a state transition method or a BWP switching method and a specific operation thereof in consideration of a state of a secondary cell (SCell) and a plurality of BWPs configured in the SCell when a dormant BWP according to the disclosure is introduced. Also, the disclosure provides a method of managing a dormant mode in units of BWPs (BWP-level) and performing state transition or a BWP switching method. Also, the disclosure provides a specific operation of a BWP according to a state of each SCell, or a state or mode of each BWP (e.g., active, inactive mode, or dormant).

According to an embodiment of the disclosure, a plurality of BWPs may be configured for each DL or each UL in one cell (e.g., an SPCell or a PCell), and through BWP switching, an active BWP (active DL or UL BWP), a dormant BWP (dormant BWP or dormant DL BWP), or an inactive BWP (inactive or deactivated DL/UL BWP) may be configured and operated. That is, a data rate may be increased in a method similar to carrier aggregation by transitioning a DL or UL BWP for one cell to an activate state. Also, battery consumption may be reduced by allowing a terminal not to perform PDCCH monitoring on a cell by transitioning or switching a DL BWP to a dormant BWP. Also, rapid cell or BWP activation may be supported by allowing a terminal to perform channel measurement on a DL BWP and report a channel measurement result. Also, battery consumption of a terminal may be reduced by transitioning a DL (or UL) BWP in one cell to an inactive state. A BWP-by-BWP state transition indication or a BWP switching indication for each cell may be configured and indicated through an RRC message, a MAC control element (CE), or downlink control information (DCI) of a PDCCH. A dormant BWP may also be extended and applied to dual connectivity, for example, to a PSCell of an SCG. According to an embodiment of the disclosure, a dormant BWP may be extended and applied to the concept of cell group suspension or cell group deactivation. A base station may indicate cell group suspension or deactivation to one cell group (e.g., SCG) of a terminal in which dual connectivity is configured, to suspend data transmission or reception, suspend PDCCH monitoring, or intermittently perform PDCCH monitoring with a very long period in the indicated cell group, thereby reducing power consumption of the terminal. Upon receiving an indication to suspend or deactivate a cell group, a terminal may perform a channel measurement procedure in the cell group that is indicated to be suspended or deactivated, and may report a channel measurement result to a network (e.g., an MCG or an SCG), thereby supporting rapid activation of dual connectivity. For a cell group that is indicated to be suspended or deactivated, a terminal may perform a channel measurement procedure, or may maintain and store cell group configuration information without discarding or releasing the cell group configuration information, or may recover the cell group configuration information according to a cell group activation or resumption indication of a network. For example, configuration information of a cell group configured in a terminal (e.g., configuration information or bearer configuration information of each PDCP, RLC, or MAC layer) or configuration information of each cell may be stored or maintained as it is. Upon receiving an indication to resume or activate a cell group that is indicated to be suspended or deactivated, a terminal may resume, recover, or re-apply configuration information of the cell group, may resume a bearer, or may re-start data transmission or reception, or may re-start PDCCH monitoring, may perform channel measurement reporting, and may periodically reactivate configured transmission resources.

Cell group configuration information, or previously configured cell group configuration information, or a message indicating cell group activation or resumption (e.g., an RRC message or an RRCReconfiguration) may include first channel measurement configuration information for rapid cell group activation. In order to rapidly activate a cell group and rapidly perform channel measurement in a cell (e.g., a PCell, a PSCell, or an SCell) of the cell group, the first channel measurement configuration information may be included and configured in configuration information of the cell. For example, in order for a base station to transmit often or many channel measurement signals (channel measurement signal may be a reference signal), the first channel measurement configuration information may include configuration information such as a period for a frequent channel measurement signal (e.g., a radio resource), or transmitted transmission resource information (frequency or time transmission resource through which the frequent channel measurement signal is transmitted), or an interval or a count (the number of times the frequent channel measurement signal is transmitted), or a timer value (time when the frequent channel measurement signal is transmitted), or a period (interval in which the frequent channel measurement signal is transmitted (e.g., time unit (a slot, a subframe, or a symbol)), or a transmission resource, a period, an interval, or a timing for reporting measurement result of a terminal. By using first channel measurement configuration information, a base station may not only simply configure a short reporting period (or transmission resource) for reporting a channel measurement result of a terminal, but also configure a transmission resource for channel measurement so that the base station transmits frequently or many channel measurement signals (or transmission resources) to support rapid channel measurement or many signal measurements.

Also, cell group configuration information, or previously configured cell group configuration information, or a message indicating cell group activation or resumption (e.g., an RRC message or an RRCReconfiguration) may include second channel measurement configuration information for measuring a signal of a cell (a PSCell, a PCell, or an SCell) of a cell group. The second channel measurement configuration information may include general channel measurement configuration information such as a transmission resource, a period, a period, or a count of a channel measurement signal, or a transmission resource, a period, or a period for channel measurement reporting.

In an embodiment of the disclosure, a terminal may measure a channel and may report a measurement result to a base station by applying first channel measurement configuration information or second channel measurement configuration information according to the following conditions.

1> When a terminal receives a message (e.g., a PDCCH indicator, MAC control information (or element, hereinafter MAC control information may be referred to as MAC CE), or an RRC message) indicating to activate (or resume) a cell (a PCell, a PSCell, or an SCell) or a cell group 2> When first channel measurement configuration information is configured in the terminal 3> The terminal may identify that a base station is to frequently transmit many channel measurement signals according to the first channel measurement configuration information, and may measure many or frequent channel measurement signals temporarily (e.g., till a period (e.g., a subframe, a slot, or a symbol) configured in the first channel measurement configuration information, or during a promised (or pre-determined) period, or during a certain period of time (e.g., while a timer is running), or until a first condition is satisfied) according to the first channel measurement configuration information. Also, according to a period or a transmission resource configured in the first channel measurement configuration information, the terminal may report a channel measurement result till a period configured in the first channel measurement configuration information (e.g., a subframe, a slot, or a symbol), or during a promised (or pre-determined) period, or during a certain period of time (e.g., while a timer is running), or until a first condition is satisfied. Accordingly, because the terminal may rapidly measure a frequent channel measurement signal and may rapidly report a result, the terminal may rapidly activate (or resume) the cell (the PCell, the SCell, or the PSCell), or may rapidly receive scheduling information. When second channel measurement configuration information is configured in the terminal after a period configured in the first channel measurement configuration information (e.g., a subframe, a slot, or a symbol), or after a promised (or pre-determined) period, or after a certain period of time (e.g., when a timer expires), or after a first condition is satisfied, the terminal may stop or release application of the first channel measurement configuration information and may measure a channel measurement signal according to the second channel measurement configuration information. For example, the terminal may fall back from the first channel measurement configuration information to the second channel measurement information or may apply the second channel information instead of the first channel measurement configuration information. Also, the terminal may report a channel measurement result according to a period or a transmission resource configured in the second channel measurement configuration information. When the second channel measurement configuration information is not configured, the terminal may not perform channel measurement.

2> Otherwise (When the first channel measurement configuration information is not configured in the terminal)

3> When the second channel measurement configuration information is configured in the terminal, the terminal may measure a channel measurement signal according to the second channel measurement configuration information. Also, the terminal may report a channel measurement result according to a period or a transmission resource configured in the second channel measurement configuration information. When the second channel measurement configuration information is not configured, the terminal may not perform channel measurement.

In an embodiment of the disclosure, the first channel measurement configuration information may be extended, configured, and used when the cell group (e.g., the PSCell) is activated, or when the cell group is resumed, or when the SCell is activated, or when the RRC connection is resumed in an RRC inactive mode.

In an embodiment of the disclosure, a first condition may be one of the following conditions. Hereinafter, when a first cell is activated, or when a cell group is activated, or when a cell group is resumed, or when an RRC inactive mode terminal resumes connection in an RRC connection resume procedure, efficient conditions under which the base station does not need to transmit unnecessarily many transmission resources or frequently transmission resources are proposed as a first condition. For example, the terminal may apply the first channel measurement configuration information, and may perform a channel measurement procedure or a channel measurement reporting procedure until one of the following conditions is satisfied.

In at least one of a case where the terminal successfully completes a random access procedure in the cell (e.g., the PCell, the SCell, or the PSCell) or the cell (e.g., the PSCell or the SCell) of the cell group, a case where the terminal successfully completes a random access procedure and is allocated a first UL transmission resource, or a case where a UL transmission resource is first indicated to the terminal, the terminal may determine that the first condition is satisfied.

For example, in more detail, when the terminal performs a contention-free random access (CFRA) procedure (e.g., when a pre-designated preamble or a terminal cell identifier (e.g., a cell radio network temporary identifier (C-RNTI)) is allocated)

In at least one of a case where the terminal transmits the pre-designated preamble and receives a random access response (RAR) message or a case where the terminal receives an indication of the PDCCH for an RAR, it may be determined that the random access procedure is successfully completed and thus the terminal may determine that the first condition is satisfied. In another method, when first receiving a UL transmission resource after the RAR reception, the terminal may determine that the first condition is satisfied.

When the terminal performs a contention-based random access (CBRA) procedure (e.g., when a pre-designated preamble or a terminal cell identifier (e.g., C-RNTI) is not allocated)

In at least one of a case where the terminal transmits a preamble (e.g., an arbitrary preamble) to the cell, receives an RAR message, transmits a message 3 (e.g., a handover completion message) by using an UL transmission resource allocated, included, or indicated in the RAR message, and receives a contention resolution MAC CE indicating that contention has been resolved through a message 4 from the base station or a case where the terminal receives a UL transmission resource through the PDCCH corresponding to the C-RNTI of the terminal, it may be determined that the random access procedure to a target base station is successfully completed and thus the terminal may determine that the first condition is satisfied. In another method, when the size of the UL transmission resource allocated in the RAR message is sufficient, the message 3 is transmitted, and the terminal may additionally transmit UL data, it may be determined that the UL transmission resource is received for the first time and the terminal may determine that the first condition is satisfied. That is, when receiving the RAR, the terminal may determine that the UL transmission resource is received for the first time and may determine that the first condition is satisfied.

1> When a 2-step random access procedure is configured or indicated in the terminal and is performed
1> Alternatively, when the 2-step random access procedure is not configured or indicated but the terminal supports the 2-step random access procedure in UE capability, the 2-step random access procedure is supported in system information of the cell, and information for the 2-step random access procedure is broadcast in the system information (e.g., a 2-step random access resource or threshold value for determining whether to or not to perform 2-step random access), the terminal receives the system information and when the strength of a signal is better or greater than the threshold value broadcast in the system information and thus the terminal performs the 2-step random access procedure on the cell,
2> When the 2-step random access procedure is successfully completed, the terminal may determine that the first condition is satisfied.
2> The 2-step random access procedure may be performed by using one of, particularly, a CBRA method or a CFRA method.
3> When the terminal performs the CBRA-based 2-step random access procedure,
4> The terminal may transmit a preamble through a transmission resource for 2-step random access (e.g., a PRACH occasion, transmission resource configured through the RRC message by the base station, or transmission resource broadcast in the system information), and may transmit data (e.g., MsgA MAC PDU) through a transmission resource for data transmission (e.g., a PUSCH occasion). The data may include the MAC control information (C-RNTI MAC CE) including the UE identifier (C-RNTI), or the RRC message (RRCReconfigurationComplete message or handover completion message).
4> The terminal may monitor the PDCCH scrambled by the UE identifier (C-RNTI) or a first identifier (MsgB-RNTI) derived by a time or a frequency at which a preamble is transmitted.
4> When the terminal receives the PDCCH scrambled by the UE identifier, or is allocated a DL transmission resource through the PDCCH, or receives the MAC control information for timing adjustment (timing advance command MAC CE) through the DL transmission resource,
5> The terminal may determine that the 2-step random access procedure is successfully completed and may determine that the first condition is satisfied.
4> When the terminal does not receive the PDCCH scrambled by the first identifier (MsgB-RNTI), or is allocated a DL transmission resource through the PDCCH, or receives a fallback RAR to a preamble transmitted by the terminal through the DL transmission resource (i.e., when the base station receives the preamble but does not receive MsgA, fallback RAR to transmit MsgA through another transmission resource),
5> The terminal may transmit data (MsgA MAC PDU) through a transmission resource indicated in the fallback RAR.
5> The terminal may monitor the PDCCH scrambled by the UE identifier (C-RNTI).
5> When the terminal receives the PDCCH scrambled by the UE identifier or is allocated a UL transmission resource through the PDCCH, the terminal may determine that the 2-step random access procedure is successfully completed and may determine that the first condition is satisfied.

3> When the terminal performs the CFRA-based 2-step random access procedure,

4> The terminal may transmit a preamble through a transmission resource for 2-step random access (e.g., a PRACH occasion or transmission resource designated through the RRC message by the base station), and may transmit data (e.g., MsgA MAC PDU) through a transmission resource for data transmission (e.g., a PUSCH occasion). The data may include the MAC control information (C-RNTI MAC CE) including the UE identifier (C-RNTI) or the RRC message (RRCReconfigurationComplete message or handover completion message).

4> The terminal may monitor the PDCCH scrambled by the UE identifier (C-RNTI) or the first identifier (MsgB-RNTI) derived by a time or a frequency at which a preamble is transmitted.

4> When the terminal receives the PDCCH scrambled by the UE identifier, or is allocated a DL transmission resource through the PDCCH, or receives the MAC control information for timing adjustment (timing advance command MAC CE) through the DL transmission resource, 5> The terminal may determine that the 2-step random access procedure is successfully completed and may determine that the first condition is satisfied.

4> When the terminal receives the PDCCH scrambled by the first identifier (MsgB-RNTI), or is allocated a DL transmission resource through the PDCCH, or receives a fallback RAR to a preamble transmitted by the terminal through the DL transmission resource (i.e., when the base station receives the preamble but does not receive MsgA, fallback RAR to transmit MsgA through another transmission resource), 5> The terminal may determine that the 2-step random access procedure is successfully completed and may determine that the first condition is satisfied.

5> The terminal may transmit data (MsgA MAC PDU) through a transmission resource indicated in the fallback RAR.

1> The terminal may determine that the first condition is satisfied when the random access procedure starts or a preamble for the random access procedure is transmitted.

1> In another method, when the 2-step random access procedure is configured or indicated in the terminal, the terminal may determine that the first condition is satisfied. For example, the terminal may determine that the first condition is satisfied before the 2-step random access procedure starts.

1> In another method, when the 2-step random access procedure is configured or indicated in the terminal through the message and a transmission resource (PUSCH) configured for data transmission in the 2-step random access procedure is greater than a first threshold value, or when a configuration value for timing adjustment (timing advance value) is included in the RRC message, the terminal may determine that the first condition is satisfied. The first threshold value may be configured in the RRC message (e.g., RRCReconfiguration) by the base station, may be broadcast in the system information, or may be configured in a size of data which the terminal has to transmit. For example, the terminal may determine that the first condition is satisfied before the 2-step random access procedure starts. In another method, when the configuration value for timing adjustment (timing advance value) is included or the 2-step random access procedure is configured in the RRC message, the terminal may not transmit a preamble and may directly transmit data through a configured transmission resource (e.g., transmission resource configured through the RRC message or transmission resource indicated through the PDCCH of a target base station monitored by the terminal). Accordingly, in the above case, before the 2-step random access procedure starts, or when the data is transmitted, or before the data is transmitted, the terminal may determine that the first condition is satisfied. In another method, when the configuration value for timing adjustment (timing advance value) is included or the 2-step random access procedure is configured in the RRC message, the terminal may not transmit a preamble, and may directly transmit data through a configured transmission resource (PUSCH) (e.g., a transmission resource configured through the RRC message or a transmission resource indicated through the PDCCH of the target base station monitored by the terminal). In this above case, when the configured transmission resource (PUSCH) (e.g., the transmission resource configured in the RRC message or the transmission resource indicated through the PDCCH of the target base station monitored by the terminal) is greater than the first threshold value, or when the configuration value for timing adjustment (timing advance value) is included in the RRC message, before the 2-step random access procedure starts, or when the data is transmitted, or before the data is transmitted, the terminal may determine that the first condition is satisfied.

1> When the RRC inactive mode terminal transmits an RRCResumeRequest message and receives an RRCResume message (or RRCSetup message) as a response thereto, the terminal may determine that the first condition is satisfied.

When the first condition is satisfied, a higher layer (e.g., an RRC layer) may indicate by using an indicator to a lower layer (e.g., aPDCP layer, an RLC layer, a MAC layer, or a PHY layer). Alternatively, a lower layer (e.g., a PDCP layer, an RLC layer, a MAC layer, or a PHY layer) may indicate to a higher layer (e.g., an RRC layer).

In the disclosure, the term 'BWP' may be used without being distinguished between a UL and the DL, and may refer to each of a UL BWP and a DL BWP according to the context.

In the disclosure, the term 'link' may be used without being distinguished between the UL and the DL, and may refer to each of the UL and the DL according to the context.

In the disclosure, the term 'cell' may refer to a PCell or an SCell (e.g., an SCell configured in an MCG), a PSCell (e.g., a PCell of an SCG), or an SCell (e.g., an SCell configured in the SCG). In the disclosure, a dormant BWP may be configured or introduced for the SCell or the PSCell of the terminal that performs carrier aggregation or dual connectivity, and battery consumption of the terminal may be reduced by not monitoring the PDCCH in the dormant BWP. Also, in the disclosure, when channel measurement is performed and reported in the dormant BWP (e.g., channel state information (CSI) or channel quality information (CQI) measurement or reporting) or beam measurement or beam tracking or beam operation is performed and thus data transmission is required, data transmission may rapidly start in a normal BWP by switching or activating to the normal BWP. The dormant BWP may not be configured or applied to the SpCell (the PCell of the MCG or the PCell (or PSCell) of the SCG) or the SCell configured with a physical uplink control channel (PUCCH), in which a signal should be continuously monitored, a feedback should be transmitted or received, or synchronization should be identified and maintained.

When the terminal is indicated to switch to the dormant BWP or activate the dormant BWP for the SCell of the MCG through the PCell, the terminal may perform a channel measurement procedure on the dormant BWP of the SCell, and may report a measured channel measurement result through a transmission resource of the PCell of the MCG (e.g., through a physical uplink control channel (PUCCH) transmission resource of the PCell) or a transmission resource of the SCell configured with the PUCCH of the MCG (e.g., through a PUCCH transmission resource). Which cell or through which transmission resource (e.g., the PUCCH or a physical uplink shared channel (PUSCH)) of which cell a channel measurement result of a BWP of which cell is reported may be configured in the terminal through the RRC message for each cell or for each BWP.

When the terminal is indicated to switch to the dormant BWP or activate the dormant BWP for the SCell of the SCG through the PSCell, the terminal may perform a channel measurement procedure on the dormant BWP of the SCell, and may report a measured channel measurement result through a transmission resource of the PSCell of the SCG (e.g., through a PUCCH transmission resource of the PSCell) or through a transmission resource of the SCell configured with the PUCCH of the SCG (e.g., through a PUCCH transmission resource). Which cell or through which transmission resource (e.g., PUCCH or PUSCH) of which cell a channel measurement result for a BWP of which cell is reported may be configured in the terminal through the RRC message for each cell or each BWP.

When the terminal is indicated to switch to the dormant BWP or activate the dormant BWP for the PSCell or the SCell of the SCG through the PCell or is indicated to suspend a cell group for the SCG (or the PSCell) (SCG suspension or cell group suspension), the terminal may perform a channel measurement result on a BWP of the PSCell or the SCell (the BWP configured through the RRC message or the last activated BWP) or the dormant BWP, and may report a measured channel measurement result through a transmission resource of the PCell of the MCG (e.g., through a PUCCH transmission resource of the PCell), or through a transmission resource of the SCell configured with the PUCCH of the MCG (e.g., through a PUCCH transmission resource), or through a transmission resource of the PSCell of the SCG (e.g., through a PUCCH transmission resource of the PSCell). Which cell or through which transmission resource (e.g., PUCCH or PUSCH) of which cell a channel measurement result of a BWP of which cell is reported may be configured in the terminal through the RRC message for each cell or each BWP.

The disclosure provides various embodiments of operating based on the DCI of the PDCCH, the MAC CE, or the RRC message, in order to operate the dormant BWP or cell group suspension state for the SCell (the SCell of the MCG when carrier aggregation is configured or the SCell of the SCG when dual connectivity is configured) or the PSCell (the PCell of the SCG when dual connectivity is configured) of the terminal.

The network or the base station may configure SPCells (PCells and PSCells) and a plurality of SCells in the terminal. When the terminal communicates with one base station, the SPCell may refer to the PCell, and when the terminal communicates with two base stations (master base station and secondary base station), the SPCell may refer to the PCell of the master base station or the PCell of the secondary base station. The PCell or the PSCell may be a main cell used when the terminal and the base station communicate with each other in each MAC layer, and may refer to a cell that performs timing for synchronization, performs random access, transmits an HARQ ACK/NACK feedback through a PUCCH transmission resource, and transmits and receives most control signals. Technology in which the base station increases transmission resources and increases UL or DL data transmission resources by operating a plurality of SCells along with the SPCell is referred to as carrier aggregation or dual connectivity.

When the terminal is configured with the SPCell and the plurality of SCells through the RRC message, the terminal may be configured with a state or mode of each cell (the PCell, the PSCell, or the SCell), or each Scell, or a BWP of each SCell, or cell group through the RRC message, the MAC CE, or the DCI of the PDCCH. The state or mode of the cell may be configured as an active (activated) mode or an active (activated) state, and an inactive (deactivated) mode or an inactive (deactivated) state. When the cell is in the active mode or the active state, it may mean that the terminal may transmit/receive UL or DL data to/from the base station in a BWP other than an activated BWP, or an activated normal BWP, or an activated dormant BWP of the cell in the active mode or in the activated cell, may monitor the PDCCH to check an indication of the base station, may perform channel measurement on the DL of the cell of the active mode or the active state (or the BWP other than the activated BWP, or the activated normal BWP, or the activated dormant BWP of the cell) and may periodically report measurement information to the base station, and may periodically transmit a pilot signal (a sounding reference signal (SRS)) to the base station so that the base station performs UL channel measurement. Alternatively, the terminal may activate the BWP to the dormant BWP or may switch the dormant BWP according to the indication of the base station for the activated cell (e.g., the PDCCH, the MAC CE, or the RRC message). When the dormant BWP is activated in the activated cell, the terminal may perform channel measurement reporting and may perform a procedure of reporting a channel measurement result, without performing PDCCH monitoring in the cell.

In another method, when the cell in which the dormant BWP is activated is the SCell, the terminal may not monitor the PDCCH, or may not receive DL data, or may perform channel measurement or measurement result reporting, or may suspend a configured periodic transmission resource (e.g., type 1 periodic transmission resource (configured uplink grant type 1)), or may clear or initialize a configured periodic transmission resource (e.g., type 2 periodic transmission resource (configured uplink grant type 2)). Alternatively, the terminal may not transmit a sounding reference signal (SRS), or may not transmit UL data, or may not transmit the PUCCH (e.g., a scheduling request (SR) or a preamble for random access). However, when the cell in which the dormant BWP is activated or cell group suspension is indicated is the PSCell, the terminal may not monitor the PDCCH, or may perform PDCCH monitoring with a very long period, or may not receive DL data, or may perform channel measurement or measurement result reporting, or may suspend the configured periodic transmission resource (e.g., type 1 periodic transmission resource) (configured uplink grant type 1)), or may clear or initialize the configured periodic transmission resource (e.g., type 2 periodic transmission resource (configured uplink grant type 2)). Alternatively, the terminal may transmit an SRS, or may not transmit UL data, or may transmit the PUCCH (e.g., an SR or a preamble for random access), or may perform a random access procedure.

When the cell activated to the BWP other than the dormant BWP is the SCell, the terminal may monitor the PDCCH, or may receive DL data, or may perform channel measurement or measurement result reporting, or may resume the configured periodic transmission resource (e.g., type 1 periodic transmission resource (configured uplink grant type 1)), or may configure or activate the configured periodic transmission resource (e.g., type 2 periodic transmission resource (configured uplink grant type 2)). Alternatively, the terminal may transmit an SRS, or may transmit UL data, or may transmit the PUCCH (e.g., an SR or a preamble for random access), or may perform a random access procedure.

When the cell that is activated to the BWP other than the dormant BWP or in which cell group resumption (SCG resumption) is indicated is the PSCell, the terminal may perform PDCCH monitoring, or may receive DL data, or may perform channel measurement or measurement result reporting, or may resume the configured periodic transmission resource (e.g., type 1 periodic transmission resource (configured uplink grant type 1)), or may configure or activate the configured periodic transmission resource (e.g., type 2 periodic transmission resource (configured uplink grant type 2)). Alternatively, the terminal may transmit an SRS, or may transmit UL data, or may transmit the PUCCH (e.g., an SR or a preamble for random access), or may perform a random access procedure.

When the cell is in the inactive mode or the inactive state, it may mean that because the terminal deactivates BWPs configured in the cell, or the configured BWPs are not activated, or there is no activated BWP from among the configured BWPs, the terminal may not transmit/receive data to/from the base station, does not monitor the PDCCH to check an indication of the base station, does not perform channel measurement, does not perform measurement reporting, and does not transmit a pilot signal.

Accordingly, in order to activate the cells in the inactive mode, the base station may first configure frequency measurement configuration information in the terminal through the RRC message, and the terminal may perform cell or frequency measurement based on the frequency measurement configuration information. The base station may receive a cell or frequency measurement report of the terminal, and then may activate the deactivated cells based on frequency/channel measurement information. Accordingly, a lot of latency occurs when the base station activates carrier aggregation or dual connectivity and starts data transmission or reception to or from the terminal.

The disclosure provides the configuration or introduction of a dormant BWP or a dormant state for a BWP of each activated cell (e.g., an activated Scell or an activated PSCell) to reduce battery consumption of the terminal and rapidly start data transmission or reception. Also, the disclosure provides the configuration or introduction of a dormant BWP for each activated cell. Also, the disclosure provides the configuration or introduction of a state of a cell group for each cell group as an active state, a dormant state, a suspended state, an inactive state, or a resumed state, when dual connectivity is configured in a terminal. Also, the disclosure provides a method of performing a cell group suspension (SCG suspension or Cell group suspension) or cell group resumption (SCG resumption or Cell group resumption) indication indicating cell group state transition.

In a BWP or a dormant BWP that is a dormant mode of an activated cell (a dormant BWP in an activated SCell), or when a dormant BWP is activated, the terminal may not transmit/receive data to/from the base station, or may not monitor the PDCCH to check an indication of the base station, or may not transmit a pilot signal but may perform channel measurement, and may report a measured frequency/cell/channel measurement result according to the base station configuration periodically or when an event occurs. Accordingly, because the terminal does not monitor the PDCCH and does not transmit a pilot signal in the dormant BWP of the activated cell, battery consumption may be reduced compared to a normal BWP of the activated cell (or a BWP other than the dormant BWP) or compared to when the normal BWP of the activated cell (or a BWP other than the dormant BWP) is activated. Also, unlike when the cell is deactivated, because the terminal performs channel measurement reporting, the base station may rapidly activate the normal BWP of the activated cell based on a measurement report or a measurement report of the dormant BWP of the activated cell or, thereby making it possible to rapidly use carrier aggregation and reducing transmission latency.

Accordingly, in the disclosure when the cell is in the active mode or the active state, it may mean that the terminal may transmit/receive UL or DL data to/from the base station in the BWP other than the activated BWP, or the activated normal BWP, or the activated dormant BWP of the cell in the activated mode or in the activated cell, may monitor the PDCCH to check an indication of the base station, may perform channel measurement on the DL of the cell of the active mode or the active state (or the BWP other than the activated BWP, or the activated normal BWP, or the activated dormant BWP of the cell) and may periodically report measurement information to the base station, and may periodically transmit a pilot signal (SRS) to the base station so that the base station performs UL channel measurement. Also, in the disclosure, when the cell is in the active mode or the active state, it may mean that the terminal may not transmit/receive UL or DL data to/from the base station in the activated dormant BWP of the cell in the active mode or in the activated cell, or may not monitor the PDCCH to check an indicator of the base station but may perform channel measurement on the DL of the activated dormant BWP of the cell of the active mode or the active state and may periodically report measurement information to the base station.

When the cell in which the dormant BWP is activated or cell group suspension is indicated is the PSCell, the terminal may not monitor the PDCCH, or may perform PDCCH monitoring with a very long period, or may not receive DL data, or may perform channel measurement or measurement result reporting, or may suspend the configured periodic transmission resource (e.g., type 1 periodic transmission resource (configured uplink grant type 1)), or may clear or initialize the configured periodic transmission resource (e.g., type 2 periodic transmission resource (configured uplink grant type 2)). Alternatively, the terminal may transmit an SRS, or may not transmit UL data, or may transmit the PUCCH (e.g., an SR or a preamble for random access), or may perform a random access procedure.

In the disclosure, a dormant BWP may indicate a state of a BWP, or may be used as a logical name indicating a specific BWP. Accordingly, the dormant BWP may be activated, deactivated, or switched. For example, an indication to switch a second BWP activated in a first cell to a dormant BWP, or an indication to transition a first cell to a dormant or hibernation mode, or an indication to activate a dormant BWP of a first cell may be interpreted as the same meaning.

Also, in the disclosure, a normal BWP may refer to BWPs other than a dormant BWP from among BWPs configured in each cell of the terminal through an RRC message. In the normal BWP, the terminal may transmit/receive UL or DL data to/from the base station, may monitor the PDCCH to check an indication of the base station, may perform channel measurement on the DL and may periodically report measurement information to the base station, and may periodically transmit a pilot signal (SRS) to the base station so that the base station performs UL channel measurement. Also, the normal BWP may indicate a first active BWP, or a default BWP, or a first active BWP activated from dormancy, or an initial BWP.

From among BWPs configured in each cell of the terminal, only one dormant BWP may be configured for the DL. In another method, from among BWPs configured in each cell of the terminal, only one dormant BWP may be configured for the UL or the DL.

In the disclosure, the state of the cell group may be configured as an active state, a suspended state, or an inactive state. The state of the cell group may be indicated by a bitmap or an indicator of the DCI of the PDCCH, or may be indicated by the MAC control information, or may be indicated by an indicator of the RRC message. In an embodiment of the disclosure, when the state of the cell group is indicated as the active state, the terminal may store configuration information of the cell group configured or indicated in the RRC message (e.g., an RRCReconfiguration message, or an RRC Setup message, or an RRCResume message) and may apply the configuration information to the terminal, or may recover or resume the configuration information of the cell group. The terminal may monitor the PDCCH according to the configuration of the RRC message in the configured SCell or the PCell or the PSCell of the cell group, or may receive DL data, or may perform channel measurement or measurement result reporting, or may resume the configured periodic transmission resource (e.g., type 1 periodic transmission resource (configured uplink grant type 1)), or may configure or activate a configured periodic transmission resource (e.g., type 2 periodic transmission resource (configured uplink grant type 2)). Alternatively, the terminal may transmit an SRS, or may transmit UL data, or may transmit the PUCCH (e.g., an SR or a preamble for random access), or may perform a random access procedure.

When the state of the cell group is indicated as the suspended state or the inactive state, the terminal may store configuration information of the cell group configured or indicated in the RRC message (e.g., an RRCReconfiguration message, or an RRCSetup message, or an RRCResume message), and may not discard the configuration information but may stop applying the configuration information. The terminal may not monitor the PDCCH according to the configuration of the RRC message in the configured SCell or the PCell or the PSCell of the cell group, or may perform PDCCH monitoring with a very long period, or may not receive DL data, or may perform channel measurement or measurement result reporting, or may suspend the configured periodic transmission resource (e.g., type 1 periodic transmission resource (configured uplink grant type 1)), or may clear or initialize the configured periodic transmission resource (e.g., type 2 periodic transmission resource (configured uplink grant type 2)). Alternatively, the terminal may transmit an SRS, or may not transmit UL data, or may transmit the PUCCH (e.g., SR or preamble for random access), or may perform a random access procedure.

When the state of the cell group is indicated as the inactive state or when the release of cell group configuration information is indicated, the terminal may release or discard the configuration information of the cell group configured or indicated in the RRC message (e.g., RRCReconfiguration message, or RRCSetup message, or RRCResume message).

FIG. 1E illustrates a diagram of a procedure of providing a service to a terminal by efficiently using a wide frequency bandwidth in a next-generation mobile communication system, according to an embodiment of the disclosure.

Referring to FIG. 1E, how a next-generation mobile communication system may efficiently use a very wide frequency bandwidth to provide services to terminals having different capabilities (or categories) and reduce battery consumption will be described.

One cell served by a base station may serve a very wide frequency band as in 1e-05. However, in order to provide services to terminals having different capabilities, the base station may divide the wide frequency band into a plurality of BWPs and may manage the same as one cell.

First, a terminal that is initially turned on may search an entire frequency band provided by a service provider (public land mobile network (PLMN)) in units of certain resource blocks (e.g., 12 resource blocks (RBs)). The terminal may start to monitor a primary synchronization sequence (PSS)/secondary synchronization sequence (SSS) in an entire system bandwidth in units of resource blocks (1e-10). When the terminal detects signals of the PSS/SSS while monitoring the PSS/SSS in units of resource blocks (1e-01 or 1e-02), the terminal may read and interpret (decode) the signals of the PSS/SSS to identify a boundary between a subframe and a radio transmission resource frame (radio frame). Accordingly, the subframe may be distinguished in units of 1 ms, and the terminal may synchronize a DL signal with the base station. A resource block (RB) may be defined as a two-dimensional unit with a size of a certain frequency resource and a certain time resource. For example, the time resource may be defined in units of 1 ms and the frequency resource may be defined as 12 subcarriers (1 carrier×15 kHz=180 kHz). When synchronization is completed, the terminal may identify control resource set (CORESET) information and initial access BWP information by identifying a master system information (MIB) or minimum system information (MSI) (1e-15 and 1e-20). The CORESET information refers to a position of a time/frequency transmission resource through which a control signal is transmitted from the base station, and indicates, for example, a position of a resource through which a PDCCH is transmitted. That is, the CORESET information is information indicating where first system information (system information block 1 (SIB1)) is transmitted, and may indicate through which frequency/time resource the PDCCH is transmitted. When the terminal receives the first system information, the terminal may identify information about an initial BWP. When the terminal completes synchronization of a DL signal with the base station and may receive a control signal, the terminal may perform a random access procedure in an initial BWP of a cell on which the terminal camps, may request an RRC connection configuration, may receive an RRC message, and may perform an RRC connection configuration.

In the RRC connection configuration, a plurality of BWPs may be configured for one cell (a Pcell, a Pscell, an Spcell, or an Scell). In one cell, a plurality of BWPs may be configured for a DL, and a plurality of BWPs may be configured for a UL.

The plurality of BWPs may be indicated and configured by a BWP identifier to be used as an initial BWP, or a default BWP, or a first active BWP, or a dormant BWP, or a first active BWP activated from dormancy.

The initial BWP may be used as a cell-specific BWP existing for each cell, and may be used as a BWP in which the terminal first accessing the cell may configure a connection in the cell through a random access procedure or the terminal configuring the connection may perform synchronization. Also, the base station may configure, for each cell, an initial DL BWP to be used in the DL and an initial UL BWP to be used in the UL. Configuration information about the initial BWP may be broadcast in the first system information (system information 1 (SIB1)) indicated by the CORESET, and the base station may re-configure a connection in the accessed terminal through an RRC message. The initial BWP may be used by being designated as 0 of a BWP identifier in each of the UL and the DL. That is, all terminals accessing the same cell may use the same initial BWP by designating the same as the same BWP identifier #0. This is because, when a random access procedure is performed, the base station may transmit an RAR message in the initial BWP that may be read by all the terminals, and thus a CBRA procedure may be facilitated.

The first active BWP may be differently configured for each terminal (UE specific), and may be indicated by being designated by a BWP identifier from among a plurality of BWPs. The first active BWP may be configured for each of the DL and the UL, and each of a first active DL BWP and a first active UL BWP may be configured as a BWP identifier. The first active BWP may be used to indicate which BWP is to be first activated and used when a plurality of BWPs are configured in one cell. For example, when a PCell or a PSCell and a plurality of SCells are configured in the terminal and a plurality of BWPs are configured in each PCell, PSCell, or SCell, if the PCell, the PSCell, or the SCell is activated, the terminal may activate and use the first active BWP from among the plurality of BWPs configured in the PCell, the PSCell, or the SCell. For the DL, the first active DL BWP may be activated and used, and for the UL, the first active UL BWP may be activated and used.

An operation in which the terminal activates the first active DL BWP (or BWP configured or indicated through the RRC message) by switching the current or activated DL BWP, or an operation in which the terminal activates the first active UL BWP (or BWP configured or indicated through the RRC message) by switching the current or activated UL BWP may be performed when the terminal receives an indication to activate the cell or the BWP in the inactive state through the RRC message, the MAC control information, or the DCI. Also, the operation may be performed when the terminal receives an indication to transition the cell or the BWP to the dormant state or an indication to activate the dormant BWP through the RRC message, the MAC control information, or the DCI. This is because, when the cell or the BWP is activated, the first active DL BWP (or BWP configured or indicated through the RRC message) is to be activated by switching the current or activated DL BWP or the first active UL BWP (or BWP configured or indicated through the RRC message) is to be activated by switching the UL BWP, and thus even when channel measuring reporting is performed in the dormant state, the base station may effectively use carrier aggregation only when a frequency/channel should be measured and reported for the first active DL/UL BWP.

The default BWP may be differently configured for each terminal (UE specific), and may be indicated by being designated by a BWP identifier from among a plurality of BWPs. In an embodiment of the disclosure, the default BWP may be configured only for the DL. The default BWP may be used as a BWP to which an activated BWP from among a plurality of DL BWPs is to fall back after a certain time. For example, a BWP inactivity timer may be configured for each cell or each BWP through an RRC message, and the BWP inactivity timer may start or re-start when data transmission/reception occurs in the activated BWP other than the default BWP, or may start or re-start when the activated BWP is switched to another BWP. When the BWP inactivity timer expires, the terminal may fall back or switch the activated DL BWP to the default bandwidth in the cell. Switching may refer to a procedure of deactivating a currently activated BWP and activating a BWP for which the switching is indicated, and the switching may be triggered through an RRC message, MAC control information (MAC CE), or L1 signaling (DCI of the PDCCH). The switching may be triggered in response to an indication of the BWP to be switched or activated, and the BWP may be indicated by a BWP identifier (e.g., 0, 1, 2, 3, or 4).

The reason why the default BWP is applied and used only for the DL is that the terminal is indicated by the base station to fall back to the default BWP after a certain time for each cell (e.g., DCI of the PDCCH), and thus base station scheduling is facilitated. For example, when the base station configures the default BWP of terminals accessing one cell as the initial BWP, the base station may continuously perform a scheduling indication only in the initial BWP after a certain time. When the default BWP is not configured in the RRC message, the initial BWP may be considered as the default BWP and the terminal may fall back to the initial BWP when the BWP inactivity timer expires.

In another method, in order to increase an implementation degree of freedom of the base station, a default BWP may also be defined and configured for the UL and may be used like the default BWP of the DL.

The dormant BWP refers to a BWP or a dormant BWP that is a dormant mode of an activated cell (a dormant BWP in an activated SCell). When the dormant BWP is activated, the terminal may not transmit/receive data to/from the base station, or may not monitor the PDCCH to check an indication of the base station, or may not transmit a pilot signal but may perform channel measurement and may report a measured frequency/cell/channel measurement result according to the base station configuration periodically or when an event occurs. Accordingly, because the terminal does not monitor the PDCCH and does not transmit a pilot signal in the dormant BWP of the activated cell, battery consumption may be reduced compared to a normal BWP of the activated cell (or a BWP other than the dormant BWP) or compared to when the normal BWP of the activated cell (or a BWP other than the dormant BWP) is activated. Also, unlike when the cell is deactivated, because the terminal performs channel measurement reporting, the base station may rapidly activate the normal BWP of the activated cell based on a measurement report or a measurement report of the dormant BWP of the activated cell, thereby making it possible to rapidly use carrier aggregation and reducing transmission latency.

When the terminal operates a BWP of one activated cell as a dormant BWP, or when an activated BWP in an activated cell is a dormant BWP, or when it is switched to a dormant BWP in a cell, or when the base station indicates to switch the BWP of the activated cell from the dormant BWP to the normal BWP (or a BWP other than the dormant BWP) through the DCI of the PDCCH, the MAC CE, or the RRC message, or when the base station indicates to switch or convert the active BWP from the dormant BWP to the normal BWP, or when the base station indicates to switch, convert, or activate the active BWP from the dormant BWP to the normal BWP (e.g., first active BWP activated from dormancy), the first active BWP switched and activated from the dormant state or from the dormant BWP (or the first active non-dormant BWP or a BWP configured or indicated through the RRC message) may be a BWP to be activated by switching the current or activated BWP of the activated cell by the terminal according to the indication or a BWP to be activated from the dormant state configured in the RRC message.

FIG. 1F illustrates a procedure by which a terminal switches an RRC idle mode to an RRC connected mode in a next-generation mobile communication system, according to an embodiment of the disclosure. Referring to FIG. 1F, a method of configuring a plurality of BWPs and configuring a default BWP, a first active BWP, or a dormant BWP will be described.

One cell served by a base station may serve a very wide frequency band. First, a terminal may search an entire frequency band provided by a service provider (PLMN) in units of certain resource blocks (e.g., 12 resource blocks (RBs)). The terminal may start to monitor a PSS/SSS in an entire system bandwidth in units of resource blocks. When the terminal detects signals of the PSS/SSS while monitoring the PSS/SSS in units of resource blocks, the terminal may read and interpret (decode) the signals of the PSS/SSS, to identify a boundary between a subframe and a radio transmission resource frame (radio frame). When synchronization is completed, the terminal may read system information of a cell on which the terminal currently camps. That is, the terminal may identify CORESET information by identifying a MIB or MSI and may identify initial BWP information by reading the system information (1f-01 and 1f-05). The CORESET information refers to a position of a time/frequency transmission resource through which a control signal is transmitted from the base station, and may indicate, for example, a position of a resource through which a PDCCH is transmitted When the terminal completes synchronization of a DL signal with the base station and may receive a control signal, the terminal may perform a random access procedure in an initial BWP, may receive an RAR, may request an RRC connection configuration, may receive an RRC message, and may perform an RRC connection configuration (1f-10, 1f-15, 1f-20, 1f-25, and 1f-30).

When a basic RRC connection configuration is completed, the base station may transmit an RRC message asking a capability of the terminal to identify a UE capability (UECapabilityEnquiry) (1f-35). In another method, the base station may ask a mobility management entity (MME) or an access and mobility management function (AMF) about a capability of the terminal to identify a UE capability. This is because, when the MME or the AMF has previously accessed the terminal, the MME or the AMF may have stored capability information of the terminal. When the base station does not have desired UE capability information, the base station may request the terminal for a UE capability. When the terminal reports a UE capability, the terminal may report whether the terminal supports a dormant BWP for an SCell of each cell group (MCG or SCG), or whether the terminal supports Embodiment 1, Embodiment 2, Embodiment 3, or Embodiment 4 of the disclosure, or whether the terminal supports a dormant BWP for a PSCell of each cell group, or whether the terminal supports a cell group suspension or resume procedure for a PSCell of each cell group, or the number of supported cell groups to the base station as a UE capability. Also, the terminal may report at least one of whether the terminal is able to store and recover configuration information of the SCell of the MCG, or the SCell of the SCG, or the PSCell of the SCG, or whether the terminal is able to discard the configuration information, or whether the terminal is able to re-configure part of the configuration information, or whether the terminal is able to activate the configuration information to the base station as a UE capability through an RRCResume message in an RRC connection resume procedure.

The reason why the base station transmits an RRC message to the terminal to identify a capability of the terminal is to identify a capability of the terminal, for example, how much frequency band the terminal is able to read or the region of the frequency band that may be read by the terminal. After the capability of the terminal is identified, the base station may configure an appropriate BWP in the terminal. When the terminal receives the RRC message asking the capability of the terminal, a response thereto may be made to indicate a range of a bandwidth supported by the terminal or to which extent the bandwidth is supported in the current system bandwidth by an offset from a reference center frequency, or to directly indicate a start point and an end point of the supported frequency bandwidth, or to indicate the same by the center frequency and the bandwidth (1f-40).

The BWP may be configured through an RRC Setup message of the RRC connection configuration or an RRCResume message (1f-25), or an RRCReconfiguration message (1f-45, 1f-70, and 1f-85). The RRC message may include configuration information of a PCell, a PSCell, or a plurality of cells, and a plurality of BWPs may be configured for each cell (a PCell, a Pscell, or an Scell). When the plurality of BWPs are configured for each cell, a plurality of BWPs to be used in the DL of each cell may be configured. In the case of a frequency division duplex (FDD) system, a plurality of BWPs to be used in the UL of each cell may be configured separately from DL BWPs. In the case of a time division duplex (TDD) system, a plurality of BWPs to be commonly used in the DL and the UL of each cell may be configured.

Information for configuring a BWP of each cell (a PCell, a Pscell, or an Scell) may include some of the following information.

1) DL BWP configuration information of the cell
   Initial DL BWP configuration information
   Multiple BWP configuration information and a BWP identifier (ID) corresponding to each BWP
   Initial state configuration information of the cell or DL BWP (e.g., active state, dormant state, or inactive state)
   BWP identifier indicating a first active DL BWP
   BWP identifier indicating a default BWP
   Configuration information for PDCCH monitoring for each BWP, for example, CORESET information, search space resource information, PDCCH transmission resource, period, or subframe number information
   BWP identifier indicating a dormant BWP
   BWP identifier indicating a first active BWP activated from dormancy BWP inactivity timer configuration and timer value
2) UL BWP configuration information of the cell
   Initial UL BWP configuration information
   Multiple BWP configuration information and BWP identifier (ID) corresponding to each BWP
   Initial state configuration information of the cell or DL BWP (e.g., active state, dormant state, or inactive state)
   BWP identifier indicating a first active UL BWP
   Configuration information about a transmission resource for performing channel measurement and reporting a measurement result in a dormant BWP or a BWP other than the dormant BWP (e.g., PUCCH transmission resource information of the PCell, or PUCCH SCell, or PSCell)

In an embodiment of the disclosure, the configured initial BWP, or a default BWP, or a first active BWP may be used for the following reasons, and may operate as follows according to the purposes.

The initial BWP may be used as a cell-specific BWP existing for each cell, and may be used as a BWP in which the terminal first accessing the cell may configure a connection in the cell through a random access procedure or the terminal configuring the connection may perform synchronization. Also, the base station may configure, for reach cell, an initial DL BWP to be used in the DL and an initial UL BWP to be used in the UL. Configuration information about the initial BWP may be broadcast in the first system information SIB1 indicated by the CORESET, and the base station may re-configure a connection In the accessed terminal through an RRC message. The initial BWP may be used by being designated as 0 of a BWP identifier in each of the UL and the DL. That is, all terminals accessing the same cell may use the same initial BWP by designating the same as the same BWP identifier #0. This is because, when a random access procedure is performed, the base station may transmit an RAR message in the initial BWP that may be read by all the terminals, and thus a CBRA procedure may be facilitated.

The first active BWP may be differently configured for each terminal (UE specific), and may be indicated by being designated by a BWP identifier from among a plurality of BWPs. The first active BWP may be configured for each of the DL and the UL, and each of a first active DL BWP and a first active UL BWP may be configured as a BWP identifier. The first active BWP may be used to indicate which BWP is to be first activated and used when a plurality of BWPs are configured in one cell. For example, when a PCell or a PSCell and a plurality of SCells are configured in the terminal and a plurality of BWPs are configured in each PCell, PSCell, or SCell, if the PCell, the PSCell, or the SCell is activated, the terminal may activate and use the first active BWP from among the plurality of BWPs configured in the PCell, the PSCell, or the SCell. For the DL, the first active DL BWP may be activated and used, and for the UL, the first active UL BWP may be activated and used.

An operation in which the terminal activates the first active DL BWP (or a BWP configured or indicated through the RRC message) by switching the current or activated DL BWP, or an operation in which the terminal activates the first active UL BWP (or a BWP configured or indicated through the RRC message) by switching the current or activated UL BWP may be performed when the terminal receives an indication to activate a cell or a BWP of an activated cell in an inactive state or a dormant state, or an indication to switch from an inactive or dormant BWP to a normal BWP, or an indication to activate an inactive or dormant BWP through the RRC message, the MAC control information or the DCI of the PDCCH. Also, when the terminal receives an indication to transition an activated cell or BWP to a dormant state, or an indication to switch to a dormant BWP, or an indication to activate a dormant BWP through the RRC message, the MAC control information, or the DCI of the PDCCH, the terminal may switch or activate the BWP to the dormant BWP or may hibernate the BWP.

Switching to the dormancy or the dormant BWP or activation of the dormant BWP may refer to performing the following operation in the dormant state. That is, without performing PDCCH monitoring, the terminal may perform an operation of measuring a channel in a DL BWP (or a dormant BWP) and reporting a result to the base station. In another method, when the activated cell or BWP is activated or switched to the normal BWP, because the first active DL BWP is to be activated by switching the DL BWP and the first active UL BWP is to be activated by switching the UL BWP, the dormant BWP may be configured as the first active DL or UL BWP or the default BWP. The default BWP may be differently configured for each terminal (UE specific), and may be indicated by being designated by a BWP identifier from among a plurality of BWPs. In an embodiment of the disclosure, the default BWP may be configured only for the DL. The default BWP may be used as a BWP to which an activated BWP from among a plurality of DL BWPs is to fall back after a certain time. For example, a BWP inactivity timer may be configured for each cell or each BWP through an RRC message. The BWP inactivity timer may start or re-start when data transmission/reception occurs in the activated BWP other than the default BWP, or may start or re-start when the activated BWP is switched to another BWP. When the BWP inactivity timer expires, the terminal may fall back or switch the activated DL BWP to the default bandwidth in the cell. Switching may refer to a procedure of deactivating a currently activated BWP and activating a BWP for which the switching is indicated, and the switching may be triggered through an RRC message, MAC control information (MAC CE), or L1 signaling (DCI of the PDCCH). The switching may be triggered in response to an indication of the BWP to be switched or activated, and the BWP may be indicated by a BWP identifier (e.g., 0, 1, 2, 3, or 4).

The reason why the default BWP is applied and used only for the DL is that the terminal is indicated by the base station to fall back to the default BWP after a certain time for each cell (e.g., DCI of the PDCCH), and thus base station scheduling is facilitated. For example, when the base station configures the default BWP of terminals accessing one cell as the initial BWP, the base station may continuously perform a scheduling indication only in the initial BWP after a certain time. When the default BWP is not configured in the RRC message, the initial BWP may be considered as the default BWP and the terminal may fall back to the initial BWP when the BWP inactivity timer expires.

In another method, in order to increase an implementation degree of freedom of the base station, a default BWP may also be defined and configured for the UL and may be used like the default BWP of the DL.

The dormant BWP refers to a BWP or a dormant BWP that is a dormant mode of an activated cell (a dormant BWP in an activated SCell). When the dormant BWP is activated, the terminal may not transmit/receive data to/from the base station, or may not monitor the PDCCH to check an indication of the base station, or may not transmit a pilot signal but may perform channel measurement and may report a measured frequency/cell/channel measurement result according to the base station configuration periodically or when an event occurs. Accordingly, because the terminal does not monitor the PDCCH and does not transmit a pilot signal in the dormant BWP of the activated cell, battery consumption may be reduced compared to a normal BWP of the activated cell (or a BWP other than the dormant BWP) or compared to when the normal BWP of the activated cell (or a BWP other than the dormant BWP) is activated. Also, unlike when the cell is deactivated, because the terminal performs channel measurement reporting, the base station may rapidly activate the normal BWP of the activated cell based on a measurement report or a measurement report of the dormant BWP of the activated cell, thereby making it possible to rapidly use carrier aggregation and reducing transmission latency.

When the terminal operates a BWP of one activated cell as a dormant BWP, or when an activated BWP in an activated cell is a dormant BWP, or when it is switched to a dormant BWP in a cell, or when the base station indicates to switch the BWP of the activated cell from the dormant BWP to the normal BWP (or a BWP other than the dormant BWP) through the DCI of the PDCCH, the MAC CE, or the RRC message, or when the base station indicates to switch or convert the active BWP from the dormant BWP to the normal BWP, or when the base station indicates to switch, convert, or activate the active BWP from the dormant BWP to the normal BWP (e.g., the first active BWP activated from dormancy), the first active BWP activated from dormancy (or the first active non-dormant BWP) may be a BWP to be switched from the BWP of the activated cell by the terminal according to the indication or a first active BWP activated from dormancy configured in the RRC message.

In the disclosure, when a first BWP is switched to a second BWP, it may be interpreted that the second BWP is activated, or the activated first BWP is deactivated and the second BWP is activated.

In the RRCSetup message of the RRC connection configuration or the RRCResume message (1*f*-25) or the RRCReconfiguration message (1*f*-45), a state transition timer may be configured so that the terminal itself may perform state transition even without receiving an indication from the base station through the RRC message, the MAC control information, or the DCI of the PDCCH. For example, a cell deactivation timer (ScellDeactivationTimer) may be configured for each cell, and when the cell deactivation timer expires, the cell may be transitioned to the inactive state. According to an embodiment of the disclosure, by configuring a DL (or UL) BWP hibernation timer (DLBWPHibernationTimer or ULBWPHibernationTimer) for each cell or each BWP of each cell and by configuring a cell hibernation timer (ScellHibernationTimer) for each cell, when the cell hibernation timer or the DL (or UL) BWP hibernation timer expires, the cell or the DL (or UL) BWP may be transitioned to the dormant state or switched to the dormant BWP. For example, when the cell hibernation timer or the DL (or UL) BWP hibernation timer expires, the activated cell or DL (UL) BWP may be transitioned to the dormant state or switched to the dormant BWP, and the deactivated or hibernated cell or DL (or UL) BWP may not be transitioned to the dormant state or the dormant BWP. The BWP hibernation timer may start when receiving an indication to switch or activate the BWP through the RRC message, the MAC CE, or the DCI of the PDCCH, or may stop when receiving an indication to switch to the dormant BWP, or an indication to hibernate, or an indication to activate the dormant BWP through the RRC message, the MAC CE, or the DCI of the PDCCH. According to an embodiment of the disclosure, for each cell or DL (or UL) BWP, by configuring a dormant cell deactivation timer (dormantScellDeactivationTimer) or a dormant state or DL (or UL) dormant BWP deactivation timer (dormantDLDeactivationTimer or dormantULDeactivationTimer), the dormant cell or DL (or UL) dormant BWP may be transitioned to the inactive state. When the dormant cell deactivation timer or the dormant state or DL (or UL) dormant BWP deactivation timer expires, only the dormant cell or DL (or UL) dormant BWP may be transitioned to the inactive state, and the active or inactive cell or DL (or UL) BWP may not be transitioned to the inactive state. The dormant BWP hibernation timer may start when receiving an indication to switch the dormant BWP, or an indication to hibernate, or an indication to activate the dormant BWP through the RRC message, the MAC CE, or the DCI of the PDCCH, or may stop when receiving an indication to deactivate or activate the BWP or the cell or an indication to activate the normal BWP (e.g., BWP other than the dormant BWP configured through the RRC) through the RRC message, the MAC CE, or the DCI of the PDCCH. When the cell deactivation timer (ScellDeactivationTimer) (or DL (or UL) BWP hibernation timer) and the cell hibernation timer (ScellHibernationTimer) (or DL (or UL) dormant BWP deactivation timer) are configured together, the cell hibernation timer (ScellHibernationTimer) (or DL (or UL) dormant BWP hibernation timer) may be prioritized That is, when the cell hibernation timer (ScellHibernationTimer) (or DL (or UL) BWP hibernation timer) is configured, even when the cell deactivation timer (ScellDeactivationTimer) (or DL (or UL) dormant BWP deactivation timer) expires, the cell or DL (or UL) BWP may not be deactivated. In other words, when the cell hibernation timer (or DL (or UL) BWP hibernation timer) is configured, the cell or DL (or UL) BWP may be first transitioned from the active state to the dormant state or switched to the dormant BWP due to the expiration of the timer, and the dormant cell or the cell or BWP transitioned to the dormant state due to the expiration of the BWP deactivation timer may be stepwise transitioned back to the inactive state. Accordingly, when the cell hibernation timer or the BWP hibernation timer is configured, the cell deactivation timer or the dormant BWP deactivation timer may not affect the cell or DL (or UL) BWP state transition, and even when the cell deactivation timer or the dormant BWP deactivation timer expires, when the cell hibernation timer or the BWP hibernation timer is configured, the cell or DL (or UL) BWP may not be directly transitioned to the inactive state.

When the cell deactivation timer (or DL (or UL) BWP hibernation timer) is not configured in the RRC message, the terminal may consider that the cell deactivation timer (or DL (or UL) BWP hibernation timer) is configured as an infinite value.

In the RRCSetup message of the RRC connection configuration or the RRCResume message (1*f*-25) or the RRCReconfiguration message (1*f*-45, 1*f*-70, and 1*f*-85), frequency measurement configuration information and frequency measurement gap configuration information may be configured, and a frequency measurement object information may be included. In the RRCSetup message of the RRC connection configuration or the RRCResume message (1*f*-25) or the RRCReconfiguration message (1*f*-45, 1*f*-70, and 1*f*-85), a function for reducing power consumption of the terminal (power saving mode) may be configured. Also, along with the function for reducing power consumption, configuration information such as discontinuous reception (DRX) cycle, offset, on-duration period (an interval in which the terminal should monitor the PDCCH) or time information, or short time period information or time information indicating when to monitor or detect the PDCCH from the base station before the on-duration period in the DRX cycle may be configured. When the function for reducing power consumption of the terminal is configured in the RRC message, the terminal may configure a DRX cycle, and may detect a wake-up signal (WUS) in an interval configured to monitor the PDCCH of the base station before the on-duration period. Also, the base station may indicate the terminal whether to skip (or not to perform) or perform PDCCH monitoring in an immediately next on-duration period through the DCI of the PDCCH of the WUS. The terminal should always monitor the PDCCH in the on-duration period, and when the base station indicates the terminal not to perform PDCCH monitoring in the on-duration period by using the WUS, battery consumption of the terminal may be reduced.

When the RRC connection configuration is completed, the terminal may configure a plurality of BWPs according to an indication configured in the RRC message (1*f*-55 and 1*f*-80). In order to reduce battery consumption, one or a small number of BWPs from among the configured plurality of BWPs may be activated. For example, the base station may indicate one BWP to be activated. The base station may indicate activation of the BWP through an RRC message, MAC control information (MAC CE), or L1 signaling (PHY layer control signaling such as DCI of the PDCCH), to indicate switching from an initial access BWP to a new BWP. In another method, new bitmap information may be defined in the DCI of the PDCCH, and whether to activate the normal BWP (or a BWP other than the dormant BWP), or activate the dormant BWP, or deactivate the BWP may be indicated by the new bitmap information. In another method, whether to activate the normal BWP (e.g., the first active BWP to be activated from dormancy), or activate the dormant BWP, or switch to the dormant BWP, or perform BWP switching may be indicated by the bitmap information. Because there may be many newly connected users in the initial access BWP, it may be more advantageous to allocate a new BWP and separately manage the connected users in terms of scheduling. This is because the initial access BWP is not configured for each terminal, but may be commonly shared and used by all the terminals. In order to reduce signaling overhead, the default BWP may be dynamically indicated through the MAC control information, or the L1 signaling, or the system information.

In the RRC message (the RRC Setup message or the RRCResume (1*f*-25) or the RRCReconfiguration message (1*f*-45, 1*f*-70, and 1*f*-85)), configuration information for a cell group may be included. The configuration information for the cell group may include some of the following information. The configuration information for the cell group may indicate a state, procedure, configuration information application, or release for each cell group.

- Cell group identifier indicating the cell group (e.g., cell group identifier or index)
- Indicator indicating the state of the cell group (e.g., active state, suspended state, or inactive state)
- Indicator indicating the state of the cell group (e.g., indicator to suspend (or deactivate) the cell group (e.g., Cellgroup (SCG) suspension indicator) or indicator to resume cell group (e.g., Cellgroup (SCG) resumption indicator))
- Indicator (e.g., a PDCP reestablishment indicator, or a PDCP data recovery indicator, or an indicator triggering new procedure, or an RLC reestablishment indicator, or a MAC layer reset indicator, or a MAC layer partial reset indicator) triggering procedure of corresponding protocol layer (e.g., an SDAP layer, a PDCP layer, an RLC layer, or a MAC layer) according to indicator indicating state of cell group When an indicator to suspend (or deactivate) the state of the cell group is included, second DRX configuration information (e.g., a monitoring interval, an active period (on-duration) length, a period, or an offset) may be configured to perform PDCCH monitoring with a very long period in the PSCell of the cell group. For example, when the terminal receives an indicator to suspend the cell group, the terminal may perform PDCCH monitoring with a very long period by applying the second DRX configuration information, thereby reducing power consumption of the terminal. In another method, when the terminal receives an indicator to suspend the cell group, the terminal may activate or switch the DL BWP to the dormant BWP of the PSCell of the cell group by applying BWP configuration information of the PSCell of the cell group, and may perform a terminal operation in the cell in which the dormant BWP is activated according to the disclosure. Also, when the terminal receives an indicator to suspend the cell group, the terminal may deactivate all SCells configured in the cell group. In another method, when the terminal receives an indicator to suspend the cell group, the terminal may activate or switch the DL BWP to the dormant BWP for the SCell in which the dormant BWP is configured from among SCells configured in the cell group, and may perform a terminal operation in the cell in which the dormant BWP is activated according to the disclosure, or may deactivate the SCell in which the dormant BWP is not configured. In another method, when the terminal receives an indicator to suspend the cell group in the RRC message, the terminal may perform activation, deactivation, hibernation, or dormant BWP activation on each SCell according to an indicator or configuration information for each SCell of the cell group included in the RRC message. Alternatively, before or after the terminal receives an indictor to suspend the cell group, the terminal may perform activation, deactivation, hibernation, or dormant BWP activation on each SCell of the cell group through the indicator (e.g., bitmap) of the PDCCH, the MAC control information, or the RRC message.

Configuration information about a transmission resource for performing channel measurement and reporting a measurement result in a dormant BWP or a BWP other than the dormant BWP (e.g., a PUCCH transmission resource information of the PCell, or a PUCCH SCell, or a PSCell)

When an indicator to resume (or activate) the state of the cell group is included, first DRX configuration information (e.g., a monitoring interval, an active period (on-duration) length, a period, or an offset) may be configured to re-perform PDCCH monitoring in the PSCell of the cell group. Alternatively, the terminal may recover and apply the first DRX configuration information that is stored for the cell group. For example, when the terminal receives an indicator to resume the cell group, the terminal may perform PDCCH monitoring by applying the first DRX configuration information that is received from the RRC message or that is stored to resume data transmission or reception. In another method, when the terminal receives an indicator to resume the cell group, the terminal may activate or switch the DL BWP of the PSCell of the cell group to the BWP other than the dormant BWP (e.g., a BWP configured in the RRC message) by applying BWP configuration information of the PSCell of the cell group, and may perform a terminal operation in the cell in which the normal BWP (a BWP other than the dormant BWP) is activated according to the disclosure. Alternatively, when the terminal receives an indicator to resume the cell group, the terminal may trigger a random access procedure in the PSCell of the cell group by applying random access configuration information that is received from the RRC message or that is stored (random access transmission resource information for preamble transmission (time or frequency transmission resource) or designated preamble information). In another method, when the terminal receives an indicator to resume the cell group, if random access configuration information (random access transmission resource information for preamble transmission (time or frequency transmission resource) or designated preamble information) is included in the RRC message, the terminal may trigger a random access procedure (e.g., a CFRA procedure) in the PSCell of the cell group by applying the random access configuration information. When random access configuration information (random access transmission resource information for preamble transmission (time or frequency transmission resource) or designated preamble information) is not included in the RRC message indicating to resume or activate the cell group, the terminal may trigger a random access procedure (e.g., a CBRA procedure) in the PSCell of the cell group, or may trigger a random access procedure based on system information (CBRA or 2-step random access). When there is random access configuration information (random access transmission resource information for preamble transmission (time or frequency transmission resource) or designated preamble information) that is stored in the terminal before an indicator to resume the cell group is received, the terminal may release or discard the random access configuration information. In another method, the terminal may perform PDCCH monitoring in the indicated or configured cell group or cell, and may trigger and perform a random access procedure according to an indication indicated in the PDCCH.

When an indicator to resume (or activate) the state of the cell group is included or when the terminal receives an indicator to resume the cell group, the terminal may activate all SCells configured in the cell group. In another method, when the terminal receives an indicator to resume the cell group, the terminal may activate or switch the DL BWP to the BWP other than the dormant BWP (e.g., a BWP configured in the RRC message or the first active BWP) for the SCell in which the dormant BWP is configured from among SCells configured in the cell group, and may perform a terminal operation in the cell in which the BWP other than the dormant BWP is activated according to the disclosure, or may activate the SCell in which the dormant BWP is not configured. In another method, when the terminal receives an indicator to resume the cell group in the RRC message, the terminal may perform activation, deactivation, hibernation, or dormant BWP activation on each SCell according to an indicator or configuration information for each SCell of the cell group included in the RRC message. Alternatively, before or after the terminal receives an indicator to resume the cell group, the terminal may perform activation, deactivation, hibernation, or dormant BWP activation on each SCell of the cell group through the indicator (e.g., bitmap) of the PDCCH, the MAC control information, or the RRC message.

Indicator adding cell group configuration

Indicator releasing cell group configuration

Security configuration information (security key information, or security information for cell group, or additional information (e.g., sk-counter)

Indicator indicating handover, cell group addition, or cell group modification (e.g., ReconfigurationWithSync indicator or mobilitycontrolInfo indicator)

When the RRC message (e.g., the RRCReconfiguration message) includes an indicator for suspending the cell group, an indicator indicating handover, cell group addition, or cell group modification (e.g., the ReconfigurationWithSync indicator or mobilitycontrolInfo indicator) may not be included, and when the RRC message includes an indicator for resuming the cell group or configuration information for configuration, an indicator indicating handover, cell group addition, or cell group modification (e.g., the ReconfigurationWithSync indicator or the mobilitycontrolInfo indicator) may be included. This is because, when the cell group is resumed, a connection to the cell group should be re-performed, and thus synchronization should be performed, or system information should be received, or a random access procedure should be performed when necessary.

Hereinafter, a dormant BWP in a next-generation mobile communication system newly provided by the disclosure will be described, and a terminal operation in each BWP when each BWP is transitioned or switched will be described in detail.

FIG. 1G illustrates a diagram of a state transition or BWP switching procedure for each bandwidth, according to an embodiment of the disclosure.

Referring to FIG. 1G, a BWP of each cell (e.g., an SCell or a PSCell) of each cell group of a terminal may be activated to a normal BWP 1g-01, or may be activated to a dormant BWP 1g-02, or may be deactivated (1g-03). The terminal may activate or deactivate the normal BWP or the dormant BWP due to an indication according to configuration information of an RRC message, MAC control information, or DCI of a PDCCH.

According to the disclosure, a state transition operation (activation, deactivation, or hibernation) for each BWP of the cell, or an operation of activating the normal BWP, or activating the dormant BWP, or activating the first active BWP activated from dormancy, or deactivating the normal BWP or the dormant BWP may be performed due to an indication or configuration in one of the following cases.

When the BWP state of the cell is configured through the RRC message, or when the BWP of each cell is configured through the RRC message and the dormant BWP is configured in the cell, or when the first active BWP is configured as the dormant BWP, the cell may start by switching to the dormant BWP or activing the dormant BWP and an operation in the dormant BWP may be performed.

When the cell activation, or deactivation, or hibernation MAC CE is received

When the MAC CE indicating to activate or deactivate the normal BWP, or the first active BWP activated from dormancy, or the dormant BWP is received When the DCI of the PDCCH indicating to activate or deactivate the normal BWP, the first active BWP activated from dormancy, or the dormant BWP is received When a cell hibernation timer is not configured in the active cell and a configured cell deactivation timer expires When the BWP hibernation timer is not configured in the active BWP and a configured BWP state deactivation timer (e.g., bwpInactivityTimer) expires Also, a state transition operation or a dormant BWP operation method according to the disclosure may have the following characteristics.

The dormant BWP may not be configured in the SPCell (PCell or PSCell) (or DL BWP or UL BWP of the cell), and only the normal BWP may be configured and may always be activated. Because the SPCell synchronizes and transmits and receives a main control signal, it should always be maintained in the active state because a connection with a base station is disconnected when the BWP of the SPCell is hibernated, or deactivated, or operates as the dormant BWP.

When a PUCCH is configured in the SCell or the BWP of the SCell, the dormant state or the dormant BWP may not be configured. In this case, because there may be another cell in which a feedback such as HARQ ACK/NACK should be sent through the PUCCH, the active state or the normal BWP should be activated and used.

Due to such characteristics, the cell deactivation timer (ScellDeactivationTimer) or the BWP hibernation timer may not be applied to the SPCell or the BWP of the SPCell and the SCell in which the PUCCH is configured or the BWP of the SCell, and may run only in other SCells.

The cell or BWP hibernation timer (ScellHibernationTimer) may be prioritized over the cell or BWP state deactivation timer (ScellDeactivationTimer). When one value is set through the RRC message as a timer value, the same value may be applied to all the cells. In another method, the base station may set a different timer value for each SCell or each BWP by considering cell-by-cell or BWP-by-BWP characteristics.

The cell or the BWP may basically operate in the inactive state initially when it is not indicated as active or dormant in the RRC message.

In the disclosure, the term 'UL' may indicate the UL BWP, and the term 'DL' may indicate the DL BWP. This is because only one activated or hibernated BWP may operate for each UL or each DL.

Hereinafter, a method of operating state transition or switching in units of BWPs (BWP level) to rapidly activate carrier aggregation or dual connectivity and reduce battery consumption of a terminal according to the disclosure will be described.

In the disclosure, the BWP may be configured for each cell in the RRCSetup message, or the RRCReconfiguration message, or the RRCResume message as described with reference to FIG. 1F. The RRC message may include configuration information about a PCell, a PSCell, or a plurality of cells, and a plurality of BWPs may be configured for each cell (PCell, PSCell, or SCell). When the plurality of BWPs are configured for each cell in the RRC message, a plurality of BWPs to be used in the DL of each cell may be configured. In the case of an FDD system, a plurality of BWPs to be used in the UL of each cell may be configured separately from the DL BWPs. In the case of a TDD system, a plurality of BWPs to be commonly used in the DL and the UL of each cell may be configured.

According to a first method of an information configuration method for BWP configuration of each cell (a PCell, a Pscell, or an Scell), BWP configuration information may include one or more of the following information. In the BWP configuration information, a new indicator may be introduced in the BWP to indicate whether each BWP is the normal BWP (e.g., a BWP that may operate or may be configured in the active state or the inactive state) or the dormant BWP (e.g., a BWP that may operate or may be configured in the dormant state). For example, whether each BWP is the dormant BWP may be indicated by a BWP identifier.

1) DL BWP configuration information of each cell

Initial DL BWP configuration information

Multiple BWP configuration information and BWP identifier (ID) corresponding to each BWP DL initial state configuration information of the cell (e.g., active state, dormant state, or inactive state)

BWP identifier indicating a first active DL BWP

BWP identifier indicating a default BWP

BWP identifier indicating a dormant BWP or 1-bit indicator indicating the dormant BWP for each BWP in BWP configuration information When the first active DL BWP is configured as the dormant BWP, the first active UL BWP may also have to be configured as the dormant BWP BWP inactivity timer configuration and timer value BWP identifier first activated from dormant BWP 2) UL BWP configuration information of each cell Initial UL BWP configuration information Multiple BWP configuration information and BWP identifier (ID) corresponding to each BWP UL initial state configuration information of the cell (e.g., active state, dormant state, or inactive state)

BWP identifier indicating a first active UL BWP

BWP identifier indicating a dormant BWP or 1-bit indicator indicating a dormant BWP for each BWP in BWP configuration information When the first active DL BWP is configured as the dormant BWP, the first active UL BWP may also have to be configured as the dormant BWP.

BWP identifier first activated from dormant BWP

SRS-related configuration information may be configured by using the following methods.

1) Embodiment 1 of Configuring SRS

First SRS configuration information indicates SRS configuration information for the BWP other than the normal BWP or the dormant BWP, or the PSCell (or SCell) of the cell group in which the cell group is not suspended, or the PSCell (or SCell) of the cell group in which the cell group is resumed or activated, or the BWP (e.g., indicator indicating whether is SRS configuration information for SRS transmission resource, period, offset, or dormant BWP).

Second SRS configuration information indicates SRS configuration information for the dormant BWP, or the PSCell (or SCell) of the cell group in which the cell group is suspended or deactivated, or the PSCell (or SCell) of the cell group in which the cell group is not resumed, or the BWP (e.g., indicator indicating whether it is SRS configuration information for SRS transmission resource, period, offset, or dormant BWP).

The first SRS configuration information and the second SRS configuration information may be distinguished based on an indicator indicating whether it is SRS configuration information for the dormant BWP or the PSCell (or SCell) of the cell group in which the cell group is suspended or deactivated. For example, the first SRS configuration information and the second SRS configuration information may be distinguished according to an indicator value, or may be distinguished according to whether an indicator value is configured or not, or may be distinguished whether there is no indicator value. In another method, the first SRS configuration information and the second SRS configuration may be distinguished by differently defining their names.

In Embodiment 1 of the disclosure, when the dormant BWP (e.g., the dormant BWP identifier in DL BWP configuration information) is configured in a serving cell (the PSCell or the SCell), or when cell group suspension is indicated, or supported, or configured, the second SRS configuration information may always be configured. Alternatively, when the dormant BWP (e.g., the dormant BWP identifier in the DL BWP configuration information) is configured in the serving cell (the PSCell or the SCell), or when cell group suspension is indicated, or supported, or configured, an indicator indicating whether it is the first SRS configuration information or the second SRS configuration information may be configured. For example, when the dormant BWP identifier is configured in the DL BWP configuration information, or when cell group suspension is indicated, or supported, or configured, the second SRS configuration information may have to be configured in each UL BWP configuration information. For example, when the dormant BWP identifier is configured in the DL BWP configuration information, or when cell group suspension is indicated, or supported, or configured, the second SRS configuration information may have to be configured in the UL BWP configuration information for the UL BWP or the UL BWP having the same BWP identifier as the DL dormant BWP. In another method, in the case of TDD or an unpaired spectrum, when a dormant BWP identifier is configured in the DL BWP configuration information, the second SRS configuration information may have to be configured in the UL BWP configuration information for the UL BWP or the UL BWP having the same BWP identifier as the DL dormant BWP.

For example, in Embodiment 1 of the disclosure, when the DL BWP is switched or activated to the BWP (or normal BWP) other than the dormant BWP for the activated cell, or when cell group suspension is not indicated, or when the cell group is in the active state, or when cell group resumption is indicated, the terminal may apply the first SRS configuration information in the UL BWP of the activated cell (Scell or PSCell), and may transmit an SRS based on an SRS transmission resource, or a period, or an offset corresponding to the first SRS configuration information. When the DL BWP is switched or activated to the dormant BWP for the activated cell, or when cell group suspension is indicated, or when the cell group is not in the active state (or is in the inactive or suspended state), the terminal may apply the second SRS configuration information in the UL BWP of the cell (PSCell or SCell) of the suspended or deactivated cell group, and may transmit an SRS based on an SRS transmission resource, a period, or an offset corresponding to the second SRS configuration information. For example, an SRS transmission resource configured in the second SRS configuration information for the dormant BWP may be configured to be much smaller than an SRS transmission resource configured in the first SRS configuration information for the normal BWP, or an SRS transmission resource period configured in the second SRS configuration information may be configured to be much longer than an SRS transmission resource period configured in the first SRS configuration information, thereby improving the power saving effect of the terminal in the dormant BWP or the suspended cell group. For example, an SRS transmission period of the second SRS configuration information may be configured to be equal to or greater than 100 ms. In another method, when the DL BWP is activated to the dormant BWP, or when cell group suspension is indicated, or when the cell group is not in the active state (or is in the inactive or suspended state), if the second SRS configuration information is not configured, the terminal may apply the first SRS configuration information for the UL BWP, and may transmit an SRS based on an SRS transmission resource, a period, or an offset corresponding to the first SRS configuration information. In another method, when the DL BWP is activated to the dormant BWP, or when cell group suspension is indicated, or when the cell group is not in the active state (or is in the inactive or suspended state), if the second SRS configuration information is not configured, the terminal may not transmit an SRS.

2) Embodiment 2 of Configuring SRS

In Embodiment 2 of the disclosure, the first SRS configuration information and the second SRS configuration information may be included as one SRS configuration information, and may be respectively configured as SRS configuration information for the normal BWP, or the BWP other than the dormant BWP, or the PSCell (or SCell) of the cell group in which the cell group is not suspended, or the PSCell (or SCell) of the cell group in which the cell group is resumed or activated, or the BWP (e.g., the SRS transmission resource, period, or offset) and SRS configuration information for the dormant BWP, or the PSCell (SCell) of the cell group in which the cell group is suspended or deactivated, or the PSCell (or SCell) of the cell group in which the cell group is not resumed, or the BWP (e.g., SRS transmission resource, period, or offset).

The first SRS configuration information indicates SRS configuration information for the normal BWP, or the BWP other than the dormant BWP, or the PSCell (or SCell) of the cell group in which the cell group is not suspended, or the PSCell (or SCell) of the cell group in which the cell group is resumed or activated, or the BWP (e.g., indicator indicating whether it is SRS configuration information for SRS transmission resource, period, offset, or dormant BWP).

The second SRS configuration information indicates SRS configuration information for the dormant BWP, or the PSCell (or SCell) in which the cell group is suspended or deactivated, or the PSCell (or SCell) in which the cell group is not resumed, or the BWP (e.g., the indicator indicating whether it is SRS configuration information for SRS transmission resource, period, offset, or dormant BWP).

In Embodiment 2 of the disclosure, when the dormant BWP (e.g., the dormant BWP identifier in the DL BWP configuration information) is configured in the serving cell (PSCell or SCell), or when cell group suspension is indicated, or supported, or configured, the second SRS configuration information may always be configured. Alternatively, when the dormant BWP (e.g., the dormant BWP identifier in the DL BWP configuration information) is configured in the serving cell (PSCell or SCell), or when cell group suspension is indicated, or supported, or configured, an indicator indicating whether it is the first SRS configuration information or the second SRS configuration information may be configured. For example, when a dormant BWP identifier is configured in the DL BWP configuration information, the second SRS configuration information may have to be configured in each UL BWP configuration information. For example, when a dormant BWP identifier is configured in the DL BWP configuration information, or when cell group suspension is indicated, or supported, or configured, the second SRS configuration information may have to be configured in the UL BWP configuration information for the UL BWP or the UL BWP having the same BWP identifier as the DL dormant BWP. In another method, in the case of TDD or an unpaired spectrum, when a dormant BWP identifier is configured in the DL BWP configuration information, or when cell group suspension is indicated, or supported, or configured, the second SRS configuration information may have to be configured in the UL BWP configuration information for the UL BWP or the UL BWP having the same BWP identifier as the DL dormant BWP.

For example, in Embodiment 2 of the disclosure, when the DL BWP is switched or activated to the BWP (or normal BWP) other than the dormant BWP for the activated cell, or when cell group suspension is not indicated, or when the cell group is in the active state, or when cell group resumption is indicated, the terminal may apply the first SRS configuration information in the UL BWP of the activated cell, and may transmit an SRS based on an SRS transmission resource, or a period, or an offset corresponding to the first SRS configuration information. When the DL BWP is switched or activated to the dormant BWP for the activated cell, or when cell group suspension is indicated, or when the cell group is not in the active state (or is in the inactive or suspended state), the terminal may apply the second SRS configuration information in the UL BWP of the activated cell, and may transmit an SRS based on an SRS transmission resource, or a period, or an offset corresponding to the second SRS configuration information. For example, an SRS transmission resource configured in the second SRS configuration information may be configured to be much smaller than an SRS transmission resource configured in the first SRS configuration information, or an SRS transmission resource period configured in the second SRS configuration information may be configured to be much longer than an SRS transmission resource period configured in the first SRS configuration information, thereby improving the power saving effect of the terminal in the dormant BWP. For example, an SRS transmission period in the second SRS configuration information may be configured to be equal to or greater than 10 ms. In another method, when the DL BWP is activated to the dormant BWP, or when cell group suspension is indicated, or when the cell group is not in the active state (or is in the inactive or suspended state), if the second SRS configuration information is not configured, the terminal may apply the first SRS configuration information for the UL BWP, and may transmit an SRS based on an SRS transmission resource, or a period, or an offset corresponding to the first SRS configuration information. In another method, when the DL BWP is activated to the dormant BWP, or when cell group suspension is indicated, or when the cell group is not in the active state (or is in the inactive or suspended state), if the second SRS configuration information is not configured, the terminal may not transmit an SRS.

3) Embodiment 3 of Configuring SRS

In Embodiment 3 of the disclosure, the second SRS configuration information, that is, SRS configuration for the dormant BWP or cell group suspension indication or configuration (e.g., SRS transmission resource, period, or offset), may be configured only for the BWP or the BWP configured as the UL dormant BWP (the BWP indicated by a dormant BWP identifier) in the UL BWP configuration information. Alternatively, the first SRS configuration information, that is, the SRS configuration information for the normal BWP or the BWP other than the dormant BWP (e.g., the SRS transmission resource, period, or offset) may be configured only for the BWP configured as the BWP other than the UL dormant BWP (the BWP not indicated by a dormant BWP identifier) in the UL BWP configuration information. In another method, in the case of TDD or an unpaired spectrum, when a dormant BWP identifier is configured in the DL BWP configuration information, the second SRS configuration information may have to be configured in the UL BWP configuration information for the UL dormant BWP (the BWP indicated by a dormant BWP identifier) or the UL BWP having the same BWP identifier as the DL dormant BWP.

For example, in Embodiment 3 of the disclosure, when the DL BWP is switched or activated to the BWP (or normal BWP) other than the dormant BWP for the activated cell, the terminal may apply the first SRS configuration information in the UL BWP of the activated cell, and may transmit an SRS based on an SRS transmission resource, or a period, or an offset corresponding to the first SRS configuration information. When the DL BWP is switched or activated to the dormant BWP for the activated cell, the terminal may apply the second SRS configuration information in the UL BWP of the activated cell, and may transmit an SRS based on an SRS transmission resource, or a period, or an offset corresponding to the second SRS configuration information. For example, an SRS transmission resource configured in the second SRS configuration information for the dormant BWP may be configured to be much smaller than an SRS transmission resource configured in the first SRS configuration information for the normal BWP, or an SRS transmission resource period configured in the second SRS configuration information for the dormant BWP may be configured to be much longer than an SRS transmission resource period configured in the first SRS configuration information for the normal BWP, thereby improving the power saving effect of the terminal in the dormant BWP. For example, an SRS transmission period in the second SRS configuration information may be configured to be equal to or greater than 100 ms. In another method, when the DL BWP is activated to the dormant BWP, if the second SRS configuration information is not configured, the terminal may apply the first SRS configuration information for the UL BWP, and may transmit an SRS based on an SRS transmission resource, or a period, or an offset corresponding to the first SRS configuration information. In another embodiment of the disclosure, when the DL BWP is activated to the dormant BWP, if the second SRS configuration information is not configured, the terminal may not transmit an SRS.

As another method of the information configuration method for BWP configuration of each cell (PCell, Pscell, or Scell), a second method may not configure configuration information (e.g., search space, PDCCH transmission resource, or period) required to read the PDCCH for the BWP corresponding to the dormant BWP (the period may be configured to be very long along with other configuration information in another way), and may configure configuration information (e.g., the search space, PDCCH transmission resource, or period) required to read the PDCCH for the normal BWP. This is because the dormant BWP is a BWP for not reading the PDCCH to reduce battery consumption of the terminal and for performing channel measurement and reporting a channel measurement result to the PCell to enable rapid activation of the BWP or cell to allow rapid allocation of UL or DL transmission resources. Accordingly, in the disclosure, the term 'dormant BWP' may indicate a BWP in which configuration information for PDCCH monitoring (e.g., search space, PDCCH transmission resource, or period) is not configured, or may refer to a BWP indicated by a dormant BWP identifier, or may refer to a BWP in which configuration information for PDCCH monitoring is configured but monitoring is configured to be performed with a very long period. In another method, in the disclosure, the term 'dormant BWP' may indicate a BWP in which a PDCCH transmission resource or a period is not configured in configuration information for PDCCH monitoring so as not to perform PDCCH monitoring in the cell in which the dormant BWP is configured, but search space information or cross-carrier scheduling configuration information is configured so that an indication or switching for the dormant BWP is received in another cell through cross-carrier scheduling. Because data transmission/reception is impossible in the dormant BWP, only PDCCH configuration information (PDCCH-config) may be configured (e.g., only search space information may be configured) for the dormant BWP (or first BWP). In contrast, because PDCCH monitoring should also be performed and data transmission/reception should also be possible in the normal BWP (or second BWP) other than the dormant BWP, PDCCH configuration information (e.g., CORESET configuration information, or search space configuration information, or PDCCH transmission resource, or period), or PDSCH configuration information, or PUSCH configuration information, or random access-related configuration information may be further configured.

Accordingly, although the UL or DL normal BWP should be configured for each cell, the dormant BWP may or may not be configured for each cell, and the normal BWP and/or dormant BWP configuration may depend on the base station implementation according to purposes. Also, the first active BWP, or the default BWP, or the initial BWP may be configured as the dormant BWP according to the base station implementation.

In the dormant BWP, the terminal may not transmit/receive data to/from the base station, may not monitor the PDCCH to check an indication of the base station, may not transmit a pilot signal but may perform channel measurement, and may report a measured frequency/cell/channel measurement result according to the base station configuration periodically or when an event occurs. Accordingly, because the terminal does not monitor the PDCCH and does not transmit a pilot signal in the dormant BWP, battery consumption may be reduced compared to the active mode. Also, unlike the inactive mode, because the terminal performs channel measurement reporting, the base station may rapidly activate the cell in which the dormant BWP is configured based on a measurement report of the dormant BWP to use carrier aggregation. In an embodiment of the disclosure, the dormant BWP may be configured in the DL BWP configuration information, and may be used only for the DL BWP.

In the disclosure, a terminal operation for the dormant BWP 1g-02 or a terminal operation of the activated SCell or PSCell when the dormant BWP is activated is as follows. However, the disclosure is not limited thereto.

When the terminal is indicated to operate or be activated with the dormant BWP for a certain serving cell (PCell, PSCell, or SCell) from the PCell or the SPCell, or when the terminal receives an indication to hibernate a BWP (e.g., DL BWP) of a certain serving cell (e.g., SCell) or the serving cell (e.g., SCell) or an indication to activate the dormant BWP through the DCI of the PDCCH (L1 control signal), the MAC CE, or the RRC message, or when the terminal receives an indication to switch the BWP (e.g., DL BWP) to the dormant BWP through the DCI of the PDCCH (L1 control signal), the MAC CE, or the RRC message (when the terminal receives the indication through the L1 control signal of the PDCCH, the terminal may receive the indication via the PDCCH of its own cell through self-scheduling or may receive the indication via the PDCCH for the cell in the PCell through cross-carrier scheduling), or when the BWP hibernation timer is configured and expires, when the activated BWP of the activated cell is the dormant BWP, or when the activated BWP of the activated cell is not the normal BWP, the terminal may perform one or more of the following operations.

The UL BWP or the DL BWP may be switched to the BWP (e.g., the dormant BWP) configured in the RRC and the BWP may be activated or hibernated.

The cell deactivation timer configured or running in the cell or the BWP may be stopped.

When the BWP hibernation timer is configured in the BWP of the cell, the BWP hibernation timer may be stopped.

The dormant BWP deactivation timer in the BWP of the cell may start or re-start.

The BWP inactivity timer configured for the BWP of the cell may be stopped. This is to prevent an unnecessary BWP switching procedure in the cell.

A periodic DL transmission resource (DL SPS or configured downlink assignment) or a periodic UL transmission resource (UL SPS or configured uplink grant type 2) configured in the BWP of the cell may be cleared. The term 'clear' means that the terminal stores configuration information such as period information configured in the RRC message but information about a periodic transmission resource indicated or activated through L1 signaling (e.g., DCI) is removed and is no longer used. An operation of clearing the configured periodic DL transmission resource (DL SPS or configured downlink assignment) or the configured periodic UL transmission resource (UL SPS or configured uplink grant) may be performed only when the BWP is transitioned from the active state to the dormant state. This is because, when the BWP is transitioned from the inactive state to the dormant state, there is no information about periodic transmission resource information indicated or activated through L1 signaling. In another method, only when the periodic DL transmission resource or the periodic UL transmission resource is configured or configured and used, the periodic transmission resources may be cleared.

The periodic UL transmission resource configured in the BWP of the cell (configured uplink grant type 1 configured in the RRC) may be suspended. The term 'suspend' means that transmission resource configuration information configured in the RRC message is stored in the terminal but is no longer used. An operation of suspending the configured periodic UL transmission resource (configured uplink grant type 1) may be performed only when the BWP is transitioned from the active state to the dormant state. This is because the periodic transmission resource is not used when the BWP is transitioned from the inactive state to the dormant state. In another method, only when the periodic DL transmission resource or the periodic UL transmission resource is configured or configured and used, the periodic transmission resources may be cleared.

All HARQ buffers configured in the UL or DL BWP may be emptied.

The terminal may not transmit an SRS for the UL BWP of the cell.

In another method, when the first SRS configuration information (the SRS configuration information for the normal BWP (the BWP other than the dormant BWP) (e.g., the SRS transmission resource, period, or offset)) or the second SRS configuration information (the SRS configuration information for the dormant BWP (e.g., the SRS transmission resource, period, or offset)) is configured in the UL BWP configuration information, the terminal may facilitate power control or scheduling of the network, or may transmit an SRS to rapidly reactivate the UL BWP of the terminal. For example, when the DL BWP is switched or activated to the BWP other than the dormant BWP (or normal BWP) for the activated cell (when the activated BWP is not the dormant BWP), the terminal may apply the first SRS configuration information in the UL BWP of the activated cell, and may transmit an SRS based on an SRS transmission resource, or a period, or an offset corresponding to the first SRS configuration information. When the DL BWP is switched or activated to the dormant BWP (when the activated BWP is the dormant BWP) for the activated cell, the terminal may apply the second SRS configuration information in the UL BWP of the activated cell, and may transmit an SRS based on an SRS transmission resource, or a period, or an offset corresponding to the second SRS configuration information. For example, an SRS transmission resource configured in the second SRS configuration information for the dormant BWP may be configured to be much smaller than an SRS transmission resource configured in the first SRS configuration information for the normal BWP, or an SRS transmission resource period configured in the second SRS configuration information for the dormant BWP may be configured to be much longer than an SRS transmission resource period configured in the first SRS configuration information for the normal BWP, thereby improving the power saving effect of the terminal in the dormant BWP. For example, an SRS transmission period in the second SRS configuration information may be configured to be equal to or greater than 100 ms. In another method, when the DL BWP is activated to the dormant BWP, if the second SRS configuration information is not configured, the terminal may apply the first SRS configuration information for the UL BWP, and may transmit an SRS based on an SRS transmission resource, a period, or an offset corresponding to the first SRS configuration information. In another method, when the DL BWP is activated to the dormant BWP, if the second SRS configuration is not configured, the terminal may not transmit an SRS.

In another method, when the DL BWP is switched or activated to the DL dormant BWP (when the activated BWP is the dormant BWP) for the activated cell, the terminal may switch or activate the UL BWP to the UL dormant BWP. The UL dormant BWP may be indicated as the dormant BWP by a BWP identifier in the UL BWP configuration information configured in the RRC message (e.g., in the case of FDD, an unpaired spectrum, or TDD). In another method, the UL BWP having the same BWP identifier as the DL dormant BWP may be the dormant BWP (e.g., in the case of an unpaired spectrum or TDD). The terminal may apply the second SRS configuration information configured in the UL dormant BWP, and may transmit an SRS based on an SRS transmission resource, or a period, or an offset corresponding to the second SRS configuration information.

In another method, the current UL BWP or the last activated UL BWP may be activated as it is.

In the BWP of the cell, the terminal may perform channel measurement (channel state information (CSI), channel quality indicator (CQI), precoding matrix indicator (PMI), rank indicator (RI), precoding type indicator (PTI), or CSI-reference signal (RS) indicator (CRI)) and may perform measurement reporting for the DL according to the base station configuration. For example, channel or frequency measurement reporting may be periodically performed.

In the BWP of the cell, UL data may not be transmitted through a UL-SCH.

In the BWP of the cell, a random access procedure may not be performed.

In the BWP of the cell, the terminal may not monitor the PDCCH.

The terminal may not monitor the PDCCH for the BWP of the cell. However, in the case of cross-scheduling, the terminal may receive an indication by monitoring the PDCCH for the cell (e.g., SCell) in the scheduled cell (e.g., PCell).

In the BWP of the cell, PUCCH or SPUCCH transmission may not be performed.

The DL BWP may be hibernated, channel measurement may be performed and reported, and the UL BWP of the cell may be deactivated and may not be used. This is because, in the dormant cell, channel measurement is performed only for the DL BWP, and a measurement result is reported in the UL BWP of the SPCell (PCell or PSCell) or the SCell with the PUCCH.

When switching or activation to the dormant BWP is indicated for the DL or hibernation is indicated for the BWP, a random access procedure may be performed without being cancelled. This is because, in the cell, when a random access procedure is performed, a preamble is transmitted via the UL and an RAR is received via the DL of the PCell. Accordingly, even when the DL BWP is hibernated or switched to the dormant BWP, no problem occurs.

In the disclosure, a terminal operation when the normal BWP (active BWP) 1g-01 of the activated cell is activated or when the BWP other than the dormant BWP is activated is as follows. However, the disclosure is not limited thereto.

- When an indication to activate the normal BWP (e.g., DL BWP) of the current cell (PCell, or PSCell, or SCell) or the normal BWP other than the dormant BWP or an indication to activate the cell is received through the DCI of the PDCCH (L1 control signal), the MAC CE, or the RRC message, or when an indication to switch the BWP (e.g., DL BWP) to the active BWP (or a BWP other than the dormant BWP) is received through the DCI of the PDCCH (L1 control signal), the MAC CE, or the RRC message, or when the activated BWP of the currently activated cell is the normal BWP, or when the activated BWP of the currently activated cell is not the dormant BWP (when the indication is received through the L1 control signal of the PDCCH, the indication may be received through the PDCCH of its own cell through self-scheduling or the indication may be received through the PDCCH for the cell in the PCell through cross-carrier scheduling), the terminal may perform one or more of the following operations.
- It may be switched or activated to the indicated UL or DL BWP. Alternatively, the UL or DL BWP may be switched to the designated BWP (e.g., UL or DL first active BWP) and the BWP may be activated.
- In the activated BWP, an SRS may be transmitted so that the base station performs channel measurement for the UL. For example, the SRS may be periodically transmitted.
- In another method, when the first SRS configuration information (the SRS configuration information for the normal BWP (the BWP other than the dormant BWP) (e.g., the SRS transmission resource, period, or offset)) or the second SRS configuration information (the SRS configuration information for the dormant BWP (e.g., the SRS transmission resource, period, or offset)) is configured in the UL BWP configuration information, the terminal may facilitate power control or scheduling of the network, or may transmit an SRS to rapidly deactivate the UL BWP of the terminal. For example, when the DL BWP is switched or activated to the BWP other than the dormant BWP (or normal BWP) for the activated cell (when the first active BWP is not the dormant BWP), the terminal may apply the first SRS configuration information in the UL BWP of the activated cell, and may transmit an SRS based on an SRS transmission resource, or a period, or an offset corresponding to the first SRS configuration information. When the DL BWP is switched or activated to the dormant BWP for the activated cell (when the first active BWP is the dormant BWP), the terminal may apply the second SRS configuration information in the UL BWP of the activated cell, and may transmit an SRS based on an SRS transmission resource, or a period, or an offset corresponding to the second SRS configuration information. For example, an SRS transmission resource configured in the second SRS configuration information for the dormant BWP may be configured to be much smaller than an SRS transmission resource configured in the first SRS configuration information for the normal BWP, or an SRS transmission resource period configured in the second SRS configuration information for the dormant BWP may be configured to be much longer than an SRS transmission resource period configured in the first SRS configuration information for the normal BWP, thereby improving the power saving effect of a terminal. For example, an SRS transmission period in the second SRS configuration information may be configured to be equal to or greater than 100 ms. In another method, when the DL BWP is activated to the dormant BWP, if the second SRS configuration information is not configured, the terminal may apply the first SRS configuration information for the UL BWP, and may transmit an SRS based on an SRS transmission resource, or a period, or an offset corresponding to the first SRS configuration information. In another method, when the DL BWP is activated to the dormant BWP, if the second SRS configuration information is not configured, the terminal may not transmit an SRS.
- In another method, when the DL BWP is switched or activated to the BWP or the normal BWP other than the DL dormant BWP for the activated cell (when the first active BWP is not the dormant BWP), the terminal may switch or activate the UL BWP to the BWP first activated from dormancy configured in the RRC. The BWP first activated from UL dormancy may be indicated as the BWP first activated from dormancy by a BWP identifier in the UL BWP configuration information configured in the RRC message (e.g., in the case of FDD, an unpaired spectrum, or TDD). In another method, the UL BWP having the same BWP identifier as the DL dormant BWP may be the dormant BWP (e.g., in the case of an unpaired spectrum or TDD). The terminal may apply the first SRS configuration information configured in the BWP first activated from dormancy, and may transmit an SRS based on an SRS transmission resource, or a period, or an offset corresponding to the first SRS configuration information.
- In another method, the current UL BWP or the last activated UL BWP may be activated as it is.
- In another method, when the first active DL BWP is not the dormant BWP
- When the cell is in the inactive state before MAC control information indicating cell activation or deactivation is received, or when the cell is configured in the active state in cell configuration or configuration information through the RRC message,
- The UL BWP or the DL BWP may be activated to a BWP indicated by a first active UL BWP identifier or a first active DL BWP identifier in RRC configuration information.
- In another method, when the first active DL BWP is the dormant BWP
- The BWP inactivity timer may be stopped.
- When the cell is in the inactive state before MAC control information indicating cell activation or deactivation is received, or when the cell is configured in the active state in cell configuration or configuration information through the RRC message,
- The UL BWP or the DL BWP may be activated to a BWP indicated by a first active UL BWP identifier (or dormant BWP identifier) or a first active DL BWP identifier (or dormant BWP identifier) in RRC configuration information. For example, when the first active DL BWP is configured as the dormant BWP, the first active UL BWP may also be configured as the dormant BWP.

In another method, the DL BWP may be activated to a BWP indicated by a first active DL BWP identifier (or dormant BWP identifier) in RRC configuration information. The UL BWP may be activated to a BWP indicated by a dormant BWP identifier (or first active UL BWP identifier) in RRC configuration information.

When the PUCCH is configured in the activated BWP, PUCCH transmission may be performed.

The BWP or cell deactivation timer may start or re-start. In another method, only when the BWP or cell hibernation timer is not configured, the BWP or cell deactivation timer may start or re-start. The BWP or cell hibernation timer may be configured in the RRC message, and when the BWP or cell hibernation timer expires, the BWP or cell may be hibernated. For example, the BWP or cell deactivation timer may start or re-start only in the hibernated BWP or cell.

When there is a suspended type 1 configuration transmission resource, the stored type 1 transmission resource may be initialized and used as configured. The type 1 configuration transmission resource is a periodic transmission resource (UL or DL) that is previously allocated through the RRC message and refers to a transmission resource that may be activated and used through the RRC message.

Power headroom report (PHR) may be triggered for the BWP.

In the activated BWP, the terminal may report a channel measurement result (CSI, CQI, PMI, RI, PTI, or CRI) according to the base station configuration for the DL.

In the activated BWP, the PUCCH may be monitored to read an indication of the base station.

In order to read cross-scheduling for the activated BWP, the PDCCH may be monitored.

The BWP inactivity timer may start or re-start. In another method, only when the BWP hibernation timer is not configured, the BWP inactivity timer may start or re-start. The BWP hibernation timer may be configured in the RRC message, and when the BWP hibernation timer expires, the BWP may be switched to dormancy or the dormant BWP. For example, only in the dormant BWP, the BWP inactivity timer may start or re-start.

When the BWP hibernation timer is configured for the BWP

The BWP hibernation timer may start or re-start for the BWP.

In the disclosure, a terminal operation when the inactive BWP (non-active BWP) 1g-03, or the BWP, or the cell is deactivated is as follows. However, the disclosure is not limited thereto.

When an indication to deactivate the BWP (e.g., DL BWP) of the current cell (PCell, PSCell, or SCell) or the cell is received through the DCI of the PDCCH (L1 control signal), the MAC CE, or the RRC message, or when an indication to deactivate the BWP (e.g., DL BWP) or an indication to switch to the inactive BWP is received through the DCI of the PDCCH (L1 control signal), the MAC CE, or the RRC message (when the indication is received through the L1 control signal of the PDCCH, the indication may be received via the PDCCH of its own cell through self-scheduling, or the indication may be received via the PDCCH for the cell in the PCell through cross-carrier scheduling), or when the BWP or cell deactivation timer expires in the cell, or when the activated cell is deactivated, or when the BWP of the cell is deactivated, the terminal may perform one or more of the following operations.

The cell or the indicated UL or DL BWP may be deactivated.

The terminal may stop the BWP inactivity timer (e.g., the inactivity timer for the DL BWP) that is configured and running in the cell or the BWP.

A periodic DL transmission resource (the DL SPS or configured downlink assignment) or a periodic UL transmission resource (the UL SPS or configured uplink grant type 2) configured in the cell or the BWP may be cleared. The term 'clear' means that the terminal stores configuration information such as period information configured in the RRC message but information about a periodic transmission resource indicated or activated through L1 signaling (e.g., DCI) is removed and is no longer used. The periodic transmission resource may be referred to as a type 2 configuration transmission resource. Also, an operation of clearing the periodic transmission resource may be performed only when the cell is transitioned from the active state to the inactive state. This is because, when the cell is transitioned from the dormant state to the inactive state, there is no periodic transmission resource in the dormant state, and thus a clearing operation is not necessary. In another method, only when the periodic DL transmission resource or the periodic UL transmission resource is configured, or configured and used, the periodic transmission resources may be cleared.

The periodic UL transmission resource configured in the cell or the BWP (the configured uplink grant type 1 configured in the RRC) may be suspended. The term 'suspend' means that transmission resource configuration information configured in the RRC message is stored in the terminal but is no longer used. The periodic transmission resource may be referred to as a type 1 configuration transmission resource. Also, an operation of clearing a periodic transmission resource may be performed only when the cell is transitioned from the active state to the inactive state. This is because, when the cell is transitioned from the dormant state to the inactive state, there is no periodic transmission resource in the dormant state, and thus a clearing operation is not necessary. In another method, only when the periodic DL transmission resource or the periodic UL transmission resource is configured, or configured and used, the periodic transmission resources may be cleared.

All HARQ buffers configured for the cell or the BWP may be emptied.

When there is a PUSCH transmission resource configured for periodic channel measurement reporting (semi-persistent CSI reporting) for the cell or the BWP, the PUSCH transmission resource may be cleared.

The terminal may not transmit an SRS for the cell or the BWP.

For the cell or the BWP, the terminal may not perform channel measurement (CSI, CQI, PMI, RI, PTI, or CRI) and may not perform reporting for the DL.

In the cell or the BWP, UL data may not be transmitted through the UL-SCH.

For the cell or the BWP, a random access procedure may not be performed.

In the cell or BWP, the terminal may not monitor the PDCCH.

The terminal may not monitor the PDCCH for the cell or the BWP. Also, even in the case of cross-scheduling, the terminal may not monitor the PDCCH for the cell in the scheduled cell.

In the cell or the BWP, PUCCH or SPUCCH transmission may be not performed.

According to an embodiment of the disclosure, when an active state, or an inactive state, or a dormant state of a cell or a BWP is operated and cell or BWP transition or switching is performed, it may be performed in units of BWPs. When state transition or switching occurs in units of BWPs, a BWP (DL BWP or UL BWP) indicated with state transition or switching may perform state transition or switching according to a state transition or switching indication. For example, when the BWP (DL BWP or UL BWP) is transitioned from the active state to the dormant state or is switched (or activated) to the dormant BWP, the BWP may be transitioned to the dormant state, or may be switched (or activated) to the dormant BWP.

In the disclosure, the term 'BWP switching' may mean that, when BWP switching is indicated by the DCI of the PDCCH and when switching is indicated by a BWP identifier while allocating a downlink assignment, the DL BWP is switched to the BWP indicated by the BWP identifier; and when BWP switching is indicated by the DCI of the PDCCH and when switching is indicated by a BWP identifier while allocating an UL grant, the UL BWP is switched to the BWP indicated by the BWP identifier. Also, because the DCI format of the PDCCH is different between the format for downlink assignment (format1) and the format for UL grant (format0), the terminal may operate according to the DCI format although the UL and the DL are not separately described.

The method of operating state transmission in units of BWPs (BWP-level) and the operation of the BWP according to each state according to the disclosure may be extended and applied to various embodiments of the disclosure. Specific embodiments to which the content provided by the disclosure is extended and applied will now be described below.

FIG. 1H illustrates a diagram of a discontinuous (DRX) configuration or a DRX operation method for reducing battery consumption of a terminal, according to an embodiment of the disclosure.

Referring to FIG. 1H, a base station may configure, in a terminal, a DRX function such as a DRX cycle, a start point, an offset, or an on-duration (active period or active time) through an RRC message as shown in FIG. 1F. According to an embodiment of the disclosure, the base station may configure the DRX function in a PCell, a SPCell, or a PSCell.

When the DRX function is configured in the PCell (or the SPCell or the PSCell), the terminal may apply the DRX function by considering a DRX cycle 1h-03 and a DRX start time, or an offset. When the DRX function is applied, the terminal may monitor a PDCCH or DCI of the PDCCH that may be received from the base station in the PCell, only in an active period (on-duration or active time) 1h-01 of DRX. Also, the terminal may not monitor the PDCCH or the DCI of the PDCCH outside the active period (outside active time) 1h-02 of the DRX function, thereby reducing battery consumption of the terminal.

As shown in FIG. 1F, the base station may configure, in the terminal, a power saving function (power saving mode) through the RRC message to further reduce battery consumption of the terminal. When the power saving function is configured along with the DRX function, the terminal may monitor the PDCCH outside the active period during a short period 1h-04 configured in RRC before the active time 1h-01 in which the terminal should monitor the PDCCH in the DRX function, and may monitor and receive a WUS outside the active period. The base station may indicate whether the terminal should or may not perform PDCCH monitoring in a next active time 1h-05 and 1h-07 through the bit of the DCI of the PDCCH of the WUS.

That is, the terminal configured with the power saving function or the DRX function may monitor the WUS during the short period 1h-04 configured in the RRC message before each active time 1h-05. When the bit of the DCI of the PDCCH about the next active time 1h-05 and 1h-07 in the received WUS has a value of 0 (or 1), it may be indicated that the terminal may not monitor the PDCCH during the next active time 1h-07, or may not monitor the PDCCH by not running a timer corresponding to the next active time in a MAC layer. When the bit of the DCI of the PDCCH about the next active time 1h-05 and 1h-07 in the received WUS has a value of 1 (or 0), it may be indicated that the terminal may monitor the PDCCH during the next active time 1h-05, or may monitor the PDCCH by running a timer corresponding to the next active time in the MAC layer.

The terminal may not monitor the WUS or the PDCCH for WUS detection in the active period 1h-01 and 1h-05.

The terminal configured with the power saving function or the DRX function may detect a signal by identifying the PDCCH by using a first RNTI identifier (e.g., PS-RNTI) when the WUS is monitored during the short period 1h-04 configured in the RRC message before each active time 1h-05. The first RNTI identifier (e.g., PS-RNTI) may be configured in a plurality of terminals, and the base station may indicate the plurality of terminals to monitor or not to monitor the PDCCH in the next active period by using the first RNTI identifier (e.g., PS-RNTI).

The terminal configured with the power saving function or the DRX function may detect a signal based on a second RNTI (e.g., C-RNTI), a third RNTI (e.g., MCS-C-RNTI), or a fourth RNTI (e.g., SPS-C-RNTI or CS-RNTI) uniquely configured in the terminal through the RRC message when the PDCCH is monitored and detected in the active time 1h-05. The second RNTI (e.g., C-RNTI) may be used to indicate general scheduling of the terminal, the third RNTI (e.g., MCS-C-RNTI) may be used to indicate a modulation or coding scheme (MCS) of the terminal, and the fourth RNTI (e.g., SPS-C-RNTI or CS-RNTI) may be used to indicate a periodic transmission resource of the terminal.

FIG. 1I illustrates a diagram for describing a method of operating a dormant BWP in an activated Scell or PSCell, according to an embodiment of the disclosure.

As shown in FIG. 1F, for carrier aggregation, a base station may configure, in a terminal, a plurality of SCells and allocate each SCell identifier through an RRC message, and may configure a dormant BWP for each SCell. Also, for dual connectivity, the base station may configure a plurality of cell groups and allocate a cell group identifier, and may configure or indicate a cell group suspension indicator for each cell group or a PSCell of each cell group, or may configure a dormant bandwidth. Also, the base station may include and configure the plurality of SCells in each SCell group. One SCell group may include a plurality of SCells. A SCell group identifier may be allocated to each SCell group, and a plurality of SCell identifiers may be configured to be included in or mapped to each SCell group identifier. A Scell identifier value or a SCell group identifier value may be assigned to a value of a certain bit, and may have an integer value (or natural value). Alternatively, the PSCell of each cell group may be indicated by a cell group identifier.

Referring to FIG. 1I, the base station may define a new bitmap in DCI of a PDCCH transmitted in the PCell and may map each bit of the bitmap to indicate each SCell identifier value, or each SCell group identifier value, or a cell group (or SCG) identifier, or the PSCell (or SCell) of the cell group (or SCG). The base station may define a bit value of each bit, to indicate whether to switch to the dormant BWP, or whether to activate the dormant BWP, or whether to suspend the cell group, or whether to resume the cell group, for the SCell corresponding to the bit, or the SCells belonging to the SCell group, or the cell group (or SCG), or the PSCell (or SCell) of the cell group (or SCG). Also, the base station may indicate whether to switch from the dormant BWP to a normal BWP (e.g., the first active BWP activated from dormancy) or whether to activate the normal BWP (e.g., the first active BWP activated from dormancy), for the SCell corresponding to the bit, or the SCells belonging to the SCell group, or the cell group (or SCG) identifier, or the PSCell (or SCell) of the cell group (or SCG).

After receiving the DCI of the PDCCH in a PCell 1*i*-01, the terminal may read the DCI and may determine whether there is a bitmap including an indication for the BWP of the SCell or the SCell groups (e.g., to be switched or activated to the dormant BWP or to be switched or activated to the normal BWP), or an indication to suspend or resume the cell group (or SCG) or the PSCell (or SCell) of the cell group (or SCG). When there is the bitmap, the terminal may switch or activate the BWP or suspend or resume the cell group according to a bit value, for the SCell indicated by each bit of the bit map, or SCells 1*i*-02 and 1*i*-03 belonging to the SCell group, or the cell group (or SCG), or the PSCell (or SCell) of the cell group (or SCG). For example, when the bit of the bitmap indicates the first SCell (or first SCell identifier) 1*i*-02, or the cell group (or SCG), or the PSCell (or SCell) of the cell group (or SCG) or indicates the SCell group (or SCell group identifier) including the first SCell, if the bit value is 0 (or 1), the terminal may activate a BWP 1*i*-21 to a dormant BWP 1*i*-22 or may switch a current BWP to the dormant BWP 1*i*-22, for the first SCell 1*i*-02, or the cell group (or SCG), or the PSCell (or SCell) of the cell group (or SCG). Alternatively, when the current BWP is not the dormant BWP, the terminal may switch or activate the currently activated BWP 1*i*-21 to the dormant BWP 1*i*-22 (1*i*-25), or may suspend or deactivate the cell group. In another method, the cell group (or SCG) or the PSCell (or SCell) of the cell group (or SCG) may be maintained as it is, second DRX configuration information or second SRS configuration information according to the disclosure may be applied, and PDCCH monitoring may be performed with a long period or SRS transmission may be performed with a long period, thereby reducing power consumption of the terminal.

After receiving the DCI of the PDCCH in the PCell 1*i*-01, the terminal may read the DCI and may determine whether there is a bitmap including an indication for the BWP of the SCell or the SCell groups (e.g., to be switched or activated to the dormant BWP or to be switched or activated to the normal BWP), or an indication for the BWP of the cell group (or SCG) or the PSCell (or SCell) of the cell group (or SCG), or an indication to suspend or resume the cell group. When there is the bitmap, the terminal may switch or activate the BWP or suspend or resume the cell group according to the bit value, for the SCell indicated by each bit of the bitmap, or the SCells 1*i*-02 and 1*i*-03 belonging to the SCell group, or the cell group (or SCG), or the PSCell (or SCell) of the cell group (or SCG). For example, when the bit of the bitmap indicates the second SCell (or second SCell identifier) 1*i*-03, or the SCell group (or SCell group identifier) including the second SCell, or the cell group (or SCG), or the PSCell (or SCell) of the cell group (or SCG), if the bit value is 1 (or 0), the terminal may, when the currently activated BWP of the second SCell 1*i*-03 is a dormant BWP 1*i*-32, or when the currently activated BWP is not the normal BWP, or when the current BWP (or cell) is activated and the current BWP is activated to the dormant BWP 1*i*-32 (or when activated to the BWP other than the normal BWP), switch or activate the BWP of the second SCell 1*i*-03 to the BWP 1*i*-33 configured in the RRC message (e.g., the first active BWP activated from dormancy) (1*i*-35) or may resume or activate the cell group. When the bit value is 1 (or 0) and thus the SCell indicated by the bit, or the SCells belonging to the SCell group, or the cell group (or SCG), or the PSCell (or SCell) of the cell group (or SCG) should be switched or activated to the BWP other than the dormant BWP or the cell group should be resumed, for the SCell or each SCell belonging to the Scell group, if the state of the SCell is the inactive state or the state of the SCell is the active state and the activated BWP is not the dormant BWP (or is the normal BWP), the bit value may not be applied, or may be ignored, or may not be read. Alternatively, when the cell group (or SCG) or the PSCell (or SCell) of the cell group (or SCG) is already in the active or resumed state, the bit value may not be applied, or may be ignored, or may not be read. Also, when the bit value is 0 (or 1) and thus the SCell indicated by the bit, or the SCells belonging to the SCell group, or the cell group (or SCG), or the PSCell (or SCell) of the cell group (or SCG) should be switched or activated to the dormant BWP or the cell group should be suspended, for the Scell or each SCell belonging to the Scell group, if the state of the SCell is the active state and the activated BWP is the dormant BWP, the bit value may not be applied, or may be ignored, or may not be read. Alternatively, when the cell group (or SCG) or the PSCell (or SCell) of the cell group (or SCG) is already in the suspended or deactivated state, the bit value may not be applied, or may be ignored, or may not be read.

FIG. 1J illustrates Embodiment 1 of a method of operating a dormant BWP in an activated SCell, according to an embodiment of the disclosure.

In Embodiment 1 of the disclosure, as shown in FIG. 1F, for carrier aggregation, a base station may configure, in a terminal, a plurality of SCells through an RRC message and may allocate each SCell identifier, may configure a dormant BWP for each SCell, and may not configure a dormant BWP for a certain SCell. Alternatively, for dual connectivity, the base station may configure one or more cell groups and may configure each cell group identifier or each cell group state, or may configure a dormant BWP for a PSCell (or SCell) of each cell group, and may not configure a dormant BWP for a certain cell. Also, the base station may include and configure the plurality of SCells in each SCell group, and one SCell group may include a plurality of SCells. A SCell group identifier may be allocated to each SCell group, and a plurality of SCell identifiers may be configured to be included in or mapped to each SCell group identifier. A Scell identifier value, or a SCell group identifier value, or a cell group (or SCG) identifier may be assigned to a value of a certain bit, and may have an integer value (or natural value). In this disclosure, SCell groups or SCell group identifiers configured for or to apply Embodiment 1 of the disclosure may be referred to as first SCell groups. In Embodiment 1 of the disclosure, the first SCell groups may indicate group identifiers applying an operation of monitoring, by the terminal, DCI of a PDCCH and indicating in a bitmap value of the received DCI in a short period (of active time) or a period outside an active period.

Referring to FIG. 1J, the base station may configure a power saving function or a DRX function in each of a plurality of terminals through an RRC message as shown in FIG. 1F. The base station may configure, in each terminal through the RRC message, time information about a short period 1j-02 in which a first DCI format or a WUS should be detected before an active period 1j-30 of a DRX cycle in a PCell 1j-01 or an SPCell, or configuration information about the first DCI format. Also, when the terminal detects the first DCI format in the PCell or the SPCell in the short period 1j-02, the base station may configure, through the RRC message, a position of a bitmap including an indication for the first SCell groups for each terminal in the first DCI format. Through the RRC message, the base station may configure, in the terminal, a search space or a terminal identifier (e.g., PS-RNTI) of PDCCH monitoring for detecting the first DCI format during the short period 1j-02. Because the terminal does not monitor the DCI of the PDCCH when switched or activated to a dormant BWP for the SCell or the PSCell, it may be very inefficient for the terminal to receive the DCI of the PDCCH or the bitmap in a SCell other than the PCell or the SPCell. Accordingly, the terminal may monitor the DCI of the PDCCH in the PCell or the SpCell.

For example, the base station may configure a power saving function or a DRX function in a plurality of terminals, and may transmit a first DCI format 1j-03 through a transmission resource of the PDCCH in the short period 1j-02 configured before the next active period 1j-30 of the DRX cycle configured in the terminals. The first DCI format 1j-03 may include bitmaps 1j-04 and 1j-05 including indication information for the dormant BWP about the first SCell groups configured in each of the plurality of terminals, or an indication to suspend or resume the cell group (or SCG) or the PSCell (or SCell) of the cell group (or SCG).

A first terminal 1j-10 applying information configured in the RRC message may perform PDCCH monitoring based on the PS-RNTI that is an identifier configured in the short period 1j-02 configured before the next active period 1j-30 of the DRX cycle, and may detect the first DCI format 1j-03 transmitted from the base station in the search space. When the first DCI format 1j-03 is detected, the first terminal 1j-10 may read, through the time information or the position information configured in the RRC message in the first DCI format 1j-03, the bitmap 1j-04 including indication information for the dormant BWP about the first SCell groups of the first terminal 1j-10, or the cell group (or SCG), or the PSCell (or SCell) of the cell group (or SCG), or information indicating to suspend or resume the cell group (or SCG) or the PSCell (or SCell) of the cell group (or SCG). A length of the bitmap 1j-04 may be configured to be the same as the number of the first SCell groups configured in the first terminal 1j-10, or the cell groups (or SCGs), or the PSCells (or SCells) of the cell groups (or SCGs), and may be configured to be up to a certain number (e.g., 5). Each of bits 1j-11 and 1j-12 of the bitmap 1j-04 may be mapped to each of the first SCell groups in an ascending order of an each SCell group identifier value of the first SCell groups configured in the first terminal 1j-10 from a right bit of the bitmap (e.g., from a least significant bit (LSB)). In another method, each of the bits 1j-11 and 1j-12 may be mapped to each of the first SCell groups in a descending order of each SCell group identifier value of the first SCell groups configured in the first terminal 1j-10 from the right bit of the bitmap (e.g., from the LSB). In another method, each of the bits 1j-11 and 1j-12 of the bitmap may be mapped to each of the first SCell groups in an ascending order of each SCell group identifier value of the first SCell groups configured in the first terminal 1j-10 from a left bit of the bitmap (e.g., from a most significant bit (MSB)). In another method, each of the bits 1j-11 and 1j-12 of the bitmap may be mapped to each of the first SCell groups in a descending order of each SCell group identifier value of the first SCell groups configured in the first terminal 1j-10 from the left bit of the bitmap (e.g., from the MSB). A new bit may be defined in the first DCI format 1j-03 of the PDCCH, and the new bit may be used as information indicating to suspend or resume the cell group (or SCG) or the PSCell (or SCell) of the cell group (or SCG).

When the bit value of each of the bits 1j-11 and 1j-12 of the bitmap is 0, the bit value of 0 may indicate to switch to the dormant BWP or to activate the dormant BWP (when the dormant BWP is configured) for each activated SCell from among the SCells included in the first SCell group corresponding to the bit. In another method, when the bit value of each of the bits 1j-11 and 1j-12 of the bitmap is 0, the bit value of 0 may indicate to switch to the dormant BWP or activate the dormant BWP, when an activated BWP is not the dormant BWP (or is a normal BWP) for each activated SCell from among the SCells included in the first SCell group corresponding to the bit.

When the bit value of each of the bits 1j-11 and 1j-12 of the bitmap is 1, the bit value of 1 may indicate to switch to the normal BWP (e.g., the first active BWP activated from dormancy) or to activate to the normal BWP (e.g., the first active BWP activated from dormancy) for each activated SCell from among the SCells included in the first SCell group corresponding to the bit. In another method, when the bit value of each of the bits 1j-11 and 1j-12 of the bitmap is 1, the bit value of 1 may indicate to switch to the normal BWP (e.g., the first active BWP activated from dormancy) or to activate to the normal BWP (e.g., the first active BWP activated from dormancy), when a current or activated BWP is the dormant BWP (or is not the normal BWP) for each activated SCell from among the SCells include in the first SCell group corresponding to the bit. Otherwise (when the current or activated BWP is not the dormant BWP (or is the normal BWP) for each activated SCell from among the SCells included in the first SCell group corresponding to the bit), the first terminal 1j-10 may maintain, or may continuously use or apply, or may activate the current active BWP. In another method, when the bit value of each of the bits 1j-11 and 1j-12 of the bitmap is 1, the bit value of 1 may indicate to switch from the dormant BWP to the normal BWP (e.g., the first active BWP activated from dormancy), or to activate to the normal BWP (e.g., the first active BWP activated from dormancy), or to maintain, or continuously use or apply, or activate the current active BWP for each activated SCell from among the SCells included in the first SCell group corresponding to the bit.

After receiving the DCI of the PDCCH in the PCell 1j-01, the terminal may read the DCI and may determine whether there is a bitmap including an indication for the BWP of the cell group (or SCG) or the PSCell (or SCell) of the cell group (or SCG) or an indication to suspend or resume the cell group. When there is the bitmap, the terminal may switch or activate the BWP, or may suspend or resume the cell group, according to the bit value for the cell group (or SCG) indicated by each bit of the bitmap or the PSCell (or SCell) of the cell group (or SCG). For example, when the bit of the bitmap indicates the cell group (or SCG) or the PSCell (or SCell) of the cell group (or SCG) and the bit value is 1 (or 0), the terminal may resume or activate the cell group. When the bit value is 1 (or 0) and thus the cell group (or SCG) or the PSCell (or SCell) of the cell group (or SCG) indicated by the bit should be switched or activated to the BWP other than the dormant BWP or the cell group should be resumed, if the cell group (or SCG) or the PSCell (or SCell) of the cell group (or SCG) is already in the active or resumed state, the bit value may not be applied, or may be ignored, or may not be read. Also, for example, when the bit of the bitmap indicates the cell group (or SCG) or the PSCell (or SCell) of the cell group (or SCG) and the bit value is 0 (or 1), the terminal may switch or activate the BWP of the cell group (or SCG) or the PSCell (or SCell) of the cell group corresponding to the bit to the dormant BWP, or may suspend or deactivate the cell group. When the bit value is 0 (or 1) and thus the cell group (or SCG) or the PSCell (or SCell) of the cell group (or SCG) indicated by the bit should be switched or activated to the dormant BWP or the cell group should be suspended, for the SCell or each SCell belonging to the SCell group, if the state of the SCell is the active state and the activated BWP is the dormant BWP, the bit value may not be applied, or may be ignored, or may not be read. Alternatively, when the cell group (or SCG) or the PSCell (or SCell) of the cell group (or SCG) is already in the suspended or deactivated state, the bit value may not be applied, or may be ignored, or may not be read.

The first DCI format of the PDCCH according to Embodiment 1 of the disclosure may be used in a short period, and the terminal may not be accompanied by a DL transmission resource (e.g., PDSCH) or a UL transmission resource (e.g., PUSCH). Accordingly, in Embodiment 1 of the disclosure, the terminal may receive the first DCI format of the PDCCH, and may not transmit ACK or NACK information (e.g., HARQ ACK or NACK).

FIG. 1K illustrates Embodiment 2 of a method of operating a dormant BWP in an activated SCell, according to an embodiment of the disclosure.

In Embodiment 2 of the disclosure, for carrier aggregation, a base station may configure, in a terminal, a plurality of SCells through an RRC message and may allocate each SCell identifier as shown in FIG. 1F. Alternatively, for dual connectivity, the base station may configure one or more cell groups and may configure each cell group identifier or each cell group state, or may configure a dormant BWP for a PSCell (or SCell) of each cell group, and may not configure a dormant BWP for a certain cell. The base station may configure a dormant BWP for each cell, and may not configure a dormant BWP for a certain cell. Also, the base station may include and configure the plurality of SCells in each SCell group, and one SCell group may include a plurality of SCells. A SCell group identifier may be allocated to each SCell group, and a plurality of SCell identifiers may be configured to be included in or mapped to each SCell group identifier. A Scell identifier value, a SCell group identifier value, or a cell group (or SCG) identifier may be assigned to a value of a certain bit, and may have an integer value (or natural value). In this disclosure, SCell groups or SCell group identifiers configured for or to apply Embodiment 2 of the disclosure may be referred to as second SCell groups. In Embodiment 2 of the disclosure, the second SCell groups may indicate group identifiers applying an operation of monitoring, by the terminal, DCI of a PDCCH and indicating in a bitmap value of the received DCI in an active period (within active time).

Referring to FIG. 1K, the base station may configure a power saving function or a DRX function in the terminal through the RRC message as shown in FIG. 1F. The base station may configure, in the terminal through the RRC message, configuration information about a second DCI format (e.g., DCI format 0_1 or DCI formant 1_1) which should be detected by the terminal in an active period 1k-30 of a DRX cycle for a PCell or an SPCell. When the terminal detects the second DCI format in the PCell or the SPCell, the terminal may determine whether a bitmap including an indication for the second SCell groups for the terminal is included in the second DCI format. Also, through the RRC message, the base station may configure, in the terminal, a search space or a terminal identifier (e.g., C-RNTI, MCS-C-RNTI, or SPS-C-RNTI (or CS-RNTI)) of PDCCH monitoring for detecting the second DCI format during the active period 1k-30. Because the terminal does not monitor the DCI of the PDCCH when switched or activated to a dormant BWP for the SCell or the PSCell, it may be very inefficient for the terminal to receive the DCI of the PDCCH or the bitmap in a SCell other than the PCell or the SPCell. Accordingly, the terminal may monitor the DCI of the PDCCH in the PCell or SPCell.

For example, the vase station may transmit a second DCI format 1k-03 through a transmission resource of the PDCCH of the active period 1k-30 in the PCell or the SPCell to the terminal, and the second DCI format 1k-03 may include a bitmap 1k-04 including indication information for the dormant BWP about the second SCell groups configured in the terminal, or an indication to suspend or resume the cell group (or SCG) or the PSCell (or SCell) of the cell group (or SCG).

A first terminal 1k-10 applying information configured in the RRC message may perform PDCCH monitoring based on a terminal identifier (e.g., C-RNTI, MCS-C-RNTI, or SPS-C-RNTI (or CS-RNTI)) that is an identifier configured in the active period 1k-30 of the DRX cycle, and may detect the second DCI format 1k-03 transmitted from the base station in the search space. When the second DCI format 1k-03 is detected, the first terminal 1k-10 may read, in the second DCI format 1k-03, the bitmap 1k-04 including indication information for the dormant BWP about the second SCell groups of the first terminal 1k-10, or the cell group (or SCG), or the PSCell (or SCell) of the cell group (or SCG), or information indicating to suspend or resume the cell group (or SCG) or the PSCell (or SCell) of the cell group (or SCG). A length of the bitmap 1k-04 may be configured to be the same as the number of the second SCell groups configured in the first terminal, or the cell groups (or SCGs), or the PSCells (or SCells) of the cell groups (or SCGs), or may be configured to be up to a certain number (e.g., 5). Each of bits 1k-11, 1k-12, 1k-13, 1k-14, and 1k-15 of the bitmap 1k-04 may be mapped to each second SCell group in an ascending order of each SCell group identifier value of the second SCell groups configured in the first terminal from a right bit of the bitmap (e.g., from an LSB). In another method, each of the bits 1k-11, 1k-12, 1k-13, 1k-14, and 1k-15 of the bitmap k1-04 may be mapped to each second SCell group in a descending order of each SCell group identifier value of the second SCell groups configured in the first terminal from the right bit of the bitmap (e.g., from the LSB). In another method, each of the bits 1k-11, 1k-12, 1k-13, 1k-14, and 1k-15 of the bitmap 1k-04 may be mapped to each second SCell group in an ascending order of each SCell group identifier value of the second SCell groups configured in the first terminal from a left bit of the bitmap (e.g., from an MSB). In another method, each of the bits 1k-11, 1k-12, 1k-13, 1k-14, and 1k-15 of the bitmap 1k-04 may be mapped to each second SCell group in a descending order of each SCell group identifier value of the second SCell groups configured in the first terminal from the left bit of the bitmap (e.g., from the MSB). A new bit may be defined in the second DCI format 1k-03 of the PDCCH, and the new bit may be used as information indicating to suspend or resume the cell group (or SCG) or the PSCell (or SCell) of the cell group (or SCG).

When the bit value of each of the bits 1k-11, 1k-12, 1k-13, 1k-14, and 1k-15 of the bitmap is 0, the bit value of 0 may indicate to switch to the dormant BWP or to activate the dormant BWP (when the dormant BWP is configured) for each activated SCell from among the SCells included in the second SCell group corresponding to the bit. In another method, when the bit value of each of the bits 1k-11, 1k-12, 1k-13, 1k-14, and 1k-15 of the bitmap is 0, the bit value of 0 may indicate to switch to the dormant BWP or activate the dormant BWP, when an activated BWP is not the dormant BWP (or is a normal BWP) for each activated SCell from among the SCells included in the second SCell group corresponding to the bit.

When the bit value of each of the bits 1k-11, 1k-12, 1k-13, 1k-14, and 1k-15 of the bitmap is 1, the bit value of 1 may indicate to switch to the normal BWP (e.g., the first active BWP activated from dormancy) or to activate to the normal BWP (e.g., the first active BWP activated from dormancy) for each activated SCell from among the SCells included in the second SCell group corresponding to the bit. In another method, when the bit value of each of the bits 1k-11, 1k-12, 1k-13, 1k-14, and 1k-15 of the bitmap is 1, the bit value of 1 may indicate to switch to the normal BWP (e.g., the first active BWP activated from dormancy) or to activate to the normal BWP (e.g., the first active BWP activated from dormancy), when a current or activated BWP is the dormant BWP (or is not the normal BWP) for each activated SCell from among the SCells included in the second SCell group corresponding to the bit. Otherwise (when the current or activated BWP is not the dormant BWP (or is the normal BWP) for each activated SCell from among the SCells included in the second SCell group corresponding to the bit), the first terminal 1k-10 may maintain, or may continuously use or apply, or may activate the current active BWP. In another method, when the bit value of each of the bits 1k-11, 1k-12, 1k-13, 1k-14, and 1k-15 of the bitmap is 1, the bit value of 1 may indicate to switch from the dormant BWP to the normal BWP (e.g., the first active BWP activated from dormancy), or to activate to the normal BWP (e.g., the first active BWP activated from dormancy), or to maintain, or continuously use or apply, or activate the current active BWP for each activated SCell from among the SCells included in the second SCell group corresponding to the bit.

After receiving the DCI of the PDCCH in the PCell 1k-01, the terminal may read the DCI and may determine whether there is a bitmap including an indication for the BWP of the cell group (or SCG) or the PSCell (or SCell) of the cell group (or SCG) or an indication to suspend or resume the cell group. When there is the bitmap, the terminal may switch or activate the BWP, or may suspend or resume the cell group, according to the bit value for the cell group (or SCG) indicated by each bit of the bitmap or the PSCell (or SCell) of the cell group (or SCG). For example, when the bit of the bitmap indicates the cell group (or SCG) or the PSCell (or SCell) of the cell group (or SCG) and the bit value is 1 (or 0), the terminal may resume or activate the cell group. When the bit value is 1 (or 0) and thus the cell group (or SCG) or the PSCell (or SCell) of the cell group (or SCG) indicated by the bit should be switched or activated to the BWP other than the dormant BWP or the cell group should be resumed, if the cell group (or SCG) or the PSCell (or SCell) of the cell group (or SCG) is already in the active or resumed state, the bit value may not be applied, or may be ignored, or may not be read. Also, for example, when the bit of the bitmap indicates the cell group (or SCG) or the PSCell (or SCell) of the cell group (or SCG) and the bit value is 0 (or 1), the terminal may switch or activate the BWP of the cell group (or SCG) or the PSCell (or SCell) of the cell group (or SCG) corresponding to the bit value to the dormant BWP, or may suspend or deactivate the cell group. When the bit value is 0 (or 1) and thus the cell group (or SCG) or the PSCell (or SCell) of the cell group (or SCG) indicated by the bit should be switched or activated to the dormant BWP or the cell group should be suspended, for the SCell or each SCell belonging to the SCell group, if the state of the SCell is the active state and the activated BWP is the dormant BWP, the bit value may not be applied, or may be ignored, or may not be read. Alternatively, when the cell group (or SCG) or the PSCell (or SCell) of the cell group (or SCG) is already in the suspended or deactivated state, the bit value may not be applied, or may be ignored, or may not be read.

The second DCI format of the PDCCH according to Embodiment 2 of the disclosure may be used in an active period, and the terminal may be accompanied by a DL transmission resource (e.g., PDSCH) or a UL transmission resource (e.g., PUSCH) for the PCell or the SPCell of the terminal. Accordingly, in Embodiment 2 of the disclosure, the terminal may receive the second DCI format of the PDCCH, and may transmit ACK or NACK information (e.g., HARQ ACK or NACK) for scheduling information (DL transmission resource or UL transmission resource) of the PCell or the SPCell indicated in the second DCI format. Accordingly, the base station may determine whether the terminal successfully receives an indication of the second DCI format in Embodiment 2 of the disclosure.

The base station may configure, in the terminal, first SCell group configuration information applicable to Embodiment 1 of the disclosure and second Scell group configuration applicable to Embodiment 2 of the disclosure in the RRC-Setup message of the RRC connection configuration, or the RRCResume message 1f-25, or the RRCReconfiguration message 1f-45. In the RRC message, the base station may allocate a SCell identifier to each SCell of the terminal, may allocate a first SCell group identifier to each first SCell group, and may allocate a second SCell group identifier to each second SCell group. Also, the base station may allocate a first SCell group set identifier indicating the first SCell groups, and may allocate a second SCell group set identifier indicating the second SCell groups. Also, each SCell identifier may be included in or mapped to each first SCell group or each second SCell group. Only when the dormant BWP (e.g., the DL dormant BWP) is configured for the SCell, the base station may configure the SCell or the SCell identifier to be included in or mapped to the first SCell group or the second SCell group.

FIG. 1L illustrates Embodiment 3 of a method of operating a dormant BWP in an activated SCell, according to an embodiment of the disclosure.

In Embodiment 3 of the disclosure, for carrier aggregation, a base station may configure, in a terminal, a plurality of SCells through an RRC message and may allocate each SCell identifier as shown in FIG. 1F, may configure a dormant BWP for each SCell, and may not configure a dormant BWP for a certain SCell. Alternatively, for dual connectivity, the base station may configure one or more cell groups and may configure each cell group identifier or each cell group state, or may configure a dormant BWP for a PSCell (or SCell) of each cell group, and may not configure a dormant BWP for a certain cell. A SCell identifier value may be assigned to a value of a certain bit, and may have an integer value (or natural value). In order to operate or apply Embodiment 3 of the disclosure, SCell identifiers or cell group (or SCG) identifiers configured in the RRC message may be used. In Embodiment 3 of the disclosure, the SCell identifiers or the cell group (or SCG) identifiers may indicate each SCell, or each SCell identifier, or a cell group (or SCG) identifier applying an operation of monitoring, by the terminal, DCI of a PDCCH and indicating in a bitmap value of the received DCI in an active period (within active time).

Referring to FIG. 1L, the base station may configure a power saving function or a DRX function in the terminal through the RRC message as shown in FIG. 1F. The base station may configure, in the terminal through the RRC message, configuration information about a third DCI format (e.g., DCI format 1_1) which should be detected by the terminal in an active period 1*l*-30 of a DRX cycle for a PCell or an SPCell. When the terminal detects the third DCI format in the PCell or the SPCell, the terminal may determine whether a bitmap including an indication for each SCell, or each PSCell, or each SCell identifier of the terminal is included in the third DCI format.

The third DCI format may include a transmission resource type (resourceAllocation) field, a field for frequency transmission resource allocation (frequency domain resource assignment), a modulation and coding scheme (MCS) field, a new data indicator (NDI) field, a redundancy version (RV) field, an HARQ process number field, an antenna port field, or a DMRS sequence initialization (DMRS SI) field. However, the disclosure is not limited thereto.

In the detected third DCI format, when the type indicated by the transmission resource type field (e.g., resourceAllocation) is a first type (e.g., resourceAllocationType0) and all bits of the field for frequency transmission resource allocation are 0 or a specific value, or when the type indicated by the transmission resource type field (e.g., resourceAllocation) is a second type (e.g., resourceAllocationType1) and all bits of the field for frequency transmission resource allocation are 1 or a specific value, the terminal may not interpret subsequent bits or fields as the MCS field, or the NDI field, or the RV field, or the HARQ process number field, or the antenna port field, or the DMRS SI field, may regard and read the subsequent bits or fields as a bitmap field indicating to switch or activate to a dormant BWP or switch or activate from the dormant BWP to a normal BWP for each SCell or PSCell configured in the terminal or bits indicating to suspend or resume the cell group (or SCG) or the PSCell (or SCell) of the cell group (or SCG), and may apply information indicated in the bitmap. In the detected third DCI format, when the type indicated by the transmission resource type field (e.g., resourceAllocation) is the first type (e.g., resourceAllocationType0) and all bits of the field for frequency transmission resource allocation are not 0 or a specific value, or when the type indicated by the transmission resource type field (e.g., resourceAllocation) is the second type (e.g., resourceAllocationType1) and all bits of the field for frequency transmission resource allocation are not 1 or a specific value, the terminal may interpret, read, and apply subsequent fields or bits as the MCS field, or the NDI field, or the RV field, or the HARQ process number field, or the antenna port field, or the DMRS SI field.

Assuming that the terminal detects the third DCI field of the PDCCH and scrambles or detects the third DCI field by a second terminal identifier (e.g., SPS-C-RNTI (or CS-RNTI)), when the type indicated by the transmission resource type field (e.g., resourceAllocation) in the third DCI format is the first type (e.g., resourceAllocationType0) and all bits of the field for frequency transmission resource allocation are 0 or when the type indicated by the transmission resource type field (e.g., resourceAllocation) is the second type (e.g., resourceAllocationType1) and all bits of the field for frequency transmission resource allocation are 1, a special command to activate or release a periodic transmission resource configured in the terminal may be indicated.

Accordingly, in Embodiment 3 of the disclosure, only when the third DCI field of the PDCCH is detected by being scrambled by the first terminal identifier (e.g., C-RNTI or MCS-C-RNTI), when the type indicated by the transmission resource type field (e.g., resourceAllocation) in the third DCI format is the first type (e.g., resourceAllocationType0) and all bits of the field for frequency transmission resource allocation are 0 or a specific value, or when the type indicated by the transmission resource type field (e.g., resourceAllocation) is the second type (e.g., resourceAllocationType1) and all bits of the field for frequency transmission resource allocation are 1 or a specific value, subsequent fields may be interpreted as a bitmap indicating a dormant BWP operation for each SCell of the terminal or bits indicating to suspend or resume the cell group (or SCG) or the PSCell (or SCell) of the cell group (or SCG).

Through the RRC message, the base station may configure, in the terminal, a search space or a terminal identifier (e.g., C-RNTI or MCS-C-RNTI) of PDCCH monitoring for detecting the third DCI format during the active period 1*l*-30.

For example, the base station may transmit a third DCI format 1*l*-03 to the terminal through a transmission resource of the PDCCH of the active period 1*l*-30 in the PCell or the SPCell, and the third DCI format 1*l*-03 may include a bitmap 1*l*-04 including indication information for the dormant BWP about the third SCell groups configured in the terminal or bits indicating to suspend or resume the cell group (or SCG) or the PSCell (or SCell) of the cell group (or SCG).

A first terminal 1*l*-10 applying information configured in the RRC message may perform PDCCH monitoring (through scrambling) based on the first terminal identifier (e.g., C-RNTI or MCS-C-RNTI) that is an identifier configured in the active period 1*l*-30 of the DRX cycle and may detect the third DCI format 1*l*-03 transmitted from the base station in the search space. When the third DCI format 1*l*-03 is detected, and when the type indicated by the transmission resource type field (e.g., resourceAllocation) is the first type (e.g., resourceAllocationType0) and all bits of the field for frequency transmission resource allocation are 0 or when the type indicated by the transmission resource type field (e.g., resourceAllocation) is the second type (e.g., resourceAllocationType1) and all bits of the field for frequency transmission resource allocation are 1 (1*l*-20), the first terminal 1*l*-10 may interpret subsequent fields as a bitmap indicating a dormant BWP operation for each SCell of the terminal, and may read the bitmap 1*l*-04 including indication information for the dormant BWP about the plurality of SCells (or SCell identifiers) configured in the first terminal 1*l*-10 or bits indicating to suspend or resume the cell group (or SCG) or the PSCell (or SCell) of the cell group (or SCG).

When the condition described above are satisfied, because the bitmap 1*l*-04 is interpreted by replacing the MCS field, or the NDI field, or the RV field, or the HARQ process number field, or the antenna port field, or the DMRS SI field, the bitmap 1*l*-04 may have a fixed length, for example, a length of 15 bits or 16 bits.

A bitmap mapping method in Embodiment 3 of the disclosure is as follows. For example, in a first bitmap method, each of bits 1*l*-11, 1*l*-12, 1*l*-13, 1*l*-14, and 1*l*-15 of the bitmap 1*l*-04 may be mapped to each Scell in an ascending order or a descending order of each SCell identifier value of the SCells configured in the first terminal 1*l*-10 from a right bit (e.g., from an LSB) or a left bit (e.g., from an MSB) of the bitmap.

In another method, in the first bitmap mapping method, each of the bits 1*l*-11, 1*l*-12, 1*l*-13, 1*l*-14, and 1*l*-15 of the bitmap 1*l*-04 may be mapped to each Scell in an ascending order of each SCell identifier value of the SCells of the cell group (MCG or SCG) configured in the first terminal 1*l*-10 from the right bit (e.g., from the LSB) of the bitmap. When the terminal receives the third DCI format in the PCell, each bit value may be mapped to the bitmap in an ascending order of the SCell identifier value only for the SCells belonging to the MCG. When the terminal receives the third DCI format in the PSCell, each bit value may be mapped to the bitmap in an ascending order of the SCell identifier value only for the SCells belonging to the SCG. As such, the reason for limiting the bitmap and mapping to the SCells belonging to one cell group is that 32 SCell identifiers may be configured in one terminal and the bitmap is 15 bits or 16 bits.

In another method, in the first bitmap mapping method, each of the bits 1*l*-11, 1*l*-12, 1*l*-13, 1*l*-14, and 1*l*-15 of the bitmap 1*l*-04 may be mapped to each Scell in a descending order of each SCell identifier value of the SCells of the cell group (MCG or SCG) configured in the first terminal 1*l*-10 from the right bit (e.g., from the LSB) of the bitmap. When the terminal receives the third DCI format in the PCell, each bit value may be mapped to the bitmap in an ascending order of the SCell identifier value only for the SCells belonging to the MCG. When the terminal receives the third DCI format in the PSCell, each bit value may be mapped to the bitmap in a descending order of the SCell identifier value only for the SCells belonging to the SCG. As such, the reason for limiting the bitmap and mapping to the SCells belonging to one cell group is that 32 SCell identifiers may be configured in one terminal and the bitmap is 15 bits or 16 bits.

In another method, in the first bitmap mapping method, each of the bits 1*l*-11, 1*l*-12, 1*l*-13, 1*l*-14, and 1*l*-15 of the bitmap 1*l*-04 may be mapped to each Scell in a descending order of each SCell identifier value of the SCells of the cell group (MCG or SCG) configured in the first terminal 1*l*-10 from the left bit (e.g., from the MSB) of the bitmap. When the terminal receives the third DCI format in the PCell, each bit value may be mapped to the bitmap in an ascending order of the SCell identifier value only for the SCells belonging to the MCG. When the terminal receives the third DCI format in the PSCell, each bit value may be mapped to the bitmap in a descending order of the SCell identifier value only for the SCells belonging to the SCG. As such, the reason for limiting the bitmap and mapping to the SCells belonging to one cell group is that 32 SCell identifiers may be configured in one terminal and the bitmap is 15 bits or 16 bits. Also, a new bit may be defined in the third DCI format 1*l*-03 of the PDCCH, and the new bit may be used as information indicating to suspend or resume the cell group (or SCG) or the PSCell (or SCell) of the cell group (or SCG).

When a rule of mapping from the left bit or the right bit of the bitmap is applied, the number of bitmaps to be read by the terminal may be reduced, thereby enabling faster terminal processing.

When the bit value of each of the bits 1*l*-11, 1*l*-12, 1*l*-13, 1*l*-14, and 1*l*-15 of the bitmap 1*l*-04 is 0, the bit value of 0 may indicate to switch to the dormant BWP or activate the dormant BWP (when the dormant BWP is configured, or is included in the first SCell group, or is included in the second Scell group) for each activated SCell corresponding to the bit. In another method, when the bit value of each of the bits 1*l*-11, 1*l*-12, 1*l*-13, 1*l*-14, and 1*l*-15 of the bitmap 1*l*-04 is 0, the bit value of 0 may indicate to switch to the dormant BWP or activate the dormant BWP, when an activated BWP is not the dormant BWP (or is a normal BWP) for each activated SCell corresponding to the bit. When the dormant BWP is not configured in the activated SCell corresponding to each of the bits 1*l*-11, 1*l*-12, 1*l*-13, 1*l*-14, and 1*l*-15 of the bitmap 1*l*-04, the terminal 1*l*-10 may ignore, or may not read, or may not apply the bit value.

When the bit value of each of the bits 1*l*-11, 1*l*-12, 1*l*-13, 1*l*-14, and 1*l*-15 of the bitmap 1*l*-04 is 1, the bit value of 1 may indicate to switch to the normal BWP (e.g., the first active BWP activated from dormancy) or to activate to the normal BWP (e.g., the first active BWP activated from dormancy) for each activated SCell corresponding to the bit. In another method, when the bit value of each of the bits 1*l*-11, 1*l*-12, 1*l*-13, 1*l*-14, and 1*l*-15 of the bitmap 1*l*-04 is 1, the bit value of 1 may indicate to switch to the normal BWP (e.g., the first active BWP activated from dormancy) or to activate to the normal BWP (e.g., the first active BWP activated from dormancy), when a current or activated BWP is the dormant BWP (or is not the normal BWP) for each activated SCell corresponding to the bit. Otherwise (when the current or activated BWP is not the dormant BWP (or is the normal BWP) for each activated SCell corresponding to the bit), the terminal 1*l*-10 may maintain, or may continuously use or apply, or may activate the current active BWP. In another method, when the bit value of each of the bits 1*l*-11, 1*l*-12, 1*l*-13, 1*l*-14, and 1*l*-15 of the bitmap 1*l*-04 is 1, the bit value of 1 may indicate to switch from the dormant BWP to the normal BWP (e.g., the first active BWP activated from dormancy), or to activate to the normal BWP (e.g., the first active BWP activated from dormancy), or to maintain, or continuously use or apply, or activate the current active BWP for each activated SCell corresponding to the bit. When the dormant BWP is not configured in the activated SCell corresponding to the bit of the bitmap, the terminal 1*l*-10 may ignore, or may not read, or may not apply the bit value.

After receiving the DCI of the PDCCH in a PCell 1*l*-01, the terminal may read the DCI and may determine whether there is a bitmap including an indication for the BWP of the cell group (or SCG) or the PSCell (SCell) of the cell group (or SCG) or an indication to suspend or resume the cell group. When there is the bitmap, the terminal may switch or activate the BWP or may suspend or resume the cell group according to the bit value for the cell group (or SCG) indicated by each bit of the bitmap or the PSCell (or SCell) of the cell group (or SCG). For example, when the bit of the bitmap indicates the cell group (or SCG) or the PSCell (or SCell) of the cell group (or SCG) and the bit value is 1 (or 0), the terminal may resume or activate the cell group. When the bit value is 1 (or 0) and thus the cell group (or SCG) or the PSCell (or SCell) of the cell group (or SCG) indicated by the bit should be switched or activated to the BWP other than the dormant BWP or the cell group should be resumed, if the cell group (or SCG) or the PSCell (or SCell) of the cell group (or SCG) is already in the active or resumed state, the terminal may not apply, or may ignore, or may not read the bit value. Also, for example, when the bit of the bitmap indicates the cell group (or SCG) or the PSCell (or SCell) of the cell group (or SCG) and the bit value is 0 (or 1), the terminal may switch or activate the BWP of the cell group (or SCG) or the PSCell (or SCell) of the cell group (or SCG) corresponding to the bit value to the dormant BWP, or may suspend or deactivate the cell group. When the bit value is 0 (or 1) and thus the cell group (or SCG) or the PSCell (or SCell) of the cell group (or SCG) indicated by the bit should be switched or activated to the dormant BWP or the cell group should be suspended, for the SCell or each SCell belonging to the Scell group, if the state of the SCell is the active state and the activated BWP is the dormant BWP, the bit value may not be applied, or may be ignored, or may not be read. Alternatively, when the cell group (or SCG) or the PSCell (or SCell) of the cell group (or SCG) is already in the suspended or deactivated state, the bit value may not be applied, or may be ignored, or may not be read.

The third DCI format of the PDCCH according to Embodiment 3 of the disclosure may be used in an active period, and the terminal may not be accompanied by a DL transmission resource (e.g., PDSCH) or a UL transmission resource (e.g., PUSCH) for the PCell or the SPCell of the terminal. Accordingly, in Embodiment 3 of the disclosure, the terminal may receive the third DCI format of the PDCCH, and may not transmit ACK or NACK information (e.g., HARQ ACK or NACK) about the indication of the third DCI format.

When Embodiment 1, Embodiment 2, or Embodiment 3 of the disclosure is applied, if the DL dormant BWP configured in the SCell or the PSCell of the terminal is not configured as the DL default BWP, the BWP inactivity timer for switching or transitioning the dormant BWP to the default BWP may not be used. This is because, when the default BWP is configured as the normal BWP rather than the dormant BWP, because the BWP is automatically switched from the dormant BWP to the normal BWP when the timer expires, battery consumption may occur due to PDCCH monitoring.

FIG. 1M illustrates a diagram showing Embodiment 4 of extending and applying Embodiment 1, Embodiment 2, or Embodiment 3 of the disclosure to an RRC inactive mode terminal.

In Embodiment 4 of the disclosure, in an RRC connected mode, a terminal may continuously store SCell configuration information (e.g., the configuration information described with reference to FIG. 1F) or PSCell (or SCell) configuration information of a cell group (e.g., SCG) configured or stored for Embodiment 1, Embodiment 2, or Embodiment 3 of the disclosure without releasing or discarding the configuration information even when the terminal is transitioned to an RRC inactive mode. Also, when an RRC connection resume procedure is performed, an RRC inactive mode terminal may determine, through an indicator of an RRCResume message or an RRCReconfiguration message transmitted by a base station or through a reconfiguration procedure, whether to discard or release, or maintain and apply, or reconfigure the SCell configuration information (e.g., the configuration information described or provided in FIG. 1P) or the PSCell (or SCell) configuration information of the cell group (e.g., SCG) stored in the terminal. Also, when the base station transmits, to the terminal, an RRCRelease message including a configuration or an indicator to transition the terminal to an RRC inactive mode, the base station may transmit, to the terminal, the RRCRelease message including an indicator or configuration information indicating whether to discard or release, or maintain and apply, or reconfigure the SCell configuration information (e.g., the configuration information described with reference to FIG. 1P) or the PSCell (or SCell) configuration information of the cell group (e.g., SCG) stored in the terminal. Also, the terminal may move in the RRC inactive mode, and when RAN notification area (RNA) updating is performed, through the RRCRelease message transmitted by the base station to the terminal, the terminal may receive and apply the indicator or the configuration information indicating whether to discard or release, or maintain and apply, or reconfigure the SCell configuration information (e.g., the configuration information described with reference to FIG. 1F) or the PSCell (or SCell) configuration information of the cell group (e.g., SCG) stored in the terminal.

In the SCell configuration information (e.g., the configuration information described with reference to FIG. 1F) and the PSCell (or SCell) configuration information of the cell group (e.g., SCG) of the RRC message, the base station may allow a first active BWP of DL or UL BWP configuration information of each cell to be configured as a dormant BWP, and when the terminal activates each SCell, each cell group, or the PSCell of each cell group, the base station may directly operate a DL BWP or a UL BWP of each SCell, or each cell group, or the PSCell of each cell group as the dormant BWP, or may suspend or resume the cell group, thereby reducing battery consumption of the terminal.

In another method, in the SCell configuration information (e.g., the configuration information described with reference to FIG. 1F) or the PSCell (or SCell) configuration information of the cell group (e.g., SCG) of the RRC message, the base station may not configure the first active BWP of the DL or UL BWP configuration information of each cell as the dormant BWP, and when the terminal activates or resumes each SCell, each cell group, or the PSCell of each cell group, the base station may always activate the DL BWP or the UL BWP of each SCell, or each cell group, or the PSCell of each cell group to the first active BWP, or may switch or activate the same to the dormant BWP according to Embodiment 1, Embodiment 2, or Embodiment 3, or may suspend or resume the cell group, thereby reducing battery consumption of the terminal.

Embodiment 4 of the disclosure may be extended and applied to each SCell configuration information or PSCell configuration information of an MCG or an SCG of the terminal in which dual connectivity is configured. That is, the SCell configuration information or the PSCell configuration information of the SCG may also be stored when the terminal is transitioned to the RRC inactive mode, and the base station may transmit, to the terminal, the RRC message (e.g., RRCResume, RRCReconfiguration, or RRCRelease) including the indicator or the configuration information indicating whether to discard or release, or maintain and apply, or reconfigure the SCell configuration information (e.g., the configuration information described with reference to FIG. 1F) or the PSCell configuration information of the MCG or SCG stored in the terminal, when the base station performs the RRC connection resume procedure or transitions the terminal to the RRC inactive mode.

Referring to FIG. 1M, a terminal $1m$-01 may perform a network connection with a base station $1m$-02 and may transmit/receive data ($1m$-05). When the base station needs to transition the terminal to an RRC inactive mode for a certain reason, the base station may transmit an RRCRelease message $1m$-20 to the terminal and may transition the terminal to the RRC inactive mode. The base station may transmit, to the terminal, an RRC message (e.g., RRCRelease) including an indicator or configuration information indicating whether to discard or release, or maintain and apply, or reconfigure SCell configuration information of an MCG or an SCG (e.g., the configuration information described with reference to FIG. 1F) or PSCell (or SCell) configuration information of the cell group (e.g., SCG) stored in the terminal. In the case of a terminal applying dual connectivity, it may be determined whether to suspend and resume a master cell group bearer configuration, or RRC configuration information, or SCell configuration information of the MCG or SCG, and it may be determined whether to suspend and resume a secondary cell group bearer configuration and RRC configuration by asking a secondary cell base station whether to suspend and resume the same and receiving a response from the secondary cell base station. In the RRCRelease message, the base station may configure a frequency list to be measured in an RRC idle mode or an RRC inactive mode by the terminal, or frequency measurement configuration information, or a frequency measurement period.

When the RRC inactive mode terminal receives a paging message (1m-25), needs to transmit UL data, or needs to update an RNA while moving, an RRC connection resume procedure may be performed.

When the terminal needs to configure a connection, the terminal may perform a random access procedure and may transmit an RRCResumeRequest message to the base station (1m-30). In this case, a terminal operation related to the message transmission is as follows.

1. The terminal may identify system information, and when the system information indicates to transmit a complete terminal connection resume identifier (I-RNTI or Full resume ID), the terminal may prepare to transmit the message including a stored complete terminal connection resume identifier (I-RNTI). When the system information indicates to transmit a truncated terminal connection resume identifier (truncated I-RNTI or truncated resume ID), the terminal may configure a truncated terminal connection resume identifier (truncated resume ID) from the stored complete terminal connection resume identifier (I-RNTI) by using a certain method and may prepare to transmit the message including the truncated terminal connection resume identifier.

2. The terminal may recover RRC connection configuration information and security contact information from stored terminal context.

3. The terminal may update a new KgNB security key corresponding to the MCG based on a current KgNB security key, a Next Hop (NH) value, and an NH chaining counter (NCC) value received in the RRCRelease message and stored.

4. When the terminal receives an SCG-counter value (or sk-counter) in the RRCRelease message, the terminal may update a new SKgNB security key corresponding to the SCG based on the KgNB security key and the SCG-counter value (or sk-counter).

5. The terminal may derive new security keys (K_RRCenc, K_RRC_int, K_UPint, and K_UPenc) to be used in an integrity protection and verification procedure and an encryption and decryption procedure by using the newly updated KgNB security key.

6. When the terminal receives the SCG-counter value (or sk-counter) in the RRCRelease message, the terminal may derive new security keys (SK_RRCenc, SK_RRC_int, SK_UPint, and SK_UPenc) to be used in an integrity protection and verification procedure and an encryption and decryption procedure by using the newly updated SKgNB security key corresponding to the SCG.

7. The terminal may calculate a message authentication code for integrity (MAC-I) and may prepare to transmit the message including the MAC-I.

8. The terminal may resume a signaling radio bearer 1 (SRB1) (the terminal should resume the SRB1 in advance because the terminal will receive the RRCResume message through the SRB1 as a response to the RRCReseumeRequest message to be transmitted).

9. The terminal may configure the RRCResumeRequest message and may transmit the RRCResumeRequest message to a lower layer.

10. For all bearers except for an SRB0 corresponding to the MCG (MCG terminated RBs), an integrity protection and verification procedure may be resumed by applying the updated security keys and a previously configured algorithm, and integrity verification and protection may be applied to subsequently transmitted and received data (in order to improve the reliability and security of data subsequently transmitted/received from the SRB1 or DRBs).

11. For all the bearers except for the SRB0 corresponding to the MCG (MCG terminated RBs), an encryption and decryption procedure may be resumed by applying the updated security keys and the previously configured algorithm, and encryption and decryption may be applied to subsequently transmitted and received data (in order to improve the reliability and security of data subsequently transmitted/received from the SRB1 or DRBs).

12. When the terminal receives the SCG-counter value (or sk-counter) in the RRCRelease message, the terminal may resume an integrity protection and verification procedure by applying the updated security keys and the previously configured algorithm for all bearers corresponding to the SCG (SCG terminated RBs), and may apply integrity verification and protection to subsequently transmitted and received data (in order to improve the reliability and security of data subsequently transmitted/received from the DRBs).

13. When the terminal receives the SCG-counter value (or sk-counter) in the RRCRelease message, the terminal may resume an encryption and decryption procedure by applying the updated security keys and the previously configured algorithm for all the bearers corresponding to the SCG (SCG terminated RBs) and may apply encryption and decryption to subsequently transmitted and received data (in order to improve the reliability and security of data subsequently transmitted/received from the DRBs).

A terminal operation when the terminal needs to configure a connection, and performs a random access procedure, transmits the RRCResumeRequest message to the base station, and then receives the RRCResume message as a response (1m-35) is as follows. When the RRC message includes an indicator indicating the terminal to report when there is a valid frequency measurement result in the RRC inactive mode, the terminal may configure a frequency measurement result in an RRCResumeComplete message and may report the frequency measurement result. Also, the base station may transmit, to the terminal, the RRC message (RRCResume) including the indicator or the configuration information indicating whether to discard or release, or maintain and apply, or reconfigure the SCell configuration information of the MCG or the SCG (e.g., the configuration information described with reference to FIG. 1F) stored in the terminal.

1. When receiving the message, the terminal may restore a PDCP state corresponding to the MCG, may reset a count value, and may re-establish PDCP layers of an SRB2 and all DRBs (MCG terminated RBs) corresponding to the MCG.

2. When receiving the SCG-counter value (or sk-counter) in the message, the terminal may update a new SKgNB security key corresponding to the SCG based on a KgNB security key and the SCG-counter value (sk-counter). The terminal may derive new security keys (SK_RRCenc, SK_RRC_int, SK_UPint, and SK_UPenc) to be used in an integrity protection and verification procedure and an encryption and decryption procedure by using the newly updated SKgNB security keys corresponding to the SCG.

3. When the message includes MCG (maserCellgroup) configuration information

The MCG configuration information included in the message may be performed and applied. The MCG information may include configuration information about RLC layers belonging to the MCG, a logical channel identifier, and a bearer identifier.

4. When the message includes bearer configuration information (radioBearerConfig)

The bearer configuration information (radioBearerConfig) included in the message may be performed and applied. The bearer configuration information (radioBearerConfig) may include configuration information about PDCP layers for each bearer, configuration information about SDAP layers, a logical channel identifier, and a bearer identifier.

5. When the message includes SCG (masterCellgroup) configuration information

The SCG configuration information included in the message may be performed and applied. The SCG information may include configuration information about RLC layers belonging to the SCG, a logical channel identifier, and a bearer identifier.

6. When the message includes secondary bearer configuration information (radioBearerConfig)

The secondary bearer configuration information (radioBearerConfig) included in the message may be performed and applied. The secondary bearer configuration information (radioBearerConfig) may include configuration information about PDCP layers for each secondary bearer, configuration information about SDAP layers, a logical channel identifier, and a bearer identifier.

7. The terminal may resume the SRB2 and all the DRBs (MCG terminated RBs) corresponding to the MCG.

8. When the message includes frequency measurement configuration information (measConfig)

The frequency measurement configuration information included in the message may be performed and applied. That is, frequency measurement may be performed according to the configuration.

9. The terminal may be transitioned to the RRC connected mode.

10. The terminal may indicate a higher layer that a suspended RRC connection has been resumed.

11. The terminal may configure and transmit the RRCResumeComplete message to a lower layer (1*m*-40).

When the terminal has bearer configuration information and terminal context information for a suspended SCG, the terminal may perform frequency measurement based on the system information or the frequency configuration information configured in the RRCRelease message or the RRCResume message. When there is a valid measurement result, in order to indicate that there is the valid measurement result, the terminal may transmit the RRCResumeComplete message including the indicator. When the base station receives the indicator, if frequency aggregation or dual connectivity needs to be resumed, the base station may indicate the terminal to report the frequency measurement result (1*m*-45) and may receive the frequency measurement result, or may receive the frequency measurement result in the RRCResumeComplete message (1*m*-50). When receiving the frequency measurement result, the base station may ask the secondary cell base station whether to resume bearer information for the suspended SCG, may receive a response, may determine, and may transmit an RRCReconfiguration message to the terminal (1*m*-60) to indicate whether to resume or release bearers for the SCG. Also, the base station may transmit, to the terminal, the RRC message (e.g., RRCReconfiguration) including the indicator or the configuration information indicating whether to discard or release, or maintain and apply, or reconfigure the SCell configuration information (e.g., the configuration information described with reference to FIG. 1F) of the MCG or the SCG stored in the terminal.

In Embodiment 4 of FIG. 1M, in the SCell configuration information (e.g., the configuration information described with reference to FIG. 1F) or the PSCell (or SCell) configuration information of the cell group (e.g., SCG) of the RRC message (e.g., RRCRelease, RRCResume, or RRCReconfiguartion), the base station may allow a first active BWP of DL or UL BWP configuration information of each cell to be configured as a dormant BWP, and when the terminal activates each SCell or the PSCell of each cell group (SCG), the base station may directly operate a DL BWP or a UL BWP of each SCell or the PSCell as the dormant BWP, or may suspend or resume the cell group, thereby reducing battery consumption of the terminal. For example, for each SCell or each PSCell, when a SCell state is configured as the active state, or a cell group state is configured as the active state, or the suspended state, or the deactivated state, or an indication to suspend or resume the cell group is configured in the SCell configuration information or the cell group configuration information of the RRC message (e.g., RRCRelease, RRCResume, or RRCReconfiguartion), or when an indication to activate the SCell is received in MAC control information according to an embodiment of the disclosure, the SCell or the PSCell may be activated, or resumed, or suspended, and the DL BWP or the UL BWP of the SCell or the PSCell may be directly activated when the SCell or the PSCell is activated, thereby reducing battery consumption of the terminal.

When the RRC inactive mode terminal is transitioned to the RRC connected mode and recovers, or applies, or reconfigures the SCell configuration information or the PSCell (or SCell) configuration information of the cell group (e.g., SCG) of the disclosure, according to Embodiment 1, Embodiment 2, Embodiment 3, or Embodiment 4 of the disclosure, switching or activation between BWPs or activation or application of a dormant BWP may be performed for each activated SCell or PSCell (or SCell) of the cell group. Also, Embodiment 4 of the disclosure may be applied even when handover is performed.

When an indicator indicating to suspend, resume, activate, or deactivate a cell group or a PSCell of the cell group is received in Embodiment 1, or Embodiment 2, or Embodiment 3, or MAC control information of FIG. 1N, a PHY layer or a MAC layer receiving the indication may transmit the indication to a higher layer (e.g., MAC layer, RLC layer, PDCP layer, or RRC layer). When the higher layer receives the indication (e.g., to suspend, resume, activate, or deactivate the cell group) from the lower layer, the higher layer may perform a corresponding procedure of a protocol layer for cell group suspension, resumption, activation, or deactivation. Alternatively, as in Embodiment 4 of the disclosure, when an indicator indicating to suspend, resume, activate, or deactivate a cell group or a PSCell of the cell group is received through an RRC message, an RRC layer receiving the indication may transmit the indication to a lower layer (e.g., PHY layer, MAC layer, RLC layer, or PDCP layer). When the lower layer receives the indication (e.g., to suspend, activate, or deactivate the cell group) from the higher layer (e.g., RRC layer), the lower layer may perform a corresponding procedure of a protocol layer for cell group suspension, resumption, activation, or deactivation.

Various embodiments may be configured and operated by combining or extending Embodiment 1, Embodiment 2, Embodiment 3, and Embodiment 4 of the disclosure.

FIG. 1N illustrates a diagram of MAC control information indicating state transition to an active state (or resumed state), a dormant state (or suspended state), or an inactive state for a cell, a cell of a cell group, or a cell group, according to an embodiment of the disclosure.

An active and inactive MAC CE according to the disclosure may have a structure of FIG. 1N according to an embodiment of the disclosure, and may be divided into a MAC CE structure 1n-05 having a size of 1 byte supporting 7 Scells and a MAC CE structure 1n-10 having a size of 4 bytes supporting 31 SCells. Also, it has the following characteristics.

A terminal operation when a hibernation MAC CE is not received and only an active and inactive MAC CE is received is as follows.

Each field of the active and inactive MAC CE indicates each SCell identifier, and a value corresponding to each field indicates whether the SCell is activated or deactivated. When a value of an indicator for a SCell indicated by a SCell identifier is 1, the SCell is activated when the state of the SCell is the inactive state. However, when the state of the SCell is not the inactive state, the indicator value is ignored. When the value of the indicator for the SCell indicated by the SCell identifier is 0, the SCell is deactivated. That is, when the value of the indicator for the Scell is 0, the SCell is deactivated regardless of the state of the SCell.

A new MAC CE for supporting embodiments of the disclosure and extending to various embodiments may be designed or an existing MAC CE function may be extended.

For example, MAC CEs described with reference to FIG. 1N may be applied, and the functions described with reference to FIG. 1N may be extended and applied by extending a reserved bit (R bit) in 1n-05 or 1n-10 of FIG. 1N.

For example, when the reserved bit (e.g., R field) is configured as 0 (or 1), a 1-bit indicator (e.g., C field) indicating then identifier of each cell (SCell) may be defined and used as follows. In another method, when the reserved bit (e.g., R field) is configured as 0 (or 1), it may mean an indication to deactivate or suspend the cell group (e.g., SCG). For example, the cell, the BWP, or the cell group in the inactive or suspended state may be transitioned to the inactive state or may be maintained, and the cell, the BWP, or the cell group in the active state (or resumed state) may be transitioned to the inactive state. The indicator may be indicated to a higher layer.

When the 1-bit indicator is configured as 0 (or 1), state transition for each cell (e.g., SCell or SCell of MCG or SCG) or the BWP may be performed as follows.

The cell or the BWP in the inactive state is transitioned to the inactive state or is maintained The cell or the BWP in the active state is transitioned to the inactive state When the 1-bit indicator is configured as 1, state transition for each cell (e.g., SCell or SCell of the MCG or the SCG) may be performed as follows.

The cell or the BWP in the active state is transitioned to the active state or is maintained The cell or the BWP in the inactive state is transitioned to then active state When the reserved bit (R bit) is configured as 1 (or 1), the 1-bit indicator indicating the identifier of each cell (SCell) may be defined and used as follows. In another embodiment of the disclosure, a logical identifier may be newly defined, a new MAC CE may be defined and may be defined and used as follows. In another method, when the reserved bit (e.g., R field) is configured as 1 (or 0), it may mean an indication to activate or resume the cell group (e.g., SCG). For example, the cell, the BWP, or the cell group in the active or resumed state may be transitioned to then active state or may be maintained, and the cell, the BWP, or the cell group in the inactive state (e.g., suspended state) may be transitioned to the active state. The indicator may be indicated to a higher layer.

When the 1-bit indicator is configured as 0 (or 1), state transition for each cell (e.g., SCell or SCell of the MCG or the SCG) or the BWP may be performed as follows.

The cell or the BWP in the inactive state is transitioned to the inactive state or is maintained The cell or the BWP in the active state is transitioned to the inactive state When the 1-bit indicator is configured as 1, state transition for each cell (e.g., SCell or SCell of the MCG or the SCG) or the BWP may be performed as follows.

The cell or the BWP in the active state is transitioned to the active state or is maintained The cell or the BWP in the inactive state is transitioned to the active state For example, the function of the MAC CE may be variously extended and designed to indicate state transition or switching of a cell or a BWP, and may be applied to various embodiments of the disclosure. For example, new MAC control information may be designed, a cell group identifier, and a cell identifier, a BWP identifier, or bitmap information may be included in the MAC control information, to indicate activation (resumption), hibernation (or suspension), or deactivation (or suspension) of a cell group, a cell, or a BWP.

A procedure of reporting a power headroom according to an embodiment of the disclosure will now be described.

Embodiment 1 of reporting a power headroom is as follows.

In Embodiment 1 of the disclosure, a power headroom reporting procedure may be used to provide the following information to a base station (serving gNB) that serves a terminal. A power headroom may indicate a difference between maximum transmission power (or calculated or nominal maximum transmission power) that may be transmitted by the terminal in each activated serving cell (PCell, SCell, PSCell, or SPCell) and power measured for UL data transmission (UL-SCH) or SRS transmission, or may indicate a difference between maximum transmission power that may be transmitted by the terminal and power measured for PUCCH transmission and UL data transmission in an SPCell (PCell or PSCell) of another MAC layer (e.g., LTE MAC or E-UTRA MAC). The power headroom may be reported to the base station by configuring a power headroom value in MAC control information by using the power headroom reporting procedure and transmitting the MAC control information through a UL transmission resource.

- A type 1 power headroom is a difference between maximum transmission power (or calculated or nominal maximum transmission power) that may be transmitted by the terminal for each activated serving cell (PCell, SCell, PSCell, or SPCell) and power measured for UL data transmission (UL-SCH), and may be reported.
- A type 2 power headroom is a difference between maximum transmission power (or calculated or nominal maximum transmission power) that may be transmitted by the terminal and power measured for PUCCH transmission or UL data transmission (UL-SCH) in the SpCell (PCell or PSCell) of another MAC layer (e.g., when dual connectivity is configured, LTE MAC or E-UTRA MAC), and may be reported.
- A type 3 power headroom is a difference between maximum transmission power (or calculated or nominal maximum transmission power) that may be transmitted by the terminal for each activated serving cell (PCell, SCell, PSCell, or SpCell) and power measured for SRS transmission, and may be reported.

The terminal may receive configuration information for power headroom reporting through an RRC message (e.g., RRCReconfiguration), and an RRC layer may adjust a power headroom reporting procedure by using the following parameters.

- Timer value (phr-PeriodicTimer) for periodically reporting a power headroom: For example, when a periodic power headroom reporting timer expires, the power headroom reporting procedure may be triggered.
- Timer value (phr-ProhibitTimer) for prohibiting power headroom reporting: For example, when a power headroom reporting prohibit timer is running, the power headroom reporting procedure may not be triggered.
- Threshold value (phr-Tx-PowerFactorChange) for triggering power headroom reporting;
- Indicator (phr-Type2OtherCell) indicating type 2 power headroom reporting considering another cell or MAC layer;
- Indicator (phr-ModeOtherCG) indicating power headroom reporting considering another cell group;
- Indicator (multiplePHR) indicating multiple power headroom reportings.

The parameters may be configured through the RRC message (e.g., RRCReconfiguration) as shown in FIG. 1F.

The power headroom reporting procedure may be triggered when one event occurs or one condition is satisfied from among the following conditions.

- When the power headroom reporting prohibit timer (phr-ProhibitTimer) expires or has expired, and pathloss is changed by a threshold value (phr-Tx-PowerFactorChange) dB configured in the RRC message for at least one activated serving cell of a certain MAC layer, the power headroom reporting procedure may be triggered. The pathloss may be used as a pathloss reference value when a MAC layer has (or receives) a UL transmission resource for new transmission after a power headroom last transmitted by the MAC layer.
- When the periodic power headroom reporting timer expires, the power headroom reporting procedure may be triggered.
- When a power headroom reporting function is configured or reconfigured by a higher layer (e.g., RRC layer), the power headroom reporting procedure may be triggered. The configuration or reconfiguration may not be used to deactivate the power headroom reporting function.
- When a certain cell in which a UL of a certain MAC layer is configured is activated, the power headroom reporting procedure may be triggered.
- When a PSCell is added, or newly added, or modified (or when dual connectivity is configured, and a PSCell of an SCG is newly added or modified), the power headroom reporting procedure may be triggered.
- When the power headroom reporting prohibit timer (phr-ProhibitTimer) expires or has expired, and a MAC layer has (or receives) an UL transmission resource for new transmission, if the following condition is true or satisfied for a certain activated serving cell in which a UL of a certain MAC layer is configured, the power headroom reporting procedure may be triggered.
- When there is a UL transmission resource allocated for PUCCH transmission or transmission in the cell, and the MAC layer has a UL resource for PUCCH transmission or transmission in the cell, if power backoff required for power management (e.g., to reduce interference of another frequency or avoid harm to human body) for the cell after a last transmitted power headroom is changed by a threshold value (phr-Tx-PowerFactorChange) dB configured in the RRC message, the power headroom reporting procedure may be triggered.

When one or more events occurs or one or more conditions are satisfied from among the conditions and thus the power headroom reporting procedure is triggered, a MAC layer may operate as follows.

When the MAC layer has or receives a UL allocated for new transmission, the MAC layer may operate as follows.

1> When the UL transmission resource after a last MAC reset procedure is a first UL transmission resource allocated for new transmission
2> The periodic power headroom reporting timer for periodically reporting a power headroom may start.
1> When it is determined (or judged) that a power headroom reporting procedure is triggered and is not cancelled
1> When the allocated UL transmission resource may include MAC control information (MAC CE or MAC control element) or its subheader (e.g., MAC subheader) for power headroom reporting configured to be transmitted by the MAC layer or may be transmitted through the transmission resource as a result of a logical channel prioritization (LCP) procedure (e.g., procedure of allocating a UL transmission resource to data or MAC control information)
2> When an indicator (multiplePHR) indicating multiple power headroom reportings is configured as TRUE (or configured to report)
3> For each activated serving cell connected to a certain MAC layer, or configured in a certain MAC layer and configured with a UL
4> A value of a type 1 power headroom or a type 3 power headroom for a UL carrier (or frequency) corresponding to the cell may be obtained (or calculated).
4> When the MAC layer has or receives a UL transmission resource allocated for transmission for the serving cell
4> Alternatively, when another MAC layer is configured, the other MAC layer has or receives a UL transmission resource allocated for transmission for the serving cell, and an indicator (phr-ModeOtherCG) indicating power headroom reporting considering another cell group by a higher layer (RRC layer) is configured as Real (or configured to report as a real value),
5> A maximum transmission power value (or power value required for power headroom calculation) corresponding to the serving cell may be obtained from a physical (PHY) layer.
3> When an indicator (phr-Type2OtherCell) indicating type 2 power headroom reporting considering another cell or MAC layer is configured as TRUE (or is configured to report);
4> When another MAC layer is an E-UTRA MAC layer
5> A value for type 2 power headroom reporting for an SPCell of the other MAC layer may be obtained (or calculated)
5> When an indicator (phr-ModeOtherCG) indicating power headroom reporting considering another cell group by a higher layer (RRC layer) is configured as Real (or is configured to report as a real value),
6> A maximum transmission power value (or power value required for power headroom calculation) for an SPCell of the other MAC layer (E-UTRA MAC layer) may be obtained from a physical layer.
3> A multiplexing and reassembly procedure (multiplexing and assembly procedure of the MAC layer) for generating and transmitting MAC control information reporting a plurality of power headrooms based on values reported from a physical layer may be indicated.
2> When an indicator (multiplePHR) indicating multiple power headroom reportings is not configured as TRUE (or is not configured to report), or when one power headroom reporting is indicated, or when one power headroom reporting format is used
3> A type 1 power headroom value for a UL carrier (or frequency) of the serving cell (or PCell) may be obtained (or calculated) from a physical layer.
3> A maximum transmission power value (or power value required for power headroom calculation) for the serving cell (or PCell) may be obtained from a physical layer.
3> A multiplexing and reassembly procedure (multiplexing and assembly procedure of the MAC layer) for generating and transmitting MAC control information reporting one power headroom based on values reported from a physical layer may be indicated.
2> The timer for periodically reporting a power headroom may start or restart.
2> The timer for prohibiting power headroom reporting may start or restart.
2> All triggered power headrooms or power headroom reporting procedures may be cancelled.

According to the power headroom reporting procedure according to the disclosure, because the terminal reports a power headroom to the base station for each cell, the base station may adjust or manage UL transmission power of the terminal. However, in the case of a cell (SCell) or a serving cell in which a dormant BWP according to the disclosure is configured, or a suspended (or deactivated) cell group or cell, when a current or activated BWP (or DL BWP) of an activated serving cell is a dormant BWP, or when it is activated to a BWP indicated by a dormant BWP indicator, or when a cell group is a suspended (or deactivated) cell (e.g., PSCell or SCell), even if a power headroom is reported, UL data transmission or PUCCH transmission is impossible in the dormant BWP or the suspended (or deactivated) cell group or cell, and thus unnecessary power headroom reporting is performed.

Accordingly, in order to reduce unnecessary processing load on the terminal and prevent waste of a transmission resource due to unnecessary power headroom reporting, the terminal may first determine whether a cell is activated or deactivated, and may perform a procedure of determining, for an activated cell, whether an activated BWP (e.g., DL BWP) of the activated cell is a dormant BWP (or a BWP having a dormant BWP identifier configured in the RRC message) or is not a dormant BWP (or not a BWP having a dormant BWP identifier configured in the RRC message), or whether a cell group or cell (e.g., PSCell) is suspended (or deactivated) or activated (or resumed). In another method, the terminal may first determine whether a cell is activated or deactivated, and may perform a procedure of determining, for an activated cell when a dormant BWP is configured (e.g., when a dormant BWP identifier is configured for the cell in the RRC message), whether an activated BWP (e.g., DL BWP) of the activated cell is a dormant BWP (or a BWP having a dormant BWP identifier configured in the RRC message) or is not a dormant BWP (or not a BWP having a dormant BWP identifier configured in the RRC message). For a cell in which a dormant BWP is not configured, the procedure of identifying an activated BWP may be omitted (or may not be performed).

In the case of a cell (SCell) or a serving cell in which a dormant BWP is configured in the identifying procedure, when a current or activated BWP (or DL BWP) of an activated serving cell is a dormant BWP, or when it is activated to a BWP indicated by a dormant BWP identifier, or when a cell group or a cell (e.g., PSCell or SCell) is suspended (or deactivated), the power headroom reporting procedure may not be triggered, and even if the power headroom reporting procedure is triggered by another cell, a power headroom for the cell may not be reported. In another method, in the case of a cell (SCell) or a serving cell in which a dormant BWP is configured, only when a current or activated BWP (or DL BWP) of an activated serving cell is not a dormant BWP, or when it is not activated to a BWP indicated by a dormant BWP identifier, or when a cell group or a cell (e.g., PSCell or SCell) is not suspended (or is not deactivated, or is activated, or is resumed), the power headroom reporting procedure may be triggered. Alternatively, even if the power headroom reporting procedure is triggered by another cell, only when a current or activated BWP (or DL BWP) of an activated serving cell is not a dormant BWP, or when it is not activated to a BWP indicated by a dormant BWP identifier, or when a cell group or a cell (e.g., PSCell or SCell) is not suspended (or not deactivated, or is activated, or is resumed), a power headroom may be reported. Accordingly, the proposed procedure may reduce unnecessary processing load, and may prevent waste of a transmission resource due to unnecessary power headroom reporting. A specific embodiment of the proposed procedure is described in Embodiment 2 of the disclosure considering the following dormant BWP.

In Embodiment 2 of the disclosure considering a dormant BWP, a power headroom reporting procedure may be used to provide the following information to the base station (serving gNB) that serves the terminal. A power headroom may indicate a difference between maximum transmission power (or calculated or nominal maximum transmission power) that may be transmitted by the terminal in each activated serving cell (PCell, SCell, PSCell, or SPCell) and power measured for UL data transmission (UL-SCH) or SRS transmission, or may indicate a difference between maximum transmission power that may be transmitted by the terminal and power measured for PUCCH transmission and UL data transmission in an SPCell (PCell or PSCell) of another MAC layer (e.g., LTE MAC or E-UTRA MAC). The power headroom may be reported to the base station by configuring a power headroom value in MAC control information by the power headroom reporting procedure and transmitting the MAC control information through a UL transmission resource.

A type 1 power headroom is a difference between maximum transmission power (or calculated or nominal maximum transmission power) that may be transmitted by the terminal for each activated serving cell (PCell, SCell, PSCell, or SPCell) and power measured for UL data transmission (UL-SCH), and may be reported.

A type 2 power headroom is a difference between maximum transmission power (or calculated or nominal maximum transmission power) that may be transmitted by the terminal and power measured for PUCCH transmission or UL data transmission (UL-SCH) in the SpCell (PCell or PSCell) of another MAC layer (e.g., when dual connectivity is configured, LTE MAC or E-UTRA MAC), and may be reported.

A type 3 power headroom is a difference between maximum transmission power (or calculated or nominal maximum transmission power) that may be transmitted by the terminal for each activated serving cell (PCell, SCell, PSCell, or SpCell) and power measured for SRS transmission, and may be reported.

Embodiment 2 of a procedure of reporting a power headroom considering a dormant BWP according to the disclosure is as follows.

In Embodiment 2 of the disclosure, the terminal may receive configuration information for power headroom reporting through an RRC message (e.g., RRCReconfiguration), and an RRC layer may adjust a power headroom reporting procedure by using the following parameters.

Timer value (phr-PeriodicTimer) for periodically reporting a power headroom: For example, when a periodic power headroom reporting timer expires, the power headroom reporting procedure may be triggered.

Timer value (phr-ProhibitTimer) for prohibiting power headroom reporting: For example, when a power headroom reporting prohibit timer is running, the power headroom reporting procedure is not triggered.

Threshold value (phr-Tx-PowerFactorChange) for triggering power headroom reporting;

Indicator (phr-Type2OtherCell) indicating type 2 power headroom reporting considering another cell or MAC layer;

Indicator (phr-ModeOtherCG) indicating power headroom reporting considering another cell group;

Indicator (multiplePHR) indicating multiple power headroom reportings.

The parameters may be configured through the RRC message (e.g., RRCReconfiguration) as shown in FIG. 1F of the disclosure.

In Embodiment 2 of a procedure of reporting a power headroom considering a dormant BWP according to the disclosure, the power headroom reporting procedure may be triggered when one event occurs or one condition is satisfied from among the following conditions.

When the power headroom reporting prohibit timer (phr-ProhibitTimer) expires or has expired, a BWP (or DL BWP) of an activated serving cell of a certain MAC layer is activated, and pathloss is changed by a threshold value (phr-Tx-PowerFactorChange) dB configured in the RRC message for at least one activated serving cell in which an activated BWP (or DL BWP) is not a dormant BWP or an activated BWP (or DL BWP) or a current BWP (or activated current DL BWP) of an activated serving cell is not a dormant BWP, the power headroom reporting procedure may be triggered. The pathloss may be used as a pathloss reference value when a MAC layer has (or receives) a UL transmission resource for new transmission after a power headroom last transmitted by the MAC layer.

When the periodic power headroom reporting timer expires, the power headroom reporting procedure may be triggered.

When a power headroom reporting function is configured or reconfigured by a higher layer (e.g., RRC layer), the power headroom reporting procedure may be triggered. The configuration or reconfiguration may not be used to deactivate the power headroom reporting function.

When a certain cell in which a UL of a certain MAC layer is configured is activated and a first active DL BWP (or a first active DL BWP identifier (firstActiveDownlinkBWP-Id)) configured in the cell is not configured as a dormant BWP, the power headroom reporting procedure may be triggered.

When a PSCell, a cell group, or a cell is added, or newly added, or modified (or when dual connectivity is configured and a PSCell of an SCG is newly added or modified), or when the PSCell, the cell group, or the cell is activated or resumed, the power headroom reporting procedure may be triggered.

In another method, when a PSCell is added, or newly added, or modified (or when dual connectivity is configured or a PSCell of an SCG is newly added or modified), or when the PSCell, the cell group, or the cell is activated or resumed, if a first active DL BWP (or a first active DL BWP identifier (firstActiveDownlinkBWP-Id)) configured in the cell is not configured as a dormant BWP, the power headroom reporting procedure may be triggered.

When the power headroom reporting prohibit timer (Prohibit Timer) expires or has expired and a MAC layer has (or receives) a UL transmission resource for new transmission, if the following condition is true or satisfied for a certain activated serving cell in which a UL of a certain MAC layer is configured, the power headroom reporting procedure may be triggered.

When there is a UL transmission resource allocated for PUCCH transmission or transmission in the cell, and the MAC layer has a UL resource for PUCCH transmission or transmission in the cell, if power backoff required for power management (e.g., to reduce interference of another frequency or avoid harm to human body) for the cell after a last transmitted power headroom is changed by a threshold value (phr-Tx-PowerFactorChange) dB configured in the RRC message, the power headroom reporting procedure may be triggered.

When a UL BWP is activated (or when activated to a first active UL BWP), or when a DL BWP (or activated BWP or current BWP (or DL BWP)) of a certain activated SCell configured with a UL in a certain MAC layer is switched or activated from a dormant BWP to a normal BWP (or a BWP other than the dormant BWP (a non-dormant BWP)), or a non-dormant BWP first activated from dormancy configured in the RRC message (a BWP indicated by firstActiveNonDormantDownlinkBWP-Id or a BWP identifier other than the dormant BWP), the power headroom reporting procedure may be triggered.

When a DL BWP (or an activated BWP or a current BWP (or DL BWP)) of a certain activated SCell configured with a UL in a certain MAC layer is activated to a BWP indicated by a BWP identifier (firstOutsideActiveTime-BWP-Id or firstWithinActiveTimeBWP-Id) first activated from dormancy configured in the RRC message, the power headroom reporting procedure may be triggered. The activation of the BWP may be indicated by DCI of a PDCCH.

When a UL BWP is activated (or when is activated to a first active UL BWP), or when a DL BWP (or activated BWP or current BWP (or DL BWP)) of a certain activated SCell configured with the UL in a certain MAC layer is switched or activated from a dormant BWP to a normal BWP (or a BWP other than the dormant BWP (non-dormant BWP)) or a non-dormant BWP first activated from dormancy configured in the RRC message (a BWP indicated by firstActiveNonDormantDownlinkBWP-Id, firstOutsideActiveTime-BWP-Id, or firstWithinActiveTimeBWP-Id, or a BWP identifier other than the dormant BWP), or when first SRS configuration information or second SRS configuration information is configured (or when an activated BWP (or DL BWP) of an activated serving cell or a current BWP (or activated current DL BWP) is the dormant BWP and the first SRS configuration information or the second SRS configuration information is configured), the power headroom reporting procedure may be triggered.

When the power headroom reporting prohibit timer (phr-ProhibitTimer) expires or has expired, a BWP (or DL BWP) of an activated serving cell of a certain MAC layer is activated, and an activated BWP (or DL BWP) is not a dormant BWP, or when an activated BWP (or DL BWP) or a current BPW (or activated current BWP) of an activated serving cell is not a dormant BWP, or when first SRS configuration information or second SRS configuration information is configured (or when an activated BWP (or DL BWP) or a current BWP (or activated current DL BWP) of an activated serving cell is a dormant BWP and first SRS configuration information or second SRS configuration information is configured), if pathloss is changed by a threshold value (phr-Tx-PowerFactorChange) dB configured in the RRC message for at least one activated serving cell, the power headroom reporting procedure may be triggered. The pathloss may be used as a pathloss reference value when a MAC layer has (or receives) a UL transmission resource for new transmission after a last transmitted power headroom in the MAC layer.

When one or more events occur or one or more conditions are satisfied from among the conditions and thus the power headroom reporting procedure is triggered, a MAC layer may operate as follows.

When the MAC layer has or receives a UL allocated for new transmission, the MAC layer may operate as follows.

1> When the UL transmission resource after a last MAC reset procedure is a first UL transmission resource allocated for new transmission 2> The periodic power headroom reporting timer for periodically reporting a power headroom may start.

1> When it is determined or judged that the power headroom reporting procedure is triggered and is not to be cancelled 1> When the allocated UL transmission resource may include MAC control information (MAC CE or MAC control element) or its subheader (e.g., MAC subheader) for power headroom reporting configured to be transmitted by the MAC layer or may be transmitted through the transmission resource as a result of an LCP procedure (e.g., a procedure of allocating a UL transmission resource to data or MAC control information)

2> When an indicator (multiplePHR) indicating multiple power headroom reportings is configured as TRUE (or configured to report)

3> For each activated serving cell connected to a certain MAC layer, or configured in a certain MAC layer and configured with a UL 3> When a BWP (or DL BWP) of the activated serving cell is activated and an activated BWP (or DL BWP) is not a dormant BWP, or when an activated BWP (or DL BWP) or a current BWP (or activated current DL BWP) of the activated serving cell is not a dormant BWP, or when the cell group or cell (e.g., PSCell) is not suspended or is not deactivated 3> When a BWP (or DL BWP) of the activated serving cell is activated and an activated BWP (or DL BWP) is not a dormant BWP, or when an activated BWP (or DL BWP) or a current BWP (or activated current DL BWP) of the activated serving cell is not a dormant BWP, or when the cell group or cell (e.g., PSCell) is not suspended or is not deactivated, or when first SRS configuration information or second SRS configuration information is configured (or when an activated BWP (or DL BWP) or current BWP (or activated current DL BWP of the activated serving cell is a dormant BWP and first SRS configuration information or second SRS configuration information is configured)

4> A value of a type 1 power headroom or a type 3 power headroom for a UL carrier (or frequency) corresponding to the cell may be obtained (or calculated).

4> When the MAC layer has or receives a UL transmission resource allocated for transmission for the serving cell 4> Alternatively, when another MAC layer is configured, the other MAC layer has or receives a UL transmission resource allocated for transmission for the serving cell, and an indicator (phr-ModeOtherCG) indicating power headroom reporting considering another cell group by a higher layer (RRC layer) is configured as Real (or configured to report as a real value), 5> A maximum transmission power value (or power value required for power headroom calculation) corresponding to the serving cell may be obtained from a physical (PHY) layer.

3> When an indicator (phr-Type2OtherCell) indicating type 2 power headroom reporting considering another cell or MAC layer is configured as TRUE (or is configured to report);

4> When another MAC layer is an E-UTRA MAC layer

5> A value for type 2 power headroom reporting for an SPCell of the other MAC layer may be obtained (or calculated)

5> When an indicator (phr-ModeOtherCG) indicating power headroom reporting considering another cell group by a higher layer (RRC layer) is configured as Real (or is configured to be reported as a real value), 6> A maximum transmission power value (or power value required for power headroom calculation) for an SPCell of the other MAC layer (E-UTRA MAC layer) may be obtained from a physical layer.

3> A multiplexing and reassembly procedure (multiplexing and assembly procedure of the MAC layer) for generating and transmitting MAC control information reporting a plurality of power headrooms based on values reported from a physical layer may be indicated.

2> When an indicator (multiplePHR) indicating multiple power headroom reportings is not configured as TRUE (or is not configured to report), or when one power headroom reporting is indicated, or when one power headroom reporting format is used 3> A type 1 power headroom value for a UL carrier (or frequency) of the serving cell (or PCell) may be obtained (or calculated) from a physical layer.

3> A maximum transmission power value (or power value required for power headroom calculation) for the serving cell (or PCell) may be obtained from a physical layer.

3> A multiplexing and reassembly procedure (multiplexing and assembly procedure of the MAC layer) for generating and transmitting MAC control information reporting one power headroom based on values reported from a physical layer may be indicated.

2> The timer for periodically reporting a power headroom may start or restart.

2> The timer for prohibiting power headroom reporting may start or restart.

2> All triggered power headrooms or power headroom reporting procedures may be cancelled.

FIG. 1O illustrates a flowchart of a first signaling procedure of configuring or releasing dual connectivity, or activating, resuming, suspending, or deactivating an SCG configured with dual connectivity, according to an embodiment of the disclosure.

Referring to FIG. 1O, a terminal may configure an RRC connection with a network or a base station as shown in FIG. 1F of the disclosure, and may perform data transmission or reception with the base station (e.g., MCG, master node (MN), or cells (PCells or SCells) of MCG).

The base station may configure dual connectivity in the terminal for a certain reason (e.g., when a high data rate is required, at a request of the terminal (1o-05), or when a high QoS requirement should be satisfied). For example, the terminal may transmit, to the base station, a request to configure, release, activate, deactivate, resume, or suspend dual connectivity, a cell group (e.g., SCG), or a cell. A request message of the terminal may include a frequency (or channel) measurement result report, or a cell group identifier, or cell identifiers, or measurement results (1o-05). In another method, the base station may determine whether to configure, release, add, deactivate, activate, resume, modify, reconfigure, or suspend dual connectivity, a cell group (e.g., SCG), or a cell, by considering the amount of DL (or UL) data or the amount of buffer.

A master base station (MN or MCG) may receive a frequency or channel measurement report for a frequency or a channel received from the terminal, and may determine a secondary base station (secondary node (SN) or SCG) for configuring dual connectivity based on the measurement report. Alternatively, the master base station may determine whether to configure, release, add, deactivate, activate, resume, modify, reconfigure, or suspend dual connectivity, a cell group (e.g., SCG), or a cell, by considering the amount of DL (or UL) data or the amount of buffer. In order to configure, release, add, deactivate, activate, resume, modify, reconfigure, or suspend dual connectivity, a cell group (e.g., SCG), or a cell to the determined secondary base station, the master base station may transmit, to the secondary base station, a request message 1o-10 for requesting to configure or add to the SCG of the terminal through an Xn interface (e.g., interface between base stations) or an Sn interface (interface between a base station and an AMF, a UMF, or a base station). In order to configure, release, add, deactivate, activate, resume, modify, reconfigure, or suspend dual connectivity, a cell group (e.g., SCG), or a cell to the secondary base station, each separate new request message may be defined and used, and in another method, and a new indicator may be defined in an existing message (e.g., SN addition request message, SN modification request message, or SN release request message) to indicate (or request) to configure, release, add, deactivate, activate, resume, modify, reconfigure, or suspend a cell group (e.g., SCG) or a cell. The request message 1o-10 may include information such as cell group configuration information (e.g., MCG configuration information) currently configured in the terminal, or bearer configuration information, or capability information of the terminal, or frequency (or channel) measurement result information of the terminal. By referring to the above information, the secondary base station may configure SCG configuration information or bearer configuration information to suit terminal capability, or not to exceed terminal capability, or to match bearer configuration information of the MCG when the SCG is configured in the terminal.

When the secondary base station having received the request message 1o-10 rejects the request message, the secondary base station may configure a rejection message and may transmit the rejection message to the master base station through the Xn interface (e.g., interface between base stations) or the Sn interface (interface between a base station and an AMF, a UMF, or a base station) (1o-15). When the secondary base station accepts the request message, the secondary base station may transmit a request acceptance message including configuration information or an indicator for configuring, releasing, adding, deactivating, activating, resuming, modifying, reconfiguring, or suspending dual connectivity, a cell group (e.g., SCG), or a cell through the Xn interface (e.g., interface between base stations) or the Sn interface (interface between a base station and an AMF, a UMF, or a base station) to the master base station (1o-15). The request acceptance message may include some of the following information.

- The same identifier as a message identifier included in the request message, or an indicator indicating that a request in the request message is accepted
- Configuration information or indicator (e.g., configuration information or indicator for the MCG) for configuring, releasing, adding, deactivating, activating, resuming, modifying, reconfiguring, or suspending dual connectivity, a cell group (e.g., SCG), or a cell
- First RRC message (e.g., RRCReconfiguration message) including configuration information or an indicator for configuring, releasing, adding, deactivating, activating, resuming, modifying, reconfiguring, or suspending dual connectivity, a cell group (e.g., SCG), or a cell The first RRC message may include some of the following information.

- First RRC message identifier (e.g., rrc-Transaction identifier) for identifying the first RRC message. Because the terminal and the base station (e.g., secondary base station) transmit or receive a plurality of RRC messages therebetween, an identifier for identifying each RRC message may be included in the RRC message. For example, the same first RRC identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.

Configuration information or an indicator (e.g., configuration information or an indicator for the terminal) for configuring, releasing, adding, deactivating, activating, resuming, modifying, reconfiguring, or suspending dual connectivity, a cell group (e.g., SCG), or a cell Indicator indicating a state of a cell group (e.g., active, inactive, suspended, or resumed)

Cell group identifier for identifying cell groups. The cell group identifier may be allocated by the master base station, or one identifier from among already promised (or preset) identifiers may be allocated by the secondary base station Cell group or cell configuration information Bearer configuration information. For example, indicator information indicating an operation of a protocol layer (e.g., SDAP layer, or PDCP layer, or RLC layer, or MAC layer) of each bearer (e.g., PDCP suspension indicator, or PDCP reestablishment indicator, or PDCP data recovery indicator, or RLC reestablishment indicator, or MAC partial reset indicator, or MAC reset indicator, or indicator triggering new operation)

When configuration information or an indicator for configuring, adding, activating, resuming, modifying, or reconfiguring dual connectivity, a cell group (e.g., SCG), or a cell is included, a first indicator (e.g., mobilityControlInfor or ReconfigurationWithSync) may also be included. When configuration information or an indicator for releasing, deactivating, reconfiguring, or suspending dual connectivity, a cell group (e.g., SCG), or a cell is included, the first indicator (e.g., mobilityControlInfor or ReconfigurationWithSync) may not be included. The first indicator may be an indicator triggering a random access procedure in the cell group or the cell, or an indicator to perform signal synchronization with a new cell, or an indicator indicating to perform frequency shift of the terminal, or an indicator indicating to modify the cell group (or cell).

When configuration information or an indicator for configuring, adding, activating, resuming, modifying, or reconfiguring dual connectivity, a cell group (e.g., SCG), or a cell is included, random access configuration information may also be included. When configuration information or an indicator for releasing, deactivating, reconfiguring, or suspending dual connectivity, a cell group (e.g., SCG), or a cell is included, the random access configuration information may not be included. The random access configuration information may include random access transmission resource information (time or frequency transmission resource) for preamble transmission or designated preamble information for the cell group or cell.

Time information indicating when to activate, resume, deactivate, or suspend dual connectivity, a cell group (e.g., SCG), or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate, resume, deactivate, or suspend a cell in an $n+X^{th}$ time unit)

When the master base station receives the request acceptance message 1o-15, the master base station may identify the request acceptance message, and may transmit, to the terminal, a second RRC message 1o-20 (e.g., RRCReconfiguration) including information included in the request acceptance message (e.g., first RRC message included in the request acceptance message 1o-15). The second RRC message may include some of the following information.

Second RRC message identifier (e.g., rrc-Transaction identifier) for identifying the second RRC message. Because the terminal and the base station (e.g., master base station) transmit or receive a plurality of RRC messages therebetween, the RRC message may include an identifier for identifying each RRC message. For example, the same second RRC identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.

First RRC message included in the request acceptance message 1o-15

Configuration information or an indicator (e.g., configuration information or an indicator for the terminal) for configuring, releasing, adding, deactivating, activating, resuming, modifying, reconfiguring, or suspending dual connectivity, a cell group (e.g., SCG), or a cell Indicator indicating a state of a cell group (e.g., active, inactive, suspended, or resumed)

Cell group identifier for identifying cell groups The cell group identifier may be allocated by the master base station, or one identifier from among already promised identifiers may be allocated by the secondary base station.

Cell group or cell configuration information

Bearer configuration information For example, indicator information indicating an operation of a protocol layer (e.g., SDAP layer, or PDCP layer, or RLC layer, or MAC layer) of each bearer (e.g., PDCP suspension indicator, or PDCP reestablishment indicator, or PDCP data recovery indicator, or RLC reestablishment indicator, or MAC partial reset indicator, or MAC reset indicator, or indicator triggering new operation)

When configuration information or an indicator for configuring, adding, activating, resuming, modifying, or reconfiguring dual connectivity, a cell group (e.g., SCG), or a cell is included, a first indicator (e.g., mobilityControlInfor or ReconfigurationWithSync) may also be included. When configuration information or an indicator for releasing, deactivating, reconfiguring, or suspending dual connectivity, a cell group (e.g., SCG), or a cell is included, the first indicator (e.g., mobilityControlInfor or ReconfigurationWithSync) may not be included. The first indicator may be an indicator triggering a random access procedure in the cell group or the cell, or an indicator to perform signal synchronization with a new cell, or an indicator indicating to perform frequency shift of the terminal, or an indicator indicating to modify the cell group (or cell). In another method, the terminal may perform PDCCH monitoring in the indicated or configured cell group or cell, and may trigger and perform a random access procedure according to an indication indicated in the PDCCH. For example, a higher layer (e.g., RRC layer) may transmit an indicator triggering a random access procedure to a lower layer (e.g., MAC layer).

When configuration information or an indicator for configuring, adding, activating, resuming, modifying, or reconfiguring dual connectivity, a cell group (e.g., SCG), or a cell is included, random access configuration information may also be included. When configuration information or an indicator for releasing, deactivating, reconfiguring, or suspending dual connectivity, a cell group (e.g., SCG), or a cell is included, the random access configuration information may not be included. The random access configuration information may include random access transmission resource information (time or frequency transmission resource) for preamble transmission or designated preamble information for the cell group or cell.

Time information indicating when to activate, resume, deactivate, or suspend dual connectivity, a cell group (e.g., SCG), or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate, resume, deactivate, or suspend a cell in an $n+X^{th}$ time unit)

When the terminal receives the second RRC message 1o-20, the terminal may read and identify the second RRC message, or may read information included in the second RRC message (e.g., first RRC message included in the second RRC message) and may configure, add, modify, resume, suspend, or deactivate dual connectivity or a cell group (e.g., SCG). Also, when a first indicator triggering a random access procedure is included in the second RRC message or the first RRC message, the terminal may trigger a random access procedure for the configured or indicated cell group or cell. When a random access procedure is performed, if there is random access information in the RRC message or if there is stored random access information, the terminal may perform a random access procedure (e.g., a CFRA procedure (e.g., 4-step random access or 2-step random access)), based on the stored random access information, or the random access information received in the RRC message, or system information. When there is no random access information in the RRC message, the terminal may perform a random access procedure (e.g., a CBRA procedure (e.g., 4-step random access or 2-step random access)). In another method, the terminal may perform PDCCH monitoring in the indicated or configured cell group or cell, and may trigger and perform a random access procedure according to an indication indicated in the PDCCH. For example, a higher layer (e.g., RRC layer) may transmit an indicator triggering a random access procedure to a lower layer (e.g., MAC layer).

The terminal may receive the second RRC message 1o-20 or apply received configuration information, and may generate a third RRC message 1o-25 or a fourth RRC message and may transmit the third RRC message or the fourth RRC message to the base station. The third RRC message may include some of the following information.

Second RRC message identifier having the same value as a second RRC message identifier included in the second RRC message Indicator or an identifier indicating that the second RRC message is successfully received Fourth RRC message including a response indicating the first RRC message generated and transmitted by the secondary base station is successfully received. The fourth RRC message may include some of the following information.

First RRC message identifier having the same value as a first RRC message identifier included in the first RRC message Indicator or an identifier indicating that the first RRC message is successfully received Response indicator indicating that the first RRC message is successfully applied When the base station (e.g., master base station) receives the third RRC message, the base station may determine whether the third RRC message is a response message to the second RRC message through a second identifier. The base station may identify the fourth RRC message included in the third RRC message, may include the fourth RRC message in a configuration complete message indicating that a configuration is completed to an SCG base station, and may transmit the same to the secondary base station through the Xn interface (e.g., interface between base stations) or the Sn interface (interface between a base station and an AMF, a UMF, or a base station) (1o-30). The configuration complete message may include some of the following information.

Fourth RRC message included in the third RRC message

Indicator or an identifier indicating that a configuration (cell group addition, modification, or release) or an indication (e.g., cell group activation, deactivation, suspension, or resumption) indicated in the request acceptance message or the first RRC message is completed When the base station (e.g., secondary base station) receives the configuration complete message, the base station may read or identify the fourth RRC message included in the configuration complete message, and may determine whether the fourth RRC message is a response message to the first RRC message through a first identifier. It may be determined whether a configuration or an indication indicated by the base station is successfully completed. When the secondary base station receives the configuration complete message or the fourth RRC message, the secondary base station may transmit, to the master base station, a response message indicating that the configuration complete message or the fourth RRC message is successfully received as a response.

FIG. 1P illustrates a flowchart of a second signaling procedure of configuring or releasing dual connectivity, or configuring, releasing, activating, resuming, suspending, or deactivating an SCG configured with dual connectivity, according to an embodiment of the disclosure.

Referring to FIG. 1P, a terminal may configure an RRC connection with a network or a base station as shown in FIG. 1F of the disclosure, and may perform data transmission or reception with the base station (e.g., MCG, MN, or cells (PCells or SCells) of MCG).

The base station may configure dual connectivity in the terminal for a certain reason (e.g., when a high data rate is required, at a request of the terminal (1p-05), or when a high QoS requirement should be satisfied). For example, the terminal may transmit, to the base station, a request to configure, release, activate, deactivate, resume, or suspend dual connectivity, a cell group (e.g., SCG), or a cell. A request message of the terminal may include a frequency (or channel) measurement result report, or a cell group identifier, or cell identifiers, or measurement results (1p-05). In another method, the base station may determine whether to configure, release, add, deactivate, activate, resume, modify, or reconfigure dual connectivity, a cell group (e.g., SCG), or a cell, by considering the amount of DL (or UL) data or the amount of buffer.

A master base station (MN or MCG) may receive a frequency or channel measurement report for a frequency or a channel received from the terminal, and may determine a secondary base station (SN or SCG) for configuring dual connectivity based on the measurement report. Alternatively, the master base station may determine whether to configure, release, add, deactivate, activate, resume, modify, reconfigure, or suspend dual connectivity, a cell group (e.g., SCG), or a cell, by considering the amount of DL (or UL) data or the amount of buffer. In order to configure, release, add, deactivate, activate, resume, modify, reconfigure, or suspend dual connectivity, a cell group (e.g., SCG), or a cell, the master base station may transmit a first RRC message 1p-10 to the terminal In order to indicate the terminal to configure, release, add, deactivate, activate, resume, modify, reconfigure, or suspend dual connectivity, a cell group (e.g., SCG), or a cell, each separate new request message may be defined and indicated, and in another method, a new indicator may be defined in an existing message (e.g., RRCReconfiguration message or RRCResume message) to indicate (or request) to configure, release, add, deactivate, activate, resume, modify, reconfigure, or suspend a cell group (e.g., SCG) or a cell. The first RRC message may include some of the following information.

- First RRC message identifier (e.g., rrc-Transaction identifier) for identifying the first RRC message. Because the terminal and the base station (e.g., master base station) transmit or receive a plurality of RRC messages therebetween, an identifier for identifying each RRC message may be included in the RRC message. For example, the same first RRC message identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.
- Configuration information or an indicator (e.g., configuration information or an indicator for the terminal) for configuring, releasing, adding, deactivating, activating, resuming, modifying, reconfiguring, or suspending dual connectivity, a cell group (e.g., SCG), or a cell
- Indicator indicating a state of a cell group (e.g., active, inactive, suspended, or resumed)
- Cell group identifier for identifying cell groups The cell group identifier may be allocated by the master base station, or one identifier from among already promised identifiers may be allocated by the secondary base station)
- Cell group or cell configuration information
- Bearer configuration information. For example, indicator information indicating an operation of a protocol layer (e.g., SDAP layer, or PDCP layer, or RLC layer, or MAC layer) of each bearer (e.g., PDCP suspension indicator, or PDCP reestablishment indicator, or PDCP data recovery indicator, or RLC reestablishment indicator, or MAC partial reset indicator, or MAC reset indicator, or indicator triggering new operation)
- When configuration information or an indicator for configuring, adding, activating, resuming, modifying, or reconfiguring dual connectivity, a cell group (e.g., SCG), or a cell is included, a first indicator (e.g., mobilityControlInfor or ReconfigurationWithSync) may also be included. When configuration information or an indicator for releasing, deactivating, reconfiguring, or suspending dual connectivity, a cell group (e.g., SCG), or a cell is included, the first indicator (e.g., mobilityControlInfor or ReconfigurationWithSync) may not be included. The first indicator may be an indicator triggering a random access procedure in the cell group or the cell, or an indicator to perform signal synchronization with a new cell, or an indicator indicating to perform frequency shift of the terminal, or an indicator indicating to modify the cell group (or cell). In another method, the terminal may perform PDCCH monitoring in the indicated or configured cell group or cell, and may trigger and perform a random access procedure according to an indication indicated in the PDCCH. For example, a higher layer (e.g., RRC layer) may transmit an indicator triggering a random access procedure to a lower layer (e.g., MAC layer).
- When configuration information or an indicator for configuring, adding, activating, resuming, modifying, or reconfiguring dual connectivity, a cell group (e.g., SCG), or a cell is included, random access configuration information may also be included. When configuration information or an indicator for releasing, deactivating, reconfiguring, or suspending dual connectivity, a cell group (e.g., SCG), or a cell is included, the random access configuration information may not be included. The random access configuration information may include random access transmission resource information (time or frequency transmission resource) for preamble transmission or designated preamble information for the cell group or cell.
- Time information indicating when to activate, resume, deactivate, or suspend dual connectivity, a cell group (e.g., SCG), or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate, resume, deactivate, or suspend a cell in an $n+X^{th}$ time unit)

When the terminal receives the first RRC message 1p-15, the terminal may read and identify the first RRC message, and may configure, add, modify, resume, suspend, or deactivate dual connectivity or a cell group (e.g., SCG). Also, when a first indicator triggering a random access procedure is included in the first RRC message, the terminal may trigger a random access procedure for the configured or indicated cell group or cell. When the random access procedure is performed, if there is random access information in the RRC message or if there is stored random access information, the terminal may perform a random access procedure (e.g., a CFRA procedure (e.g., 4-step random access or 2-step random access)), based on the stored random access information, or the random access information received in the RRC message, or system information. When there is no random access information in the RRC message, the terminal may perform a random access procedure (e.g., a CBRA procedure (e.g., 4-step random access or 2-step random access)). In another method, the terminal may perform PDCCH monitoring in the indicated or configured cell group or cell, and may trigger and perform a random access procedure according to an indication indicated in the PDCCH. For example, a higher layer (e.g., RRC layer) may transmit an indicator triggering a random access procedure to a lower layer (e.g., MAC layer).

The terminal may receive the first RRC message 1p-10 or apply received configuration information, and may generate a second RRC message and may transmit the second RRC message to the base station (1p-15). The second RRC message may include some of the following information.

- First RRC message identifier having the same value as a first RRC message identifier included in the first RRC message
- Indicator or an identifier indicating that the first RRC message is successfully received When the base station (e.g., master base station) receives the second RRC message, the base station may determine whether the second RRC message is a response message to the first RRC message through a first identifier. When the base station identifies the first RRC message, the base station may transmit, to the secondary base station, an indication message including an indication that a cell group has been configured, added, released, activated, resumed, suspended, or deactivated to an SCG base station through an Xn interface (e.g., interface between base stations) or an Sn interface (interface between a base station and an AMF, a UMF, or a base station) (1p-20). The indication message may include some of the following information.

Identifier for identifying the indication message

Configuration information or an indicator (e.g., configuration information or an indicator for the SCG) indicating that dual connectivity, a cell group, or a cell has been configured, released, added, deactivated, activated, resumed, modified, reconfigured, or suspended When the base station (e.g., secondary base station) receives the indication message, the base station may read or identify configuration information or a message included in the indication message, may generate an indication acknowledgement message as a response message to the indication message, and may transmit the indication acknowledgement message to the master base station (1p-25). The indication acknowledgement message may include some of the following information.

Identifier having the same value as an identifier included in the indication message Indicator or an identifier indicating that the indication message is successfully received Response indicator indicating that the indication message is successfully applied FIG. 1Q illustrates a flowchart of a third signaling procedure of configuring or releasing dual connectivity, or configuring, releasing, activating, resuming, suspending, or deactivating an SCG configured with dual connectivity, according to an embodiment of the disclosure.

Referring to FIG. 1Q, a terminal may configure an RRC connection with a network or a base station as shown in FIG. 1F of the disclosure, and may perform data transmission or reception with the base station (e.g., MCG, MN, or cells (PCells or SCells) of MCG).

In FIG. 1Q, according to a configuration procedure of 1F, the base station may configure, in the terminal, an SRB (e.g., SRB3) for directly transmitting or receiving a control message or an RRC message between the terminal and a secondary base station.

The base station (e.g., a secondary base station or a master base station) may configure dual connectivity in the terminal for a certain reason (e.g., when a high data rate is required, at a request of the terminal (1q-05), or when a high QoS requirement should be satisfied). For example, the terminal may transmit, to the base station, a request to configure, release, activate, deactivate, resume, or suspend dual connectivity, a cell group (e.g., SCG), or a cell, or may transmit a request to the secondary base station through the SRB3. A request message of the terminal may include a frequency (or channel) measurement result report, or a cell group identifier, or cell identifiers, or measurement results (1q-05). In another method, the secondary base station may determine whether to configure, release, add, deactivate, activate, resume, modify, or reconfigure dual connectivity, a cell group (e.g., SCG), or a cell, by considering the amount of DL (or UL) data or the amount of buffer.

The secondary base station (MN or MCG) may receive a frequency or channel measurement report for a frequency or a channel received from the terminal, and may determine whether to configure, release, add, deactivate, activate, resume, modify, reconfigure, or suspend dual connectivity, a cell group (e.g., SCG), or a cell based on the measurement result. Alternatively, the secondary base station may determine whether to configure, release, add, deactivate, activate, resume, modify, reconfigure, or suspend dual connectivity, a cell group (e.g., SCG), or a cell, by considering the amount of DL (or UL) data or the amount of buffer.

In order to configure, release, add, deactivate, activate, resume, modify, reconfigure, or suspend dual connectivity, a cell group (e.g., SCG), or a cell, the secondary base station may transmit a first RRC message 1q-10 to the terminal through the SRB3. In order to indicate the terminal to configure, release, add, deactivate, activate, resume, modify, reconfigure, or suspend dual connectivity, a cell group (e.g., SCG), or a cell, each separate new request message may be defined and indicated, and in another method, a new indicator may be defined in an existing message (e.g., RRCReconfiguration message or RRCResume message) to indicate (or request) to configure, release, add, deactivate, activate, resume, modify, reconfigure, or suspend a cell group (e.g., SCG) or a cell. The first RRC message may include some of the following information.

First RRC message identifier (e.g., rrc-Transaction identifier) for identifying the first RRC message. Because the terminal and the base station (e.g., secondary base station) transmit or receive a plurality of RRC messages therebetween, an identifier for identifying each RRC message may be included in the RRC message. For example, the same first RRC message identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.

Configuration information or an indicator (e.g., configuration information or an indicator for the terminal) for configuring, releasing, adding, deactivating, activating, resuming, modifying, reconfiguring, or suspending dual connectivity, a cell group (e.g., SCG), or a cell Indicator indicating a state of a cell group (e.g., active, inactive, suspended, or resumed)

Cell group identifier for identifying cell groups The cell group identifier may be allocated by the master base station, or one identifier from among already promised identifiers may be allocated by the secondary base station)

Cell group or cell configuration information

Bearer configuration information. For example, indicator information indicating an operation of a protocol layer (e.g., a SDAP layer, or a PDCP layer, or an RLC layer, or a MAC layer) of each bearer (e.g., a PDCP suspension indicator, or a PDCP reestablishment indicator, or a PDCP data recovery indicator, or an RLC reestablishment indicator, or a MAC partial reset indicator, or a MAC reset indicator, or an indicator triggering new operation)

When configuration information or indicator for configuring, adding, activating, resuming, modifying, or reconfiguring dual connectivity, a cell group (e.g., SCG), or a cell is included, a first indicator (e.g., mobilityControlInfor or ReconfigurationWithSync)

may also be included. When configuration information or an indicator for releasing, deactivating, reconfiguring, or suspending dual connectivity, a cell group (e.g., SCG), or a cell is included, the first indicator (e.g., mobilityControlInfor or ReconfigurationWithSync) may not be included. The first indicator may be an indicator triggering a random access procedure in the cell group or the cell, or an indicator to perform signal synchronization with a new cell, or an indicator indicating to perform frequency shift of the terminal, or an indicator indicating to modify the cell group (or cell). In another method, the terminal may perform PDCCH monitoring in the indicated or configured cell group or cell, and may trigger and perform a random access procedure according to an indication indicated in the PDCCH. For example, a higher layer (e.g., RRC layer) may transmit an indicator triggering a random access procedure to a lower layer (e.g., MAC layer).

When configuration information or an indicator for configuring, adding, activating, resuming, modifying, or reconfiguring dual connectivity, a cell group (e.g., SCG), or a cell is included, random access configuration information may also be included. When configuration information or an indicator for releasing, deactivating, reconfiguring, or suspending dual connectivity, a cell group (e.g., SCG), or a cell is included, the random access configuration information may not be included. The random access configuration information may include random access transmission resource information (time or frequency transmission resource) for preamble transmission or designated preamble information for the cell group or cell.

Time information indicating when to activate, resume, deactivate, or suspend dual connectivity, a cell group (e.g., SCG), or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate, resume, deactivate, or suspend a cell in an $n+X^{th}$ time unit)

When the terminal receives the first RRC message 1q-10 through the SRB3, the terminal may read and identify the first RRC message, and may configure, add, modify, resume, suspend, or deactivate dual connectivity or a cell group (e.g., SCG). Also, when a first indicator triggering a random access procedure is included in the first RRC message, the terminal may trigger a random access procedure for the configured or indicated cell group or cell. When the random access procedure is performed, if there is random access information in the RRC message or if there is stored random access information, the terminal may perform a random access procedure (e.g., a CFRA procedure (e.g., 4-step random access or 2-step random access)), based on the stored random access information, or the random access information received in the RRC message, or system information. When there is no random access information in the RRC message, the terminal may perform a random access procedure (e.g., a CBRA procedure (e.g., 4-step random access or 2-step random access)). In another method, the terminal may perform PDCCH monitoring in the indicated or configured cell group or cell, and may trigger and perform a random access procedure according to an indication indicated in the PDCCH. For example, a higher layer (e.g., RRC layer) may transmit an indicator triggering a random access procedure to a lower layer (e.g., MAC layer).

The terminal may receive the first RRC message 1q-10 or apply received configuration information, and may generate a second RRC message and may transmit the second RRC message to the secondary base station through the SRB3 (1q-15). The second RRC message may include some of the following information.

First RRC message identifier having the same value as a first RRC message identifier included in the first RRC message Indicator or an identifier indicating that the first RRC message is successfully received When the base station (e.g., secondary base station) receives the second RRC message, the base station may determine whether the second RRC message is a response message to the first RRC message through a first identifier. When the base station identifies the first RRC message, the base station may transmit, to the master base station or an MCG base station, an indication message including an indication indicating that a cell group has been configured, added, released, activated, resumed, suspended, or deactivated through an Xn interface (e.g., an interface between base stations) or an Sn interface (an interface between a base station and an AMF, a UMF, or a base station) (1q-20). The indication message may include some of the following information.

Identifier for identifying the indication message

Configuration information or an indicator (e.g., configuration information or an indicator for the SCG) indicating that dual connectivity, a cell group, or a cell has been configured, released, added, deactivated, activated, resumed, modified, reconfigured, or suspended When the base station (e.g., master base station) receives the indication message, the base station may read or identify configuration information or a message included in the indication message, may generate an indication acknowledgement message as a response message to the indication message, and may transmit the indication acknowledgement message to the secondary base station (1q-25). The indication acknowledgement message may include some of the following information.

Identifier having the same value as an identifier included in the indication message Indicator or an identifier indicating that the indication message is successfully received Response indicator indicating that the indication message is successfully applied When a message is transmitted to a terminal in order to configure or indicate cell group or cell configuration information according to the disclosure in the terminal, for example, when configuration information or an indicator for configuring, adding, activating, resuming, modifying, or reconfiguring dual connectivity, a cell group (e.g., SCG), or a cell is included in the message, the message may include or reconfigure SDAP configuration information, or may include, configure, or reconfigure mapping configuration information between a QoS flow and a bearer of an SDAP layer. When configuration information or an indicator for releasing, deactivating, reconfiguring, or suspending dual connectivity, a cell group (e.g., SCG), or a cell is included in the message, the message may not include or reconfigure the SDAP configuration information, or may not include, configure, reconfigure, or may suspend the mapping configuration information between the QoS flow and the bearer of the SDAP layer.

The signaling procedures according to the disclosure may be combined, modified, and extended to new signaling procedures.

The signaling procedures according to the disclosure may be extended to multiple access technology. For example, configuration information of a plurality of cell groups may be configured in a terminal through an RRC message, and one or more cell groups (or cells) from among the configured cell groups may be activated or resumed through an indicator of a PDCCH, or MAC control information, or an RRC message, or one or more cell groups may be suspended or deactivated.

When dual connectivity, a cell group (e.g., SCG), or a cell (PSCell or SCG SCell) according to the disclosure is activated, resumed, added, deactivated, released, or suspended, a terminal operation for each cell (PSCell or SCG SCell) or a terminal operation for each protocol layer (e.g., SDAP layer, or PDCP layer, or RLC layer, or MAC layer, or PHY layer) will be described.

> 1> When a terminal receives configuration information or an indicator for configuring, adding, activating, resuming, modifying, or reconfiguring dual connectivity, a cell group (e.g., SCG), or a cell (e.g., through DCI of a PDCCH, MAC control information, or an RRC message), the terminal may perform some of the following procedures.
> 2> A higher layer (e.g., RRC layer) may indicate the configuration information or the indicator to a lower layer (e.g., a PDCP layer, an RLC layer, a MAC layer, or a PHY layer).
> 2> Terminal operation for PSCell: When the terminal receives the configuration information or the indicator, the terminal may maintain a PSCell in an active state, may activate a DL BWP of the PSCell to a normal BWP (e.g., the first active BWP or a BWP other than a dormant BWP) or a last activated BWP configured in the RRC message, and may perform a terminal operation in the activated BWP. In another method, when the terminal receives the configuration information or the indicator, the terminal may maintain a PSCell in an active state, may reconfigure or switch a PDCCH monitoring period or a DRX configuration period of the PSCell to a short period based on first DRX configuration information, and may perform PDCCH monitoring and perform a terminal operation of the active cell. In the method, the terminal may perform a terminal operation for the PSCell, thereby rapidly receiving a scheduling indication from a cell group or a cell and starting data transmission or reception. Also, in order to more rapidly receive a scheduling indication from a cell group or a cell and start data transmission or reception, the terminal may measure many or frequent channel signals based on first channel measurement configuration information configured in the RRC message and may rapidly report a channel measurement result to a base station. When a certain condition is satisfied, the terminal may measure a channel signal again based on second channel measurement configuration information and may report a measurement result to the base station.
> 2> Terminal operation for SCell of SCG: When the terminal receives the configuration information or the indicator, the terminal may activate a SCell of an SCG, may activate a DL BWP or a UL BWP to a BWP (e.g., the first active BWP) configured in the RRC message, and may perform a terminal operation of the activated SCell or BWP. In another method, when the terminal receives the configuration information or the indicator, if a dormant BWP is configured in the SCell of the SCG, the terminal may maintain the SCell in an active state, may activate a DL BWP of the SCell to a BWP (e.g., the first active BWP) configured in the RRC message, and may perform a terminal operation in the activated BWP. Alternatively, when a dormant BWP is not configured in the SCell of the SCG, the terminal may switch the SCell to an active state, may activate a DL BWP or a UL BWP to a BWP (e.g., the first active BWP) configured in the RRC message, and may perform a terminal operation of the activated SCell or BWP. In another method, when the terminal receives the configuration information or the indicator, the terminal may determine switching, activation, or deactivation of a BWP or a state of the SCell according to SCell configuration information or an indicator configured in a message including the configuration information or the indicator and may perform a terminal operation.
> 2> Terminal operation of MAC layer for SCG: When the terminal receives the configuration information or the indicator, the terminal may perform a MAC reset procedure on a MAC layer (e.g., may initialize or release configuration information configured in the MAC layer, and may stop or initialize configured timers or may stop or initialize an HARQ procedure). For example, a timing advance timer (TAT) indicating the validity of signal synchronization between the terminal and the base station may be considered as stopped or expired. In another method, when the terminal receives the configuration information or the indicator, the terminal may perform a MAC partial reset procedure (or when an indicator indicating a MAC partial reset procedure is included in a message including the configuration information or the indicator, the terminal may perform a MAC partial reset procedure). For example, the TAT indicating the validity of signal synchronization between the terminal and the base station may be continuously maintained, or HARQ retransmission in retransmission may be continuously performed. In another method, the terminal may not perform any procedure on the MAC layer and may maintain a current configuration. Also, when an indication to trigger a random access procedure is indicated from a higher layer (e.g., RRC layer), or the TAT is stopped or expired, the terminal may trigger a random access procedure. In another method, when the TAT is not stopped or expired, the terminal may not trigger or perform a random access procedure. This is because, when the TAT is running, signal synchronization with the SCG is performed or maintained, and thus it is not necessary to perform a random access procedure. In another method, when the base station triggers a random access procedure by using an indication of the PDCCH to the terminal, the terminal may trigger a random access procedure, and may configure or adjust a timing advance (TA) value, or may start the TAT. After the random access procedure is completed, the SCG may be resumed or activated, and data transmission or reception may re-start. In the random access procedure, a CBRA procedure may be performed. In another method, when the random access procedure is performed, if random access configuration information (dedicated RACH config or dedicated preamble) designated by the base station is configured (or included) in a message (or previously received message) indicating to activate or resume a cell group, the terminal may perform a CFRA procedure. Alternatively, when random access configuration information (dedicated RACH config or dedicated preamble) designated by the base station is not configured (or included) in the message (or previously received message) indicating to activate or resume a cell group, the terminal may perform a CBRA procedure or may not perform a random access procedure. Alternatively, when the TAT expires, if a channel measurement reporting procedure (e.g., CSI measurement reporting, or SSB measurement reporting, or radio resource measurement (RRM) measurement result for SCG) is configured, the terminal may stop the channel measurement or channel measurement reporting procedure. Alternatively, when the TAT re-starts, or when a TA value is newly received, or when a TA value is newly configured, the terminal may re-start or resume the channel measurement or channel measurement reporting procedure.

2> Operation for data radio bearer (DRB) configured in SCG: When the terminal receives the configuration information or the indicator, the terminal may resume DRBs (or SCG (SN) terminated DRBs or DRBs with a PDCP layer configured in the SCG) included in the SCG. For example, for a split bearer with a PDCP layer configured in an MCG (bearer in which one RLC layer is configured in the MCG and another RLC layer is configured in the SCG), an indicator (reestablishRLC) triggering a procedure of reestablishing the RLC layer configured in the SCG may also be included in the RRC message including the configuration information or the indicator. Alternatively, the terminal may perform a reestablishment procedure on the RLC layer configured in the SCG. For example, for a split bearer with a PDCP layer configured in the SCG (bearer in which one RLC layer is configured in the MCG and another RLC layer is configured in the SCG), an indicator (reestablishRLC) triggering a procedure of reestablishing the RLC layer configured in the MCG may also be included, or an indicator triggering a PDCP reestablishment procedure (reestablishPDCP) or a PDCP resume procedure (PDCP resume) in the PDCP layer configured in the SCG may also be included, in the RRC message including the configuration information or the indicator. Alternatively, the terminal may perform a reestablishment procedure on the RLC layer configured in the MCG, or may perform a PDCP reestablishment procedure or a PDCP resume procedure in the PDCP layer configured in the SCG. For example, for a bearer configured in the SCG, bearers may be resumed, or an RRC layer may indicate a PDCP layer to trigger a PDCP reestablishment procedure or a PDCP resume procedure, or a PDCP reestablishment procedure or a PDCP resume procedure may be performed in a PDCP layer. The terminal may trigger a first PDCP resume procedure for bearers configured in the SCG, or a first PDCP resume procedure may be performed in a PDCP layer. In another method, in order to solve a security issue problem occurring when different data are transmitted with the same security key when the SCG is activated or resumed, the terminal may trigger a second PDCP resume procedure for bearers configured in the SCG, or a second PDCP resume procedure may be performed in a PDCP layer. In another method, when a PDCP layer resume procedure is triggered in a higher layer, a first PDCP resume procedure may be triggered and performed, and when a PDCP layer resume procedure is triggered in a higher layer or an indicator to activate or resume a cell group (or cell) is indicated, a second PDCP resume procedure may be triggered and performed. In another method, in order to solve a security issue problem occurring when different data are transmitted with the same security key, when the base station indicates an indicator to activate or resume a cell group (or cell), the base station may configure a new security key including security key configuration information (e.g., sk-counter) in an RRC message including an indicator to activate or resume a cell group (or cell) and may modify or update the security key, or may include a PDCP reestablishment procedure indicator in the RRC message to modify or update a security key of bearers configured in the SCG, or the terminal may perform a PDCP reestablishment procedure on the bearers.

2> Operation for SRB configured in SCG: When the terminal receives the configuration information or the indicator and activates a PSCell, or when an activated DL BWP of the PSCell is a normal BWP other than a dormant BWP or an activated PSCell monitors the PDCCH with a long period based on first DRX configuration information, SRBs (or SN (SCG) terminated SRBs or SRBs or SRB3s with a PDCP layer configured in the SCG) included in the SCG may be continuously maintained (e.g., the terminal may continuously transmit or receive a control message to or from a secondary base station). In another method, when the terminal receives the configuration information or the indicator, the terminal may resume SRBs (or SN (SCG) terminated SRBs or SRBs or SRB3s with a PDCP layer configured in the SCG) included in the SCG. For example, for a split bearer with a PDCP layer configured in the MCG (bearer in which one RLC layer is configured in the MCG and another RLC layer is configured in the SCG), an indicator (reestablishRLC) triggering a procedure of reestablishing the RLC layer configured in the SCG may also be included in the RRC message including the configuration information or the indicator. Alternatively, the terminal may perform a reestablishment procedure on the RLC layer configured in the SCG. For example, for a split bearer with a PDCP layer configured in the SCG (bearer in which one RLC layer is configured in an MCG and another RLC layer is configured in an SCG), an indicator (reestablishRLC) triggering a procedure of reestablishing the RLC layer configured in an MCG may also be included, or an indicator triggering a PDCP reestablishment procedure (reestablishPDCP) or a PDCP resume procedure (PDCP resume) in the PDCP layer configured in the SCG may also be included, in the RRC message including the configuration information or the indicator. Alternatively, the terminal may perform a reestablishment procedure on the RLC layer configured in the MCG, or may perform a PDCP reestablishment procedure or a PDCP resume procedure in the PDCP layer configured in the SCG. For example, for a bearer configured in the SCG, bearers may be resumed, or an RRC layer may indicate a PDCP layer to trigger a PDCP reestablishment procedure or a PDCP resume procedure, or a PDCP reestablishment procedure or a PDCP resume procedure may be performed in a PDCP layer. The terminal may trigger a first PDCP resume procedure for bearers configured in the SCG, or a first PDCP resume procedure may be performed in a PDCP layer. In another method, in order to solve a security issue problem occurring when different data are transmitted with the same security key when the SCG is activated or resumed, the terminal may trigger a second PDCP resume procedure for bearers configured in the SCG, or a second PDCP resume procedure may be performed in a PDCP layer. In another method, when a PDCP layer resume procedure is triggered in a higher layer, a first PDCP resume procedure may be triggered and performed, and when a PDCP layer resume procedure is triggered in a higher layer or an indicator to activate or resume a cell group (or cell) is indicated, a second PDCP resume procedure may be triggered and performed. In another method, in order to solve a security issue problem occurring when different data are transmitted with the same security key, when the base station indicates an indicator to activate or resume a cell group (or cell), the base station may configure a new security key including security key configuration information (e.g., sk-counter) in an RRC message including an indicator to activate or resume a cell group (or cell) and may modify or update the security key, or may include a PDCP reestablishment procedure indicator in the RRC message to modify or update a security key of bearers configured in the SCG, or the terminal may perform a PDCP reestablishment procedure on the bearers.

2> The terminal may transmit an indicator indicating that a cell group (e.g., SCG) or a cell has been configured, added, activated, resumed, modified, or reconfigured to the MCG or the SCG. The terminal may transmit the indicator to the SCG (or base station) or the MCG (or base station) through a signal (e.g., DCI, HARQ ACK or NACK, or new transmission resource) transmitted through a physical channel (PDCCH or PDSCH), MAC control information, or an RRC message.

2> When the terminal receives an indicator to resume, activate, or add a cell group (e.g., SCG) or a cell, the terminal may trigger a PDCP state report in a PDCP layer and may transmit the PDCP state report to the base station, through configured SCG bearers, bearers connected to an SCG RLC layer, SCG split bearers, MCG bearers, or MCG split bearers. Because the terminal transmits the PDCP state report to the base station, states of window variables or missing data between the terminal and the base station may be identified, and thus a transmission window and a reception window may be synchronized.

1> When the terminal receives configuration information or an indicator for releasing, deactivating, reconfiguring, or suspending dual connectivity, a cell group (e.g., SCG), or a cell (e.g., through DCI of a PDCP, MAC control information, or an RRC message), the terminal may perform some of the following procedures.

2> A higher layer (e.g., RRC layer) may indicate the configuration information or the indicator to a lower layer (e.g., PDCP layer, RLC layer, MAC layer, or PHY layer).

2> Terminal operation for PSCell: When the terminal receives the configuration information or the indicator, the terminal may maintain a PSCell in an active state, may activate a DL BWP of the PSCell to a dormant BWP configured in an RRC message, and may perform a terminal operation in the dormant BWP. Alternatively, when the terminal receives the configuration information or the indicator, the terminal may maintain a PSCell in an active state, may reconfigure or switch a PDCCH monitoring period or a DRX configuration period of the PSCell to a very long period based on second DRX configuration information, and may perform PDCCH monitoring and perform may perform a terminal operation of the active cell. In another method, when the terminal receives the configuration information or the indicator, the terminal may deactivate a PSCell, and may perform a terminal operation of the inactive cell. In the method, the terminal may perform a terminal operation for the PSCell, thereby reducing power consumption of the terminal.

2> Terminal operation for SCell of SCG: When the terminal receives the configuration information or the indicator, the terminal may deactivate a SCell of an SCG, and may perform a terminal operation of the deactivated SCell. In another method, when the terminal receives the configuration information or the indicator, if a dormant BWP is configured in the SCell of the SCG, the terminal may maintain the SCell in an active state, may activate a DL BWP of the SCell to the dormant BWP, and may perform a terminal operation in the dormant BWP. Alternatively, when a dormant BWP is not configured in the SCell of the SCG, the terminal may switch the SCell to an inactive state, and may perform a terminal operation in the deactivated cell or BWP. In another method, when the terminal receives the configuration information or the indicator, the terminal may determine switching, activation, or deactivation of a BWP or a state of the SCell according to SCell configuration information or an indicator configured in a message including the configuration information or the indicator.

2> Terminal operation of MAC layer for SCG: When the terminal receives the configuration information or the indicator, the terminal may perform a MAC reset procedure on a MAC layer (e.g., may initialize or release configuration information configured in the MAC layer, and may stop or initialize configured timers or may stop or initialize an HARQ procedure). For example, a TAT indicating the validity of signal synchronization between the terminal and the base station may be considered as stopped or expired. In another method, in order to prevent data loss due to a reset procedure of the MAC layer, when the terminal receives the configuration information or the indicator, the terminal may perform a MAC partial reset procedure (or when an indicator indicating a MAC partial reset procedure is included in a message including the configuration information or the indicator, the terminal may perform a MAC partial reset procedure). For example, a TAT indicating the validity of signal synchronization between the terminal and the base station may be continuously maintained, or HARQ retransmission in retransmission may continuously performed. In another method, the terminal may not perform any procedure on the MAC layer and may maintain a current configuration. When the TAT is continuously maintained, if the TAT expires, the terminal may re-adjust or configure timing advance (TA) by performing a random access procedure even when the SCG is suspended or deactivated. When the terminal performs a random access procedure, the terminal may indicate that it is a random access procedure for adjusting TA to the base station by using an indicator (e.g., may include and transmit a buffer state report (MAC control information), may indicate that there is no data to be transmitted, or may introduce and indicate a new indicator). Alternatively, after the random access procedure is completed, the base station may transmit a message including an indication to suspend or deactivate a cell group again to the terminal. Alternatively, after the random access procedure is completed, the terminal may maintain a cell group in a suspended or inactive state (in another method, the terminal may maintain a cell group in a suspended or inactive state without an indication of the base station). In another method, when the TAT is continuously maintained, if the TAT expires, because the same TAT is running in the base station, the base station may trigger a random access procedure (TA adjustment or reconfiguration) to the terminal through a cell (PCell, SCell, or PSCell) of the MCG or the SCG, or may transmit a message including an indicator or a message indicating an indication to resume or activate a cell group to the terminal. Alternatively, when the TAT expires, if a channel measurement reporting procedure (e.g., CSI measurement reporting, or SSB measurement reporting, or RRM measurement result for SCG) is configured, the terminal may stop the channel measurement or channel measurement reporting procedure. Alternatively, when the TAT re-starts, or a TA value is newly received, or when a TA value is newly configured, the terminal may re-start or resume the channel measurement or channel measurement reporting procedure.

2> Operation for DRB configured in SCG: When the terminal receives the configuration information or the indicator, the terminal may suspend DRBs (or SCG (SN) terminated DRBs or DRBs with a PDCP layer configured in the SCG) included in the SCG. For example, for a split bearer with a PDCP layer configured in the MCG (bearer in which one RLC layer is configured in the MCG and another RLC layer is configured in the SCG), an indicator (reestablishRLC) triggering a procedure of reestablishing the RLC layer configured in the SCG may also be included, or an indicator triggering a PDCP data recovery procedure in the PDCP layer configured in the MCG may also be included, in the RRC message including the configuration information or the indicator. Also, the terminal may perform a reestablishment procedure on the RLC layer configured in the SCG, or may perform a PDCP data recovery procedure in the PDCP layer configured in the MCG. For example, for a split bearer with a PDCP layer configured in the SCG (bearer in which one RLC layer is configured in the MCG and another RLC layer is configured in the SCG), an indicator (reestablishRLC) triggering a procedure of reestablishing the RLC layer configured in the MCG may also be included, or an indicator triggering a PDCP reestablishment procedure (reestablishPDCP) or a PDCP suspension procedure (PDCP suspend) in the PDCP layer configured in the SCG may also be included, in the RRC message including the configuration information or the indicator. Alternatively, the terminal may perform a reestablishment procedure on the RLC layer configured in the MCG, or may perform a PDCP reestablishment procedure or a PDCP suspension procedure (PDCP suspend) in the PDCP layer configured in the SCG. For example, for a bearer configured in the SCG, bearers may be suspended, or an RRC layer may indicate a PDCP layer to trigger a PDCP reestablishment procedure or a PDCP suspension procedure, or a PDCP reestablishment procedure or a PDCP suspension procedure may be performed in a PDCP layer. The terminal may trigger a first DPCP suspension procedure on bearers configured in the SCG, or may perform a first PDCP suspension procedure in a PDCP layer. In another method, in order to solve a security issue problem occurring when different data are transmitted with the same security key when the SCG is activated or resumed, the terminal may trigger a second PDCP suspension procedure on bearers configured in the SCG or a second PDCP suspension procedure may be performed in a PDCP layer. In another method, when a PDCI layer suspension procedure is triggered in a higher layer, a first PDCP suspension procedure may be triggered and performed, and when a PDCP layer suspension procedure is triggered in a higher layer or an indicator to deactivate or suspend a cell group (or cell) is indicated, a second PDCP suspension procedure may be triggered and performed.

2> Operation for SRB configured in SCG: When the terminal receives the configuration information or indicator and activates a PSCell, or when an activated DL BWP of the PSCell is a normal BWP other than a dormant BWP or an activated PSCell monitors the PDCCH with a long period based on second DRX configuration information, the terminal may not suspend but may continuously maintain SRBs (or SCG (SN) terminated SRBs or SRBs with a PDCP layer configured in the SCG) included in the SCG (e.g., the terminal may continuously transmit or receive a control message with a secondary base station). In another method, when the terminal receives the configuration information or the indicator, the terminal may suspend SRBs (or SCG (SN) terminated SRBs or SRBs with a PDCP layer configured in the SCG) configured in the SCG. For example, for a split SRB bearer with a PDCP layer configured in the MCG (bearer in which one RLC layer is configured in the MCG and another RLC layer is configured in the SCG), an indicator (reestablishRLC) triggering a procedure of reestablishing the RLC layer configured in the SCG may also be included, or an indicator triggering a PDCP data recovery procedure in the PDCP layer configured in the MCG may also be included, in the RRC message including the configuration information or the indicator. Also, the terminal may perform a reestablishment procedure on the RLC layer configured in the SCG, or may perform a PDCP data recovery procedure in the PDCP layer configured in the MCG. For example, for a split bearer with a PDCP layer configured in the SCG (bearer in which one RLC layer is configured in the MCG and another RLC layer is configured in the SCG), an indicator (reestablishRLC) triggering a procedure of reestablishing the RLC layer configured in the MCG may also be included, or an indicator triggering a PDCP reestablishment procedure (reestablishPDCP) or a PDCP suspension procedure (PDCP suspend) in the PDCP layer configured in the SCG may also be included, in the RRC message including the configuration information or the indicator. Alternatively, the terminal may perform a reestablishment procedure on the RLC layer configured in the MCG, or may perform a PDCP reestablishment procedure or a PDCP suspension procedure (PDCP suspend) in the PDCP layer configured in the SCG. For example, for a bearer configured in the SCG, bearers may be suspended, or an RRC layer may indicate a PDCP layer to trigger a PDCP reestablishment procedure or a PDCP suspension procedure, or a PDCP reestablishment procedure or a PDCP suspension procedure may be performed in a PDCP layer. The terminal may trigger a first DPCP suspension procedure for bearers configured in an SCG, or may perform a first PDCP suspension procedure in a PDCP layer. In another method, in order to solve a security issue problem occurring when different data are transmitted with the same security key when the SCG is activated or resumed, the terminal may trigger a second PDCP suspension procedure for bearers configured in the SCG, or a second PDCP suspension procedure may be performed in a PDCP layer. In another method, when a PDCP layer suspension procedure is triggered in a higher layer, a first PDCP suspension procedure may be triggered and performed, and when a PDCP layer suspension procedure is triggered in a higher layer or an indicator to deactivate or suspend a cell group (or cell) is indicated, a second PDCP suspension procedure may be triggered and performed.

2> The terminal may transmit an indicator indicating that a cell group (e.g., SCG) or a cell has been suspended, deactivated, released, or modified to the MCG or the SCG. The terminal may transmit the indicator to the SCG (or base station) or the MCG (or base station) through a signal (e.g., DCI, HARQ ACK or NACK, or new transmission resource) transmitted through a physical channel (PDCCH or PDSCH), MAC control information, or an RRC message.

2> When the terminal receives an indictor to suspend, deactivate, or release a cell group (e.g., SCG) or a cell, the terminal may trigger a PDCP state report in a PDCP layer and may transmit the PDCP state report to the base station, through configured SCG bearers, bearers connected to an SCG RLC layer, SCG split bearers, MCG bearers, or MCG split bearers. Because the terminal transmits the PDCP state report, states of window variables or missing data between the terminal and the base station may be identified, and thus a transmission window and a reception window may be synchronized.

Partial reset of a MAC layer according to the disclosure may include one or more terminal operations from among the following procedures.

A terminal may perform an operation of flushing the remaining HARQ processes (i.e., general HARQ process or HARQ process for system information) except for an HARQ process for multicast and broadcast service (MBS) from among HARQ processes configured in a serving cell, and after handover completion or after RRC state mode transition (to an RRC inactive mode or an RRC idle mode), the HARQ process for MBS may be emptied (flushed), or released (flushed), or initialized (flushed), or flushing may be omitted In the case of flushing operation, after handover completion or after state mode transmission (to an RRC inactive mode or an RRC idle mode), when MBS reception in a target base station is possible or when G-RNTI monitoring starts, data of the HARQ process related to an MBS may be flushed. Alternatively, until handover is completed or until RRC state mode transition (to an RRC inactive mode or an RRC idle mode) is completed, data reception through a G-RNTI may be continuously performed. In the case of handover, in the target base station, an operation of monitoring a C-RNTI in a target allocated through the RRC message may be performed. In another method, even before random access is completed from the target base station, data reception through the G-RNTI may be continuously performed.

A random access procedure that is being performed, if any, may be stopped.

A specifically configured or indicated preamble identifier, or preamble configuration information, or random access configuration related information (PRACH) configuration information, if any, may be discarded.

A temporary cell identifier (temporary C-RNTI), if any, may be released.

A buffer for message 3 transmission may be flushed.

All new data indicators for an HARQ process for a UL may be configured as 0.

When a UL DRX retransmission timer running for the UL is running, the UL DRX retransmission timer may be stopped.

When all UL HARQ related timers are running, the UL HARQ related timers may be stopped.

When a reset procedure of a MAC layer is performed, or when a partial reset procedure indicator of the MAC layer is not included, not indicated, or not performed, the terminal may perform the entire reset procedure of the MAC layer, and thus the terminal may flush all of the configured general HARQ process, HARQ process for MBS, and HARQ process for system information.

A first PDCP suspension (resume) procedure according to the disclosure may include one or more terminal operations from among the following procedures.

A transmission PDCP layer of a terminal may initialize a transmission window variable or may configure the transmission window variable as an initial value, or may discard stored data (e.g., PDCP PDU or PDCP SDU). In another method, in order to prevent data loss, only the PDCP PDU may be discarded. This is a procedure for preventing old data from being transmitted or retransmitted when an SCG is activated or resumed later.

When a reordering timer (t-reordering) (timer for arranging data in an ascending order based on PDCP sequence numbers or count values) is running, a reception PDCP layer of the terminal may stop or initialize the reordering timer. Alternatively, the reception PDCP layer of the terminal may perform a header decompression procedure on stored data (e.g., PDCP SDU), and may transmit the data to a higher layer in an ascending order of count values. The reception PDCP layer of the terminal may initialize a reception window variable or may configure the reception window variable as an initial value.

A second PDCP suspension (or resume) procedure according to the disclosure may include one or more terminal operations from among the following procedures.

A transmission PDCP layer of a terminal may maintain a variable value without initializing a transmission window variable, or without configuring the transmission window variable as an initial value. The reason why the variable value (e.g., count value) is maintained is to solve a security issue problem occurring when different data are transmitted with the same security key (e.g., count value) when an SCG is activated or resumed. The transmission PDCP layer of the terminal may discard stored data (e.g., PDCP PDU or PDCP SDU). In another method, in order to prevent data loss, only the PDCP PDU may be discarded. This is a procedure for preventing old data from being transmitted or retransmitted when the SCG is activated or resumed later.

When a reordering timer (t-reordering) (timer for arranging data in an ascending order based on PDCP sequence numbers or count values) is running, a reception PDCP layer of the terminal may stop or initialize the reordering timer. Alternatively, the reception PDCP layer of the terminal may perform a header decompression procedure on stored data (e.g., PDCP SDU), and may transmit the data to a higher layer in an ascending order of count values. The reception PDCP layer of the terminal may maintain a variable value without initializing a reception window variable or without configure the reception window variable as an initial value. The reason why the variable value (e.g., count value) is maintained is to solve a security issue problem occurring when different data are transmitted with the same security key (e.g., count value) when the SCG is activated or resumed. In another method, in order not to directly trigger the reordering timer even without a count value or a PDCP sequence number gap when the SCG is activated or resumed or data is received, the terminal may configure or update an RX_NEXT window variable (variable indicating a count value of data expected to be received next) to a value of an RX_DELIV window variable (variable indicating a count value corresponding to next data of data transmitted to a higher layer) or to a count value of data first received by the terminal. In another method, when a reordering timer value is configured in the message or when an indicator is received from a higher layer, the terminal may configure or update an RX_REORD window variable (variable indicating a count value of next data of data triggering the reordering timer) to a variable value of an RX_NEXT window variable value, or may stop or restart the reordering timer.

When a terminal receives configuration information or an indicator for releasing, deactivating, reconfiguring, or suspending dual connectivity, a cell group (e.g., SCG), or a cell (e.g., through DCI of a PDCCH, MAC control information, or an RRC message) and the terminal performs the above terminal operations, if data to be transmitted via a UL occurs or is generated, the terminal may transmit a scheduling request (SR) or MAC control information (or indicator, the amount of buffer, or a buffer state report) in a transmission resource of the PUCCH configured in the RRC message to a master base station or a secondary base station to request a UL transmission resource or to request to configure, add, activate, resume, modify, or reconfigure dual connectivity, a cell group (e.g., SCG), or a cell. In another method, when the terminal receives configuration information or an indicator for releasing, deactivating, reconfiguring, or suspending dual connectivity, a cell group (e.g., SCG), or a cell (e.g., through DCI of a PDCCH, MAC control information, or an RRC message) and the terminal performs the above terminal operations, if data to be transmitted via a UL occurs or is generated, the terminal may generate an RRC message and may transmit the RRC message to a master base station or a secondary base station to request a UL transmission resource or to request to configure, add, activate, resume, modify, or reconfigure dual connectivity, a cell group (e.g., SCG), or a cell.

Procedures according to the disclosure may be extended to multiple access technology. For example, configuration information of a plurality of cell groups may be configured in a terminal through an RRC message, and one or more cell groups (or cells) from among the configured plurality of cell groups may be activated or resumed through an indicator of a PDCCH, MAC control information, or an RRC message, or one or more cell groups may be suspended or deactivated.

In the disclosure, assuming that dual connectivity is configured, when an SCG is released, it means that a connection (data transmission or reception) with the SCG is released, and configuration information of the SCG (or bearer configuration information or protocol layer configuration information (PHY, MAC, RLC, PDCP, or SDAP layer) is discarded or released. In contrast, when an SCG is suspended or deactivated, it means that a connection (data transmission or reception) with the SCG is released or deactivated, but configuration information or the SCG (or bearer configuration information or protocol layer configuration information (PHY, MAC, RLC, PDCP, or SDAP layer) is maintained, suspended, or stored, and a connection with the SCG is rapidly resumed or activated later based on the stored configuration information of the SCG.

Timers for managing radio link monitoring for a cell group (MCG or SCG) or a cell (PCell or PSCell) and methods of driving the timers will be described. Specific operations of timers may be different according to a type of an indication such as an indication to activate, deactivate, suspend, resume, add, or release an SCG in a base station.

According to an embodiment of the disclosure, in order to efficiently manage radio link monitoring for a cell group (MCG or SCG) or a cell (PCell or PSCell), a first timer (e.g., T304), a second timer (e.g., T310), or a third timer (e.g., T312) may be introduced and run and applied in a radio link monitoring procedure. The first timer (e.g., T304), the second timer (e.g., T310), and the third timer (e.g., T312) may perform different operations as follows according to a type of an indication indicating to activate, deactivate, suspend, resume, or release an SCG. The first timer (e.g., T304) is a timer for determining whether the SCG is successfully added, resumed, or activated, the second timer (e.g., T310) is a timer for determining whether a radio link with a cell group (MCG or SCG) or a cell (PCell or PSCell) is valid, and the third timer (e.g., T312) is an auxiliary timer for determining whether a radio link with a cell group (MCG or SCG) or a cell (PCell or PSCell) is valid and a timer for triggering a frequency measurement procedure and reporting a frequency measurement result.

The first timer (e.g., T304), the second timer (e.g., T310), or the third timer (e.g., T312) may specifically operate as follows.

1> When a terminal receives an indicator (out-of-sync indication) indicating that synchronization of a radio link signal is not made from a lower layer (e.g., MAC layer or PHY layer) a certain number of times (that may be configured, e.g., N310) and detects that there is a problem with the physical layer, if the first timer (e.g., T304) is not running 2> The terminal may start the second timer (e.g., T310) corresponding to a cell (e.g., SpCell) receiving the indicator.

1> When the terminal receives an indicator (in-sync indication) indicating that synchronization of a radio link signal is made from a lower layer a certain number of times (that may be configured by the base station, e.g., N311), or when the second timer (e.g., T310) is running, or when a handover procedure is triggered (or starts), or when an RRC connection reestablishment procedure starts (or is triggered)

2> The terminal may stop the second timer (e.g., T310) corresponding to a cell (e.g., SpCell) indicating the indicator.

2> When the third timer (e.g., T312) corresponding to a cell (SpCell) receiving the indicator is running, the terminal may stop the third timer (e.g., T312).

1> When the second timer expires

2> The terminal may trigger or start an RRC connection reestablishment procedure. Alternatively, the terminal may be transitioned to an RRC idle mode and may trigger or start an RRC connection reestablishment procedure.

1> When the second timer (e.g., T310) is running, if a frequency measurement procedure is triggered for a frequency measurement identifier configured with the third timer, the terminal may start the third timer. When the terminal receives an indicator (in-sync indication) indicating that synchronization of a radio link signal is made from a lower layer a certain number of times (that may be configured by the base station), or when a handover procedure is triggered (or starts), or when an RRC connection reestablishment procedure starts, the terminal may stop the third timer. When the third timer expires, the terminal may trigger or start an RRC connection reestablishment procedure. Alternatively, the terminal may be transitioned to an RRC idle mode and may trigger or start an RRC connection reestablishment procedure.

1> When the terminal receives an RRC message (e.g., RRCReconfiguration), if an indicator (ReconfigurationWithSync) indicating to activate, add, or resume handover or an SCG is included in the message, or when the terminal performs operations according to the indicator, 2> The terminal may configure a first timer value by using a timer value included in the message including the indicator, and may start the first timer corresponding to the cell (SpCell).

2> When a dual active protocol stack (DAPS) bearer is not configured

3> When the second timer (e.g., T30) corresponding to a cell (e.g., SpCell) receiving the indicator is running, the terminal may stop the second timer (e.g., T310).

2> When the third timer (e.g., T312) corresponding to a cell (e.g., SpCell) receiving the indicator is running, the terminal may stop the third timer (e.g., T312).

When the terminal receives an indication to suspend or deactivate an SCG through an RRC message, MAC control information, DCI of a PDDCH, or a physical signal, the terminal may perform procedures for suspending or deactivating the SCG according to an embodiment of the disclosure, and may stop radio link monitoring for the SCG. This is because data is not transmitted or received for the suspended or deactivated SCG, and thus radio link monitoring unnecessarily consumes battery power of the terminal. For example, the terminal may stop the timers according to the following conditions.

1> When the SCG is deactivated, or when data transmission or reception (SCG transmission) with the SCG is suspended, or when an indicator to deactivate or suspend the SCG is included in a received RRC message, or when an indication to deactivate or suspend the SCG is received (or indicated) from a lower layer (e.g., MAC layer or PHY layer)

2> When the second timer (e.g., T310) corresponding to the cell (e.g., SpCell) is running, the terminal may stop the second timer (e.g., T310).

2> When the third timer (e.g., T312) corresponding to the cell (e.g., SpCell) is running, the terminal may stop the third timer (e.g., T312).

In another method, when the terminal receives an indication to suspend or deactivate the SCG through an RRC message, MAC control information, DCI of a PDCCH, or a signal (e.g. HARQ ACK or NACK or new transmission resource) transmitted through a physical channel (PDCCH or PDSCH), the terminal may perform procedures for suspending or deactivating the SCG according to an embodiment of the disclosure, and may continuously perform radio link monitoring for the SCG. This is because, when radio link monitoring is performed for the suspended or deactivated SCG, the SCG may be more rapidly resumed or activated later or the base station may rapidly perform scheduling. For example, even when the terminal receives an indication to suspend or deactivate the SCG through an RRC message, MAC control information, DCI of a PDCCH, or a signal (e.g., HARQ ACK or NACK or new transmission resource) transmitted through a physical channel (PDCCH or PDSCH), the terminal may operate the timers for the SCG or PSCell (SpCell) according to the following conditions.

1> When the terminal receives an indicator (out-of-sync indication) indicating that synchronization of a radio link signal is not made from a lower layer (e.g., MAC layer or PHY layer) a certain number of times (that may be configured, e.g., N310) and detects that there is a problem with the physical layer, if the first timer (e.g., T304) is not running 2> The terminal may start the second timer (e.g., T310) corresponding to a cell (e.g., SpCell) receiving the indicator.

1> When the terminal receives an indicator (in-sync indication) indicating that synchronization of a radio link signal is made from a lower layer a certain number of times (that may be configured by the base station, e.g., N311), or when the second timer (e.g., T310) is running, or when a handover procedure is triggered (or starts), or when an RRC connection reestablishment procedure starts (or is triggered)

2> The terminal may stop the second timer (e.g., T310) corresponding to a cell (e.g., SpCell) indicating the indicator.

2> When the third timer (e.g., T312) corresponding to a cell (SpCell) receiving the indicator is running, the terminal may stop the third timer (e.g., T312).

1> When the second timer expires

2> The terminal may trigger or start an RRC connection reestablishment procedure. Alternatively, the terminal may be transitioned to an RRC idle mode and may trigger or start an RRC connection reestablishment procedure.

1> When the second timer (e.g., T310) is running, if a frequency measurement procedure is triggered for a frequency measurement identifier configured with the third timer, the terminal may start the third timer. When the terminal receives an indicator (in-sync indication) indicating that synchronization of a radio link signal is made from a lower layer a certain number of times (that may be configured by a base station), or when a handover procedure is triggered (or starts), or when an RRC connection reestablishment procedure starts, the terminal may stop the third timer. When the third timer expires, the terminal may trigger or start an RRC connection reestablishment procedure. Alternatively, the terminal may be transitioned to an RRC idle mode and may trigger or start an RRC connection reestablishment procedure.

1> When the terminal receives an RRC message (e.g., RRCReconfiguration), if an indicator (ReconfigurationWithSync) indicating to activate, add, or resume handover or the SCG is included in the message, or when the terminal performs operations according to the indicator, 2> The terminal may configure a first timer value by using a timer value included in the message including the indicator, and may start the first timer corresponding to the cell (SpCell).

2> When a DAPS bearer is not configured

3> When the second timer (e.g., T30 corresponding to a cell (e.g., SpCell) receiving the indicator is running, the terminal may stop the second timer (e.g., T310).

2> When the third timer (e.g., T312) corresponding to a cell (e.g., SpCell) receiving the indicator is running, the terminal may stop the third timer (e.g., T312).

When the terminal receives an indication to suspend or deactivate the SCG through an RRC message, MAC control information, DCI of a PDDCH, or a physical signal but continuously performs radio link monitoring for the SCG, the terminal may detect a radio link failure for the SCG. Also, when the SCG (PSCell) is suspended or deactivated, a radio link failure for an MCG (PCell) may be detected. Accordingly, when a radio link failure is detected for each cell group, an efficient processing method of the terminal for rapidly recovering the radio link is required. An efficient radio link recovery method of a terminal for the above cases will be described.

1> When a radio link failure is detected, or when the second timer T310 for the SCG (PSCell) expires, or when the third timer T312 for the SCG (PSCell) expires, or when a random access problem is indicated from the SCG (PSCell), or when an indication indicating that the number of retransmissions has reached a maximum number is received from an RLC layer of the SCG (PSCell)
  2> When an indication indicating that the number of retransmissions has reached a maximum number is received from an RLC layer of the SCG, carrier aggregation (CA)-based duplication (packet duplication) is configured and activated, and cells mapped and configured in a logical channel (e.g., configured in allowedServingCells) corresponding to the RLC layer include only SCells
    3> The terminal may trigger a procedure of reporting failure information to report an RLC layer failure. The terminal may configure a failure report message including a cause of the radio link failure and may transmit the failure report message through a bearer (e.g., SRB1, split SRB1, or SRB) configured in the MCG.
  2> Otherwise, when data transmission or reception with the MCG (PCell) is not stopped, or when the SCG is not suspended or deactivated
    3> It may be considered that a radio link failure is detected (SCG RLF) for the SCG (PSCell).
    3> The terminal may trigger a procedure of reporting failure information to report a radio link failure for the SCG. The terminal may configure a failure report message including a cause of the radio link failure and may transmit the failure report message through a bearer (e.g., SRB1, split SRB1, or SRB) configured in the MCG.
  2> Otherwise (or when data transmission or reception with the MCG (PCell) is performed
    3> When dual connectivity is configured in the terminal
      4> The terminal may trigger or start an RRC connection reestablishment procedure.
      4> When the RRC connection reestablishment procedure is performed, if the first timer T304, the second timer T310, or the third timer T312 is running, the terminal may stop the first timer T304, the second timer T310, or the third timer T312.
      4> When the RRC connection reestablishment procedure is performed, the terminal may initialize a MAC layer, or when dual connectivity (MR-DC) is configured, the terminal may perform a procedure of releasing dual connectivity. For example, the terminal may release the SCG, or may release a connection with the SCG, or may release (or discard) configuration information of the SCG.

1> When a radio link failure is detected, or when a certain DAPS bearer is not configured, or when the second timer T310 for the MCG (PCell) expires, or when the third timer T312 for the MCG (PCell) expires, or when a random access problem is indicated from the MCG (PCell), or when an indication indicating that the number of retransmissions has reached a maximum number is received from an RLC layer of the MCG (PCell)
  2> When an indication indicating that the number of retransmissions has reached a maximum number is received from an RLC layer of the MCG, CA-based duplication (packet duplication) is configured and activated, cells mapped and configured in a logical channel (e.g., configured in allowedServingCells) corresponding to the RLC layer include only SCells
    3> The terminal may trigger a procedure of reporting failure information to report an RLC layer failure. The terminal may configure a failure report message including a cause of the radio link failure and may transmit the failure report message through a bearer (e.g., SRB1, split SRB1, or SRB) configured in the MCG.
  2> Otherwise
    3> It may be considered that a radio link failure is detected (MCG RLF) for the MCG (PCell).
    3> The terminal may store radio link failure-related information including a cause of the radio link failure.
    3> When a security function (AS security) is not activated
      4> The terminal may be transitioned to an RRC idle mode.
    3> Otherwise, when a security function (AS security) is activated but an SRB2 and at least one DRB are not configured
      4> The terminal may store radio link failure information, and may be transitioned to an RRC idle mode.
    3> Otherwise
      4> The terminal may store radio link failure information.
      4> When a function for recovering an MCG failure through the SCG is configured, or when a timer T316 for the function for recovering an MCG failure through the SCG is configured
      4> Alternatively, when data transmission or reception with the SCG (PCell) is not suspended (or when the SCG is not suspended or deactivated)
      4> Alternatively, when SCG (PSCell) modification is not performed
        5> The terminal may trigger a procedure of reporting failure information to report a radio link failure for the MCG. The terminal may configure a failure report message including a cause of the radio link failure and may transmit the failure report message through a bearer (e.g., SRB1, split SRB1, or SRB) configured in the MCG or a bearer (SRB3) configured in the SCG. When the split SRB1 is configured, the terminal may always transmit the failure report message through the split SRB1. In another method, when the SCG is suspended or deactivated (or when a radio link failure is not detected in the SCG), the terminal may trigger a procedure of reporting failure information to report a radio link failure for the MCG, or may trigger a random access procedure.
      4> Otherwise
      4> When an RRC connection reestablishment procedure is performed, if the first timer T304, the second timer T310, or the third timer T312 is running, the terminal may stop the first timer T304, the second timer T310, or the third timer T312.

4> When the RRC connection reestablishment procedure is performed, the terminal may initialize a MAC layer, or when dual connectivity (MR-DC) is configured, the terminal may perform a procedure of releasing dual connectivity. For example, the terminal may release the SCG, or may release a connection with the SCG, or may release (or discard) configuration information of the SCG.

When the terminal transmits a radio link failure report message to the base station, an MCG or SCG base station may solve the radio link failure problem by indicating handover to the terminal, or releasing an RRC connection, or transmitting an RRC message for releasing or modifying the SCG to the terminal. In another method, when a radio link failure is detected, the terminal may trigger an RRC connection reestablishment procedure and may reconfigure a connection. In another method, even when a radio link failure is detected in the MCG, if the SCG is suspended or deactivated, or if the SCG is valid (or if a radio link failure is not detected), the terminal may resume or activate the SCG by performing a request to reactivate or resume the SCG (e.g., by transmitting a message (RRC message or MAC CE) including an indicator or performing a random access procedure), and may transmit a radio link failure report of the MCG through a secondary cell base station.

FIG. 1R illustrates a diagram of an operation of a terminal, according to an embodiment of the disclosure.

Referring to FIG. 1R, a terminal $1r$-$01$ may receive a message (e.g., DCI of a PDCCH, MAC control information, or an RRC message) from a base station ($1r$-$05$). When cell group configuration information, or a cell group state, or a cell group indicator is included in the message, the terminal may determine whether a cell group is indicated to be configured, added, activated, or resumed or whether a cell group is indicated to be released, deactivated, or suspended in the message ($1r$-$10$). When a cell group is indicated to be configured, added, activated, or resumed in the message, a cell group configuration, addition, activation, or resume procedure may be performed based on embodiments of the disclosure ($1r$-$20$), and when a cell group is indicated to be released, deactivated, or suspended in the message, a cell group release, deactivation, or suspension procedure may be performed based embodiments of the disclosure ($1r$-$30$).

FIG. 1S illustrates a block diagram of a structure of a terminal, according to an embodiment of the disclosure.

Referring to FIG. 1S, a terminal may include a radio frequency (RF) processor $1s$-$10$, a baseband processor $1s$-$20$, a storage $1s$-$30$, and a controller $1s$-$40$.

The RF processor $1s$-$10$ may perform a function of transmitting/receiving a signal via a wireless channel, such as signal band conversion or amplification. That is, the RF processor $1s$-$10$ may up-convert a baseband signal applied from the baseband processor $1s$-$20$ into an RF band signal and transmit the RF band signal via an antenna, and may down-convert an RF band signal received via the antenna into a baseband signal. For example, the RF processor $1s$-$10$ may include a transmission filter, a reception filter, an amplifier, a mixer, an oscillator, a digital-to-analog convertor (DAC), or an analog-to-digital convertor (ADC). However, the disclosure is not limited thereto. Although only one antenna is illustrated in FIG. 1S, the terminal may include a plurality of antennas. Also, the RF processor $1s$-$10$ may include a plurality of RF chains. Furthermore, the RF processor $1s$-$10$ may perform beamforming. For beamforming, the RF processor $1s$-$10$ may adjust a phase and magnitude of each of signals transmitted/received via a plurality of antennas or antenna elements. Also, the RF processor $1s$-$10$ may perform multiple-input multiple-output (MIMO), and may receive several layers during a MIMO operation The RF processor $1s$-$10$ may perform reception beam sweeping by appropriately configuring a plurality of antennas or antenna elements under the control by the controller, or may adjust a direction and a beam width of a reception beam so that the reception beam and a transmission beam accord with each other.

The baseband processor $1s$-$20$ performs a conversion function between a baseband signal and a bit string according to the physical layer specifications of a system. For example, during data transmission, the baseband processor $1s$-$20$ may generate complex symbols by encoding and modulating a transmitted bit string. Also, during data reception, the baseband processor $1s$-$20$ may restore a received bit string by demodulating and decoding a baseband signal received from the RF processor $1s$-$10$. For example, according to an OFDM scheme, during data transmission, the baseband processor $1s$-$20$ may generate complex symbols by encoding and modulating a transmitted bit string, may map the complex symbols to subcarriers, and then may configure OFDM symbols through an inverse fast Fourier transform (IFFT) operation and cyclic prefix (CP) insertion. Also, during data reception, the baseband processor $1s$-$20$ may divide a baseband signal received from the RF processor $1s$-$10$ into units of OFDM symbols, may restore signals mapped to subcarriers through a fast Fourier transform (FFT) operation, and then may restore a received bit string through demodulation and decoding.

The baseband processor $1s$-$20$ and the RF processor $1s$-$10$ may transmit and receive a signal as described above. Accordingly, the baseband processor $1s$-$20$ and the RF processor $1s$-$10$ may each be referred to as a transmitter, a receiver, a transceiver, or a communicator. Furthermore, at least one of the baseband processor $1s$-$20$ or the RF processor $1s$-$10$ may include a plurality of communication modules to support different multiple radio access technologies. In addition, at least one of the baseband processor $1s$-$20$ or the RF processor $1s$-$10$ may include different communication modules to process signals of different frequency bands. For example, the different radio access technologies may include an LTE network and an NR network. Also, the different frequency bands may include a super high frequency (SHF) (e.g., 2.5 GHz or 5 GHz) band and a millimeter (mm) wave (e.g., 60 GHz) band. The terminal may transmit/receive a signal to/from a base station by using the baseband processor $1s$-$20$ and the RF processor $1s$-$10$. The signal may include control information and data.

The storage $1s$-$30$ may store data such as a basic program for an operation of the terminal, an application program, or configuration information. Also, the storage $1s$-$30$ may provide stored data according to a request from the controller $1s$-$40$. The storage $1s$-$30$ may include a storage medium such as a read-only memory (ROM), a random-access memory (RAM), a hard disk, a compact disc-ROM (CD-ROM), or a digital versatile disk (DVD), or a combination thereof. Also, the storage $1s$-$30$ may include one or more memories.

The controller $1s$-$40$ may control overall operations of the terminal. For example, the controller $1s$-$40$ may transmit/receive a signal via the baseband processor $1s$-$20$ and the RF processor $1s$-$10$. Also, the controller $1s$-$40$ records and reads data to and from the storage $1s$-$30$. To this end, the controller $1s$-$40$ may include at least one processor. For example, the controller $1s$-$40$ may include a communication processor (CP) for performing control for communication and an application processor (AP) for controlling a higher layer such as an application program. According to an embodiment of the disclosure, the controller 1s-40 may include a multi-connection processor 1s-42 configured to perform a process that operates in a multi-connection mode. The controller 1s-40 may activate or deactivate carrier aggregation or dual connectivity according to the above embodiments of the disclosure, and may control each element of the terminal to control activation of a cell group.

FIG. 1T illustrates a block diagram of a configuration of a transmission and reception point (TRP) device in a wireless communication system, according to an embodiment of the disclosure.

Referring to FIG. 1T, a base station may include an RF processor 1t-10, a baseband processor 1t-20, a communicator 1t-30, a storage 1t-40, and a controller 1t-50.

The RF processor 1t-10 may perform a function of transmitting/receiving a signal through a wireless channel such as signal band conversion and amplification. That is, the RF processor 1t-10 may up-convert a baseband signal applied from the baseband processor 1t-20 into an RF band signal and transmit the RF band signal via an antenna, and may down-convert an RF band signal received via the antenna into a baseband signal. For example, the RF processor 1t-10 may include a transmission filter, a reception filter, an amplifier, a mixer, an oscillator, a DAC, or an ADC. However, the disclosure is not limited thereto. Although only one antenna is shown in FIG. 1T, the base station may include a plurality of antennas. Also, the RF processor 1t-10 may include a plurality of RF chains. Furthermore, the RF processor 1t-10 may perform beamforming. For beamforming, the RF processor 1t-10 may adjust a phase and size of each of signals transmitted/received through a plurality of antennas or antenna elements. The RF processor 1t-10 may perform a downlink MIMO operation by transmitting one or more layers.

The baseband processor 1t-20 may perform a conversion function between a baseband signal and a bit string according to the physical layer specifications of first radio access technology. For example, during data transmission, the baseband processor 1t-20 may generate complex symbols by encoding and modulating a transmitted bit string. Also, during data reception, the baseband processor 1t-20 may restore a received bit string by demodulating and decoding a baseband signal applied from the RF processor 1t-10. For example, according to an OFDM scheme, during data transmission, the baseband processor 1t-20 may generate complex symbols by encoding and modulating a transmitted bit string, may map the complex symbols to subcarriers, and then may configure OFDM symbols through an IFFT operation and CP insertion. Also, during data reception, the baseband processor 1t-20 may divide a baseband signal applied from the RF processor 1t-10 into units of OFDM symbols, may restore signals mapped to subcarriers through an FFT operation, and then may restore a received bit string through demodulation and decoding. The baseband processor 1t-20 and the RF processor 1t-10 may transmit and receive a signal as described above. Accordingly, the baseband processor 1t-20 and the RF processor 1t-10 may each be referred to as a transmitter, a receiver, a transceiver, a communicator, or a wireless communicator. The base station may transmit/receive a signal to/from a terminal by using the baseband processor 1t-20 and the RF processor 1t-10. The signal may include control information and data.

The communicator 1t-30 may provide an interface for performing communication with other nodes in a network. According to an embodiment of the disclosure, the communicator 1t-30 may be a backhaul communicator.

The storage 1t-40 may store data such as a basic program for an operation of the base station, an application program, or configuration information. In particular, the storage 1t-40 may store information about a bearer allocated to an accessed terminal, a measurement result reported from the accessed terminal, and the like. Also, the storage 1t-40 may store information that is a criterion for determining whether to provide or stop multiple connections to the terminal. The storage 1t-40 may provide stored data according to a request of the controller 1t-50. The controller 1t-50 may include a storage medium such as a ROM, a RAM, a hard disk, a CD-ROM, or a DVD, or a combination thereof. Also, the storage 1t-40 may include one or more memories.

The controller 1t-50 may control overall operations of the base station. For example, the controller 1t-50 may transmit/receive a signal through the baseband processor 1t-20 and the RF processor 1t-10 or through the backhaul communicator 1t-30. Also, the controller 1t-50 may record and read data to and from the storage 1t-40. To this end, the controller 1t-50 may include at least one processor. According to an embodiment of the disclosure, the controller 1t-50 may include a multi-connection processor 1t-52 configured to perform a process that operates in a multi-connection mode.

Methods according to the claims or embodiments of the disclosure described herein may be implemented by hardware, software, or a combination of hardware and software.

When the methods are implemented by software, a computer-readable storage medium storing one or more programs (software modules) may be provided. The one or more programs stored in the computer-readable storage medium are configured to be executed by one or more processors in an electronic device. The one or more programs include instructions for allowing the electronic device to execute the methods according to the claims or embodiments of the disclosure described herein.

These programs (software modules or software) may be stored in a RAM, a non-volatile memory including a flash memory, a ROM, an electrically erasable programmable read-only memory (EEPROM), a magnetic disc storage device, a CD-ROM, a DVD, another optical storage device, or a magnetic cassette. Alternatively, the programs may be stored in a memory including any combination of some or all thereof. Also, each of the memories may include a plurality of memories.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may be connected through an external port to an apparatus performing an embodiment of the disclosure. Also, a separate storage device on a communication network may be connected to an apparatus performing an embodiment of the disclosure.

According to disclosed embodiments of the disclosure, activation of a cell group in a mobile communication system may be efficiently controlled.

In specific embodiments of the disclosure described above, components included in the disclosure are expressed in the singular or plural according to the specific embodiments of the disclosure set forth. However, the singular or plural representations are selected suitably according to situations for convenience of explanation, the disclosure is not limited to the singular or plural components, and components expressed in the plural may even be configured in the singular or components expressed in the singular may even be configured in the plural.

It should be understood that the embodiments of the disclosure described herein should be considered in a descriptive sense only and not for purposes of limitation. That is, it will be understood by one of ordinary skill in the art that various changes in form and details may be made in the embodiments of the disclosure without departing from the spirit and scope of the disclosure. Also, the embodiments of the disclosure may be used in combination when necessary. For example, parts of an embodiment and another embodiment of the disclosure may be combined with each other. Also, other modifications based on the technical spirit of the embodiments of the disclosure may be made in various systems such as an FDD LTE system, a TDD LTE system, and a 5G or NR system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a user equipment (UE), for activating a secondary cell (SCell), the method comprising:
    receiving, from a base station (BS), a radio resource control (RRC) message including cell configuration information of the SCell,
    wherein the cell configuration information includes a bandwidth part (BWP) identifier indicating a first downlink BWP for activation of the SCell and information related to configuration of reference signals for activation of the SCell, and
    wherein the information related to configuration of the reference signals for activation of the SCell indicates an interval between the reference signals for activation of the SCell and a number of the reference signals for activation of the SCell;
    receiving, from the BS, a medium access control (MAC) control element (CE) indicating activation of the SCell; and
    activating the first downlink BWP indicated by the BWP identifier, based on the interval between the reference signals for activation of the SCell and the number of the reference signals for activation of the SCell.

2. The method of claim 1, wherein the RRC message further comprises a BWP identifier indicating a first uplink BWP for activation of the SCell.

3. The method of claim 2, further comprising:
    activating the first uplink BWP, in response to the MAC CE indicating activation of the SCell.

4. The method of claim 1, further comprising:
    receiving the reference signals for activation of the SCell within the first downlink BWP, based on the interval between the reference signals for activation of the SCell and the number of the reference signals for activation of the SCell.

5. The method of claim 4, further comprising:
    transmitting a measurement result based on the received reference signals for activation of the SCell.

6. The method of claim 1, wherein the cell configuration information further comprises information related to configuration of channel measurement signals.

7. The method of claim 6, further comprising:
    based on the cell configuration information comprising the information related to configuration of the reference signals for activation of the SCell, identifying the reference signals for activation of the SCell based on the interval between the reference signals for activation of the SCell and the number of the reference signals for activation of the SCell, and activating the SCell using the identified reference signals; and
    based on the cell configuration information not comprising the information related to configuration of the reference signals for activation of the SCell, obtaining a channel measurement result for the SCell using the channel measurement signals, and transmitting the channel measurement result.

8. A method, performed by a base station (BS), for activating a secondary cell (SCell), the method comprising:
    transmitting, to a user equipment (UE), a radio resource control (RRC) message including cell configuration information of the SCell,
    wherein the cell configuration information includes a bandwidth part (BWP) identifier indicating a first downlink BWP for activation of the SCell and information related to configuration of reference signals for activation of the SCell, and
    wherein the information related to configuration of the reference signals for activation of the SCell indicates an interval between the reference signals for activation of the SCell and a number of the reference signals for activation of the SCell; and
    transmitting, to the UE, a medium access control (MAC) control element (CE) indicating activation of the SCell,
    wherein the first downlink BWP indicated by the BWP identifier is activated at the UE, based on the interval between the reference signals for activation of the SCell and the number of the reference signals for activation of the SCell.

9. The method of claim 8, wherein the RRC message further comprises a BWP identifier indicating a first uplink BWP for activation of the SCell.

10. The method of claim 9, wherein the first uplink BWP is activated at the UE, in response to the MAC CE indicating activation of the SCell.

11. The method of claim 8, further comprising:
    transmitting, to the UE, the reference signals for activation of the SCell within the first downlink BWP, based on the interval between the reference signals for activation of the SCell and the number of the reference signals for activation of the SCell.

12. The method of claim 11, further comprising:
    receiving, from the UE, a measurement result based on the transmitted reference signals for activation of the SCell.

13. The method of claim 8, wherein the cell configuration information further comprises information related to configuration of channel measurement signals.

14. The method of claim 13, wherein based on the cell configuration information comprising the information related to configuration of the reference signals for activation of the SCell, the reference signals for activation of the SCell are identified at the UE based on the interval between the reference signals for activation of the SCell and the number of the reference signals for activation of the SCell, and the SCell is activated at the UE using the identified reference signals, and
    wherein based on the cell configuration information not comprising the information related to configuration of the reference signals for activation of the SCell, a channel measurement result for the SCell is obtained at the UE using the channel measurement signals and the channel measurement result is received from the UE.

15. A user equipment (UE) configured to activate a secondary cell (SCell), the UE comprising:
    a transceiver; and a processor coupled with the transceiver and configured to:

receive, from a base station (BS), a radio resource control (RRC) message including cell configuration information of the SCell, wherein the cell configuration information includes a bandwidth part (BWP) identifier indicating a first downlink BWP for activation of the SCell and information related to configuration of reference signals for activation of the SCell, and wherein the information related to configuration of the reference signals for activation of the SCell indicates an interval between the reference signals for activation of the SCell and a number of the reference signals for activation of the SCell;

receive, from the BS, a medium access control (MAC) control element (CE) indicating activation of the SCell; and activate the first downlink BWP indicated by the BWP identifier, based on the interval between the reference signals for activation of the SCell and the number of the reference signals for activation of the SCell.

16. The UE of claim 15, wherein the RRC message further comprises a BWP identifier indicating a first uplink BWP for activation of the SCell.

17. The UE of claim 16, wherein the processor is further configured to:

activate the first uplink BWP, in response to the MAC CE indicating activation of the SCell.

18. The UE of claim 15, wherein the processor is further configured to:

receive the reference signals for activation of the SCell within the first downlink BWP, based on the interval between the reference signals for activation of the SCell and the number of the reference signals for activation of the SCell.

19. The UE of claim 18, wherein the processor is further configured to:

transmit a measurement result based on the received reference signals for activation of the SCell.

20. The UE of claim 15, wherein the cell configuration information further comprises information related to configuration of channel measurement signals.

21. The UE of claim 20, wherein the processor is further configured to:

based on the cell configuration information comprising the information related to configuration of the reference signals for activation of the SCell, identify the reference signals for activation of the SCell based on the interval between the reference signals for activation of the SCell and the number of the reference signals for activation of the SCell, and activate the SCell using the identified reference signals; and based on the cell configuration information not comprising the information related to configuration of the reference signals for activation of the SCell, obtain a channel measurement result for the SCell using the channel measurement signals, and transmit the channel measurement result.

* * * * *